United States Patent
Wang

(10) Patent No.: US 9,603,162 B2
(45) Date of Patent: Mar. 21, 2017

(54) DATA TRANSMISSION METHOD, BASE STATION, AND USER EQUIPMENT USING MULTIPLE TRANSPORT BLOCK SIZE TABLES

(71) Applicant: Huawei Device Co., Ltd., Shenzhen (CN)

(72) Inventor: Jian Wang, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 157 days.

(21) Appl. No.: 14/524,571

(22) Filed: Oct. 27, 2014

(65) Prior Publication Data

US 2015/0043526 A1 Feb. 12, 2015

Related U.S. Application Data

(63) Continuation of application No. PCT/CN2013/072998, filed on Mar. 21, 2013.

(51) Int. Cl.
*H04W 72/12* (2009.01)
*H04W 16/26* (2009.01)
(Continued)

(52) U.S. Cl.
CPC ....... *H04W 72/1278* (2013.01); *H04L 1/0003* (2013.01); *H04L 1/0006* (2013.01);
(Continued)

(58) Field of Classification Search
CPC H04W 72/1278; H04W 16/26; H04L 1/0007; H04L 1/0015; H04L 1/0003; H04L 1/0025
See application file for complete search history.

(56) References Cited

U.S. PATENT DOCUMENTS

2010/0195614 A1* 8/2010 Nimbalker ........ H04W 72/1289
370/330
2010/0303016 A1 12/2010 Jin et al.
(Continued)

FOREIGN PATENT DOCUMENTS

CN 101651515 A 2/2010
CN 101925077 A 12/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, Technical Specification, V10.5.0, Mar. 2012, 125 pages.
(Continued)

*Primary Examiner* — Jackie Zuniga Abad
(74) *Attorney, Agent, or Firm* — Conley Rose, P.C.

(57) ABSTRACT

A data transmission method, a base station, and a user equipment. The data transmission method includes determining, by a base station, a modulation and coding scheme level and the number of physical resource block pairs, selecting one transport block size (TBS) table from a first TBS table and a second TBS table, and determining a corresponding TBS, so that a coding rate can be increased when the base station transmits service data to the UE according to a TBS in the selected second TBS table.

24 Claims, 3 Drawing Sheets

(51) Int. Cl.
*H04L 1/00* (2006.01)
*H04L 5/00* (2006.01)

(52) U.S. Cl.
CPC .......... *H04L 1/0007* (2013.01); *H04L 1/0009* (2013.01); *H04L 1/0015* (2013.01); *H04L 1/0025* (2013.01); *H04W 16/26* (2013.01); *H04L 5/0005* (2013.01); *H04L 5/0046* (2013.01); *H04L 5/0053* (2013.01)

(56) References Cited

U.S. PATENT DOCUMENTS

| 2012/0207054 A1 | 8/2012 | Okubo et al. |
| 2014/0140283 A1 | 5/2014 | Jongren |

FOREIGN PATENT DOCUMENTS

| CN | 101860977 B | 7/2012 |
| JP | 2011066545 A | 3/2011 |
| JP | 2011523801 A | 8/2011 |
| WO | 2009023732 A2 | 2/2009 |
| WO | 2012171224 A1 | 12/2012 |

OTHER PUBLICATIONS

Foreign Communication From a Counterpart Application, European Application No. 13879086.0, European Office Action dated Feb. 23, 2016, 5 pages.
Partial English Translation and Abstract of Chinese Patent Application No. CN102265695A, Mar. 13, 2015, 8 pages.
Ericsson, "Reaching peak rate when scheduled with ePDCCH," 3GPP TSG-RAN WG1 #69, Prague, Czech Republic, R1-122005, May 21-25, 2012, 2 pages.
Foreign Communication From a Counterpart Application, European Application No. 13879086.0, Extended European Search Report dated Mar. 5, 2015, 10 pages.
Foreign Communication From a Counterpart Application, PCT Application No. PCT/CN2013/072998, English Translation of International Search Report dated Jan. 2, 2014, 2 pages.
Foreign Communication From a Counterpart Application, PCT Application No. PCT/CN2013/072998, Written Opinion dated Jan. 2, 2014, 5 pages.
Foreign Communication From a Counterpart Application, Chinese Application No. 201380000640.6, Chinese Office Action dated Jun. 14, 2016, 8 pages.
Foreign Communication From a Counterpart Application, Chinese Application No. 201380000640.6, Chinese Search Report dated Jun. 3, 2016, 2 pages.
"3rd Generation Partnership Project;Technical Specification Group Radio Access Network; Evolved Universal Terrestrial Radio Access (E-UTRA); Physical layer procedures (Release 11)" 3GPP TS 36.213 V11.2.0, Technical Specification, Feb. 2013, 173 pages.
"Consideration on high order modulation for small cell," 3GPP TSG-RAN WG1 Meeting #72, R1-130136, Jan. 28-Feb. 1, 2013, 6 pages.
"On Small Cell Enhancement for Improved Spectral Efficiency," 3GPP TSG RAN WG1 Meeting #72, R1-130311, Jan. 28-Feb. 1, 2013, 4 pages.
"Transport block size optimization for NCT," 3GPP TSG RAN WG1 Meeting #72bis, R1-131159, Apr. 15-19, 2013, 8 pages.
Foreign Communication From a Counterpart Application, Japanese Application No. 2016503507, Japanese Notice of Allowance dated Nov. 1, 2016, 3 pages.

\* cited by examiner

DATA TRANSMISSION METHOD, BASE STATION, AND USER EQUIPMENT USING MULTIPLE TRANSPORT BLOCK SIZE TABLES

CROSS-REFERENCE TO RELATED APPLICATIONS

This application is a continuation of International Application No. PCT/CN2013/072998, filed on Mar. 21, 2013, which is hereby incorporated by reference in its entirety.

TECHNICAL FIELD

Embodiments of the present invention relate to communications technologies, and in particular, to a data transmission method, a base station, and a user equipment.

BACKGROUND

In systems of Long Term Evolution Release.8 (LTE REL.8) to LTE REL.11, a state of a channel from a base station to a user equipment (UE) determines throughput from the base station to the UE. In a good channel state, the base station can transmit data to the UE using a high modulation and coding scheme (MCS) level, and the throughput of the system is also large; in a poor channel state, to control a bit error rate during data transmission, the base station can transmit data to the UE using a low MCS level. The base station determines, according to a channel state fed back by the UE, a coding rate and an MCS level used for transmitting data on this channel. To achieve a purpose of transmitting data to the UE at this coding rate, the base station needs to determine a transport block size that the delivered service data needs to occupy. When determining the transport block size, the base station generally determines, in a transport block size table (TBS table), according to the determined MCS level and frequency resources scheduled by the system, a transport block size used to carry the service data that the base station delivers to the UE.

In the prior art, in LTE REL.12, the base station transmits data to the UE using a transport block size determined according to an existing TBS table. However, a system overhead of an LTE REL.12 system is lower than system overheads of systems of LTE REL.8 to LTE REL.11, which causes a lower actual effective coding rate during the transmission and further affects throughput of the LTE REL.12 system.

SUMMARY

An objective of embodiments of the present invention is to provide a data transmission method, a base station, and a user equipment to solve a problem that an effective coding rate is reduced and that system throughput is affected when the base station transmits data to the UE using a transport block size that is determined according to an existing TBS table.

According to a first aspect, an embodiment of the present invention provides a data transmission method, which includes determining, by a base station, a modulation and coding scheme level; determining, by the base station, a time-frequency resource, and determining the number of physical resource block pairs according to the time-frequency resource; selecting, by the base station, one transport block size table from a first transport block size table and a second transport block size table, and determining a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table; transmitting, by the base station, service data to a user equipment using the determined TBS; and transmitting, by the base station, a system scheduling control signal to the user equipment, where the system scheduling control signal includes the modulation and coding scheme level and the time-frequency resource.

With reference to the first aspect, in a first possible implementation manner of the first aspect, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

With reference to the first aspect or the first possible implementation manner of the first aspect, in a second possible implementation manner of the first aspect, the selecting, by the base station, one transport block size table from a first transport block size table and a second transport block size table includes selecting, by the base station, one transport block size table from the first transport block size table and the second transport block size according to a system configuration parameter or a system overhead.

With reference to the first aspect or the first possible implementation manner of the first aspect, in a third possible implementation manner of the first aspect, the method further includes sending, by the base station, a higher-layer signaling message to the user equipment, where the higher-layer signaling message carries instruction information that instructs selection of the first transport block size table or the second transport block size table.

With reference to the first aspect or the first possible implementation manner of the first aspect, in a fourth possible implementation manner of the first aspect, the method further includes sending, by the base station, a downlink control message to the user equipment, where the downlink control message carries instruction information that instructs selection of the first transport block size table or the second transport block size table.

With reference to the first aspect or any one possible implementation manner of the first possible implementation manner of the first aspect, the second possible implementation manner of the first aspect, the third possible implementation manner of the first aspect, and the fourth possible implementation manner of the first aspect, in a fifth possible implementation manner of the first aspect, the first transport block size table includes a layer-1 data transport block size table in a LTE REL.8 system.

With reference to the fifth possible implementation manner of the first aspect, in a sixth possible implementation manner of the first aspect, all TBSs in the second transport block size table are included in TBSs in the first transport block size table.

With reference to the sixth possible implementation manner of the first aspect, in a seventh possible implementation manner of the first aspect, any TBS in the second transport block size table is a TBS in the first transport block size table, corresponding to a coding rate closest to a target coding rate.

With reference to the fifth possible implementation manner of the first aspect, in an eighth possible implementation manner of the first aspect, some TBSs in the second transport block size table are included in TBSs in the first transport block size table and some TBSs in the second transport block size table are included in a set layer-2 data transport block size table.

With reference to the eighth possible implementation manner of the first aspect, in a ninth possible implementation manner of the first aspect, any TBS in the second transport block size table is a TBS in the first transport block size table and the set layer-2 data transport block size table, corresponding to a coding rate closest to a target coding rate.

With reference to the seventh possible implementation manner of the first aspect or the ninth possible implementation manner of the first aspect, in a tenth possible implementation manner of the first aspect, the target coding rate is a coding rate corresponding to the modulation and coding scheme level and the number of physical resource block pairs in LTE REL.8; or, the target coding rate is an optimized coding rate of a coding rate corresponding to the modulation and coding scheme level and the number of physical resource block pairs in LTE REL.8.

According to a second aspect, an embodiment of the present invention provides a data transmission method, which includes receiving, by a user equipment, a system scheduling control signal from a base station, where the system scheduling control signal includes a modulation and coding scheme level and a time-frequency resource; and selecting, by the user equipment, one transport block size table from a first transport block size table and a second transport block size table, and determining a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table; and receiving, by the user equipment, service data from the base station using the determined TBS.

With reference to the second aspect, in a first possible implementation manner of the second aspect, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

With reference to the second aspect or the first possible implementation manner of the second aspect, in a second possible implementation manner of the second aspect, the selecting, by the user equipment, one transport block size table from a first transport block size table and a second transport block size table includes selecting, by the user equipment, one transport block size table from the first transport block size table and the second transport block size table according to a system configuration parameter or a system overhead.

With reference to the second aspect or the first possible implementation manner of the second aspect, in a third possible implementation manner of the second aspect, before the selecting, by the user equipment, one transport block size table from a first transport block size table and a second transport block size table, the method further includes receiving, by the user equipment, a higher-layer signaling message from the base station, where the higher-layer signaling message carries instruction information that instructs selection of the first transport block size table or the second transport block size table.

With reference to the second aspect or the first possible implementation manner of the second aspect, in a fourth possible implementation manner of the second aspect, before the selecting, by the user equipment, one transport block size table from a first transport block size table and a second transport block size table, the method further includes receiving, by the user equipment, a downlink control message from the base station, where the downlink control message carries instruction information that instructs selection of the first transport block size table or the second transport block size table.

With reference to the second aspect or any one possible implementation manner of the first possible implementation manner of the second aspect, the second possible implementation manner of the second aspect, the third possible implementation manner of the second aspect, and the fourth possible implementation manner of the second aspect, in a fifth possible implementation manner of the second aspect, the first transport block size table includes a layer-1 data transport block size table in a LTE REL.8 system.

With reference to the fifth possible implementation manner of the second aspect, in a sixth possible implementation manner of the second aspect, all TBSs in the second transport block size table are included in TBSs in the first transport block size table.

With reference to the sixth possible implementation manner of the second aspect, in a seventh possible implementation manner of the second aspect, any TBS in the second transport block size table is a TBS in the first transport block size table, corresponding to a coding rate closest to a target coding rate.

With reference to the fifth possible implementation manner of the second aspect, in an eighth possible implementation manner of the second aspect, some TBSs in the second transport block size table are included in TBSs in the first transport block size table and some TBSs in the second transport block size table are included in a set layer-2 data transport block size table.

With reference to the eighth possible implementation manner of the second aspect, in a ninth possible implementation manner of the second aspect, any TBS in the second transport block size table is a TBS in the first transport block size table and the set layer-2 data transport block size table, corresponding to a coding rate closest to a target coding rate.

With reference to the seventh possible implementation manner of the second aspect or the ninth possible implementation manner of the second aspect, in a tenth possible implementation manner of the second aspect, the target coding rate is a coding rate corresponding to the modulation and coding scheme level and the number of physical resource block pairs in LTE REL.8; or, the target coding rate is an optimized coding rate of the coding rate corresponding to the modulation and coding scheme level and the number of the physical resource block pairs in LTE REL.8.

According to a third aspect, an embodiment of the present invention provides a base station, which includes a processor configured to determine a modulation and coding scheme level, determine a time-frequency resource, and determine the number of physical resource block pairs according to the time-frequency resource; and further configured to select one transport block size table from a first transport block size table and a second transport block size table, and determine a corresponding transport block size TBS in the selected first transport block size table or the selected second transport block size table according to the modulation and coding scheme level and the number of physical resource block pairs, where any TBS in the second transport block size table is not smaller than a TBS in a corresponding position in the first transport block size table; and a transmitter configured to send service data to a user equipment using the determined TBS, and further configured to send a system scheduling control signal to the user equipment, where the system scheduling control signal includes the modulation and coding scheme level and the time-frequency resource.

With reference to the third aspect, in a first possible implementation manner of the third aspect, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

With reference to the third aspect or the first possible implementation manner of the third aspect, in a second possible implementation manner of the third aspect, the processor is further configured to select one transport block size table from the first transport block size table and the second transport block size table according to a system configuration parameter or a system overhead.

With reference to the third aspect or the first possible implementation manner of the third aspect, in a third possible implementation manner of the third aspect, the transmitter is further configured to send a higher-layer signaling message to the user equipment, where the higher-layer signaling message carries instruction information that instructs selection of the first transport block size table or the second transport block size table.

With reference to the third aspect or the first possible implementation manner of the third aspect, in a fourth possible implementation manner of the third aspect, the transmitter is further configured to send a downlink control message to the user equipment, where the downlink control message carries instruction information that instructs selection of the first transport block size table or the second transport block size table.

With reference to the third aspect or any one possible implementation manner of the first possible implementation manner of the third aspect, the second possible implementation manner of the third aspect, the third possible implementation manner of the third aspect, and the fourth possible implementation manner of the third aspect, in a fifth possible implementation manner of the third aspect, the first transport block size table includes a layer-1 data transport block size table in a LTE REL.8 system.

With reference to the fifth possible implementation manner of the third aspect, in a sixth possible implementation manner of the third aspect, all TBSs in the second transport block size table are included in TBSs in the first transport block size table.

With reference to the sixth possible implementation manner of the third aspect, in a seventh possible implementation manner of the third aspect, any TBS in the second transport block size table is a TBS in the first transport block size table, corresponding to a coding rate closest to a target coding rate.

With reference to the fifth possible implementation manner of the third aspect, in an eighth possible implementation manner of the third aspect, some TBSs in the second transport block size table are included in TBSs in the first transport block size table and some TBSs in the second transport block size table are included a set layer-2 data transport block size table.

With reference to the eighth possible implementation manner of the third aspect, in a ninth possible implementation manner of the third aspect, any TBS in the second transport block size table is a TBS in the first transport block size table and the set layer-2 data transport block size table, corresponding to a coding rate closest to a target coding rate.

With reference to the seventh possible implementation manner of the third aspect or the ninth possible implementation manner of the third aspect, in a tenth possible implementation manner of the third aspect, the target coding rate is a coding rate corresponding to the modulation and coding scheme level and the number of physical resource block pairs in LTE REL.8; or, the target coding rate is an optimized coding rate of a coding rate corresponding to the modulation and coding scheme level and the number of physical resource block pairs in LTE REL.8.

According to a fourth aspect, an embodiment of the present invention provides a user equipment, which includes a receiver configured to receive a system scheduling control signal from a base station, where the system scheduling control signal includes a modulation and coding scheme level and a time-frequency resource; and a processor configured to select one transport block size table from a first transport block size table and a second transport block size table, and determine a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table; where the receiver is further configured to receive service data from the base station using the determined TBS.

With reference to the fourth aspect, in a first possible implementation manner of the fourth aspect, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

With reference to the fourth aspect or the first possible implementation manner of the fourth aspect, in a second possible implementation manner of the fourth aspect, the processor is further configured to select one transport block size table from the first transport block size table and the second transport block size table according to a system configuration parameter or a system overhead.

With reference to the fourth aspect or the first possible implementation manner of the fourth aspect, in a third possible implementation manner of the fourth aspect, the receiver is further configured to receive a higher-layer signaling message from the base station before one transport block size table is selected from the first transport block size table and the second transport block size table, where the higher-layer signaling message carries instruction information that instructs selection of the first transport block size table or the second transport block size table.

With reference to the fourth aspect or the first possible implementation manner of the fourth aspect, in a fourth possible implementation manner of the fourth aspect, the receiver is further configured to receive a downlink control message from the base station before one transport block size table is selected from the first transport block size table and the second transport block size table, where the downlink control message carries instruction information that instructs selection of the first transport block size table or the second transport block size table.

With reference to the fourth aspect or any one possible implementation manner of the first possible implementation manner of the fourth aspect, the second possible implementation manner of the fourth aspect, the third possible implementation manner of the fourth aspect, and the fourth possible implementation manner of the fourth aspect, in a fifth possible implementation manner of the fourth aspect, the first transport block size table includes a layer-1 data transport block size table in a LTE REL.8 system.

With reference to the fifth possible implementation manner of the fourth aspect, in a sixth possible implementation manner of the fourth aspect, all TBSs in the second transport block size table are included in TBSs in the first transport block size table.

With reference to the sixth possible implementation manner of the fourth aspect, in a seventh possible implementation manner of the fourth aspect, any TBS in the second transport block size table is a TBS in the first transport block size table, corresponding to a coding rate closest to a target coding rate.

With reference to the fifth possible implementation manner of the fourth aspect, in an eighth possible implementation manner of the fourth aspect, some TBSs in the second transport block size table are included in TBSs in the first transport block size table and some TBSs in the second transport block size table are included in a set layer-2 data transport block size table.

With reference to the eighth possible implementation manner of the fourth aspect, in a ninth possible implementation manner of the fourth aspect, any TBS in the second transport block size table is a TBS in the first transport block size table and the set layer-2 data transport block size table, corresponding to a coding rate closest to a target coding rate.

With reference to the seventh possible implementation manner of the fourth aspect or the ninth possible implementation manner of the fourth aspect, in a tenth possible implementation manner of the fourth aspect, the target coding rate is a coding rate corresponding to the modulation and coding scheme level and the number of physical resource block pairs in LTE REL.8; or, the target coding rate is an optimized coding rate of the coding rate corresponding to the modulation and coding scheme level and the number of the physical resource block pairs in LTE REL.8.

In the data transmission method, the base station, and the user equipment of the embodiments, a base station determines a modulation and coding scheme level, determines a time-frequency resource, determines the number of physical resource block pairs according to the time-frequency resource, selects one transport block size table from a first transport block size table and a second transport block size table, and determines a corresponding transport block size TBS in the selected first transport block size table or the selected second transport block size table according to the modulation and coding scheme level and the number of the physical resource block pairs, where any TBS in the second transport block size table is not smaller than a TBS in a corresponding position in the first transport block size table; and the base station sends service data to a UE using the determined TBS, and sends a system scheduling control signal to the UE, where the system scheduling control signal includes the modulation and coding scheme level and the time-frequency resource. In this way, the base station implements selection of a transport block size table, so that a coding rate can be improved when the base station transmits the service data to the UE according to the TBS in the selected second transport block size table.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions in the present invention with reference to the accompanying drawings in the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
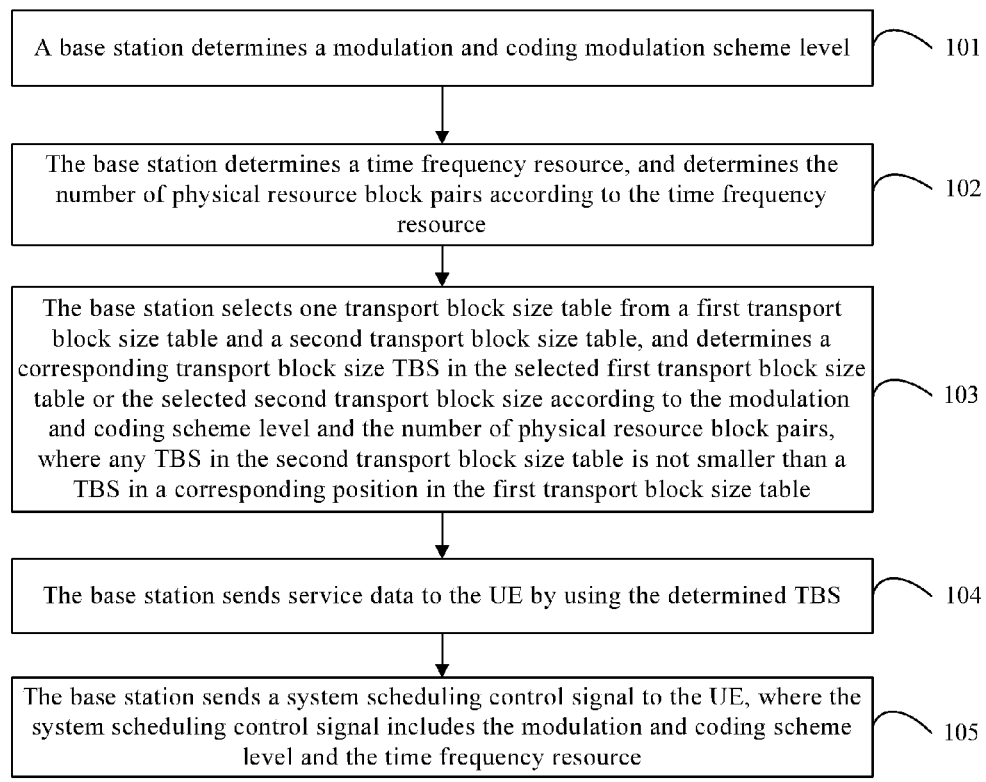
FIG. 1 is a flowchart of a first embodiment of a data transmission method according to the present invention.

FIG. 1 is a flowchart of a first embodiment of a data transmission method of the present invention. As shown in FIG. 1, the data transmission method of this embodiment includes the following:

101. A base station determines a modulation and coding scheme level.

When the base station sends service data to a UE, the base station needs to determine a modulation and coding scheme level (MCS level), so that the base station performs coding, according to the determined MCS level, on the service data to be transmitted.

The base station can determine an MCS level according to a channel state reported by the UE. When a state of a communication channel between the base station and the UE is relatively good, the base station may determine a high MCS level as the modulation and coding scheme level to perform coding on the service data to be transmitted; and when the state of the communication channel between the base station and the UE is relatively poor, the base station can determine a low MCS level as the modulation and coding scheme level to perform coding on the service data to be transmitted.

102. The base station determines a time-frequency resource, and determines the number of physical resource block pairs according to the time-frequency resource.

A system may schedule, according to availability of a current time-frequency resource, a time-frequency resource for data transmission, and the base station determines, according to the determined time-frequency resource, the number of physical resource block pairs (PRB pairs) used by the base station to transmit the service data to the UE, for example, if the number of PRB pairs determined by the base station is eight, the base station uses the eight PRB pairs to carry the service data.

103. The base station selects one transport block size table from a first transport block size table and a second transport block size table, and determines a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table.

The base station selects one transport block size table from the first transport block size table and the second transport block size table to determine a TBS. The base station may firstly determine, according to the determined MCS level, a modulation order index value and a TBS index value corresponding to the MCS level in a transport block size index table (full name: Modulation and TBS index table for Physical Downlink Shared Channel (PDSCH)); secondly, the base station determines, in the first transport block size table or the second transport block size table selected for determining the TBS, a TBS value corresponding to the determined TBS index value and the determined number of physical resource block (PRB) pairs.

A TBS value in the second transport block size table is compared with a TBS value in the same position in the first transport block size table, and the TBS value in the second transport block size table is not smaller than the TBS value in the first transport block size table, so that a coding rate corresponding to the TBS value in the second transport block size table is not lower than a coding rate corresponding to the TBS value in the first transport block size table.

Alternatively, a TBS value in the second transport block size table is compared with a TBS value in the same position in the first transport block size table, and the TBS value in the second transport block size table may also be smaller than the TBS value in the first transport block size table, so that a coding rate corresponding to the TBS value in the second transport block size table is lower than a coding rate corresponding to the TBS value in the first transport block size table. In this case, the second transport block size table can be applied in a scenario in which a system overhead is greater than a system overhead of a LTE REL.8 system, and when the base station performs coding according to the TBS value in the second transport block size table, the coding rate can be reduced to be closer to a desired coding rate of the system.

104. The base station sends the service data to the UE using the determined TBS.

The base station modulates the service data to the TBS that is determined according to the second transport block size table or the first transport block size table, and sends the modulated the service data to the UE.

105. The base station sends a system scheduling control signal to the UE, where the system scheduling control signal includes the modulation and coding scheme level and the time-frequency resource.

The base station sends, to the UE, the system scheduling control signal that includes the MCS level and the time-frequency resource determined by the base station, so that the UE can correctly receive the service data from the base station according to the MCS level and the time-frequency resource. This step may further be executed before step 104.

In the data transmission method of this embodiment, a base station determines a modulation and coding scheme level, determines a time-frequency resource, determines the number of physical resource block pairs according to the time-frequency resource, selects one transport block size table from a first transport block size table and a second transport block size table, and determines a corresponding transport block size TBS in the selected first transport block size table or the selected second transport block size table according to the modulation and coding scheme level and the number of the physical resource block pairs, where any TBS in the second transport block size table is not smaller than a TBS in a corresponding position in the first transport block size table; and the base station sends the service data to the UE using the determined TBS, and sends a system scheduling control signal to the UE, where the system scheduling control signal includes the modulation and coding scheme level and the time-frequency resource. In this way, the base station implements selection of a transport block size table, so that a coding rate can be improved when the base station transmits the service data to the UE according to the TBS in the selected second transport block size table.

Optionally, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

The first transport block size table may include a layer-1 data transport block size table in LTE REL.8, and the layer-1 data transport block size table in LTE REL.8 is shown in Table 1.

TABLE 1

Layer-1 data transport block size table in LTE REL.8

| ITBS | NPRB | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |

TABLE 1-continued

Layer-1 data transport block size table in LTE REL.8

| | | | | | | | | | |
|---|---|---|---|---|---|---|---|---|---|
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |

TABLE 1-continued

Layer-1 data transport block size table in LTE REL.8

| 26 | 15264 | 16416 | 16992 | 17568 | 18336 | 19080 | 19848 | 20616 | 21384 | 22152 |

| | | | | | NPRB | | | | | |
|---|---|---|---|---|---|---|---|---|---|---|
| ITBS | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 17568 | 18336 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22152 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

| | | | | | NPRB | | | | | |
|---|---|---|---|---|---|---|---|---|---|---|
| ITBS | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

| | | | | | NPRB | | | | | |
|---|---|---|---|---|---|---|---|---|---|---|
| ITBS | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2600 | 2664 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |

TABLE 1-continued

Layer-1 data transport block size table in LTE REL.8

| | | | | | | | | | | |
|---|---|---|---|---|---|---|---|---|---|---|
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 21384 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 18336 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |

TABLE 1-continued

Layer-1 data transport block size table in LTE REL.8

| ITBS | | | | | | | | | |
|---|---|---|---|---|---|---|---|---|---|
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15840 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |

TABLE 1-continued

Layer-1 data transport block size table in LTE REL.8

| 4 | 7224 | 7224 | 7480 | 7480 | 7480 | 7480 | 7736 | 7736 | 7736 | 7992 |
|---|------|------|------|------|------|------|------|------|------|------|
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

In the first transport block size table, $N_{PRB}$ represents the number of physical resource block pairs, $I_{TBS}$ represents a TBS index value, and an element in the table represents a transport block size TBS.

A TBS included in the maximum modulation and coding scheme level in the first transport block size table may be a TBS corresponding to the set coding rate, and all TBSs corresponding to the set coding rate may be included in all TBSs corresponding to $I_{TBS}$ of 0 to 25 in the foregoing Table 1, as shown in Table 2-1; or TBSs corresponding to the set coding rate may further be included in all TBSs corresponding to $I_{TBS}$ of 0 to 25 in the foregoing Table 1 or be included in a layer-2 data transport block size table, as shown in Table 2-2; or, none of TBSs corresponding to the set coding rate or some of TBSs corresponding to the set coding rate may be included in all TBSs corresponding to $I_{TBS}$ of 0 to 25 in the foregoing Table 1 or be included in the layer-2 data transport block size table, as shown in Table 2-3.

TABLE 2-1

Layer-1 data transport block size table for optimizing TBSs included in the maximum modulation and coding scheme level in LTE REL.8

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 26 | 840 | 1672 | 2536 | 3368 | 4264 | 5160 | 5992 | 6712 | 7736 | 8504 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 26 | 9144 | 10296 | 11064 | 11832 | 12960 | 13536 | 14688 | 15264 | 16416 | 16992 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 26 | 17568 | 18336 | 19848 | 20616 | 21384 | 22152 | 22920 | 23688 | 24496 | 25456 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 26 | 26416 | 27376 | 28336 | 29296 | 29296 | 30576 | 31704 | 32856 | 32856 | 34008 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 26 | 35160 | 35160 | 36696 | 37888 | 37888 | 39232 | 40576 | 40576 | 42368 | 42368 |

TABLE 2-1-continued

Layer-1 data transport block size table for optimizing TBSs included in the maximum modulation and coding scheme level in LTE REL.8

| ITBS | NPRB | | | | | | | | | |
|---|---|---|---|---|---|---|---|---|---|---|
| | 51 | 52 | 53 | 54 | 55 | 56 | 57 | 58 | 59 | 60 |
| 26 | 43816 | 43816 | 45352 | 45352 | 46888 | 46888 | 48936 | 48936 | 51024 | 51024 |

| ITBS | NPRB | | | | | | | | | |
|---|---|---|---|---|---|---|---|---|---|---|
| | 61 | 62 | 63 | 64 | 65 | 66 | 67 | 68 | 69 | 70 |
| 26 | 52752 | 52752 | 52752 | 55056 | 55056 | 55056 | 57336 | 57336 | 59256 | 59256 |

| ITBS | NPRB | | | | | | | | | |
|---|---|---|---|---|---|---|---|---|---|---|
| | 71 | 72 | 73 | 74 | 75 | 76 | 77 | 78 | 79 | 80 |
| 26 | 59256 | 61664 | 61664 | 63776 | 63776 | 63776 | 66592 | 66592 | 66592 | 68808 |

| ITBS | NPRB | | | | | | | | | |
|---|---|---|---|---|---|---|---|---|---|---|
| | 81 | 82 | 83 | 84 | 85 | 86 | 87 | 88 | 89 | 90 |
| 26 | 68808 | 68808 | 71112 | 71112 | 71112 | 73712 | 75376 | 75376 | 75376 | 75376 |

| ITBS | NPRB | | | | | | | | | |
|---|---|---|---|---|---|---|---|---|---|---|
| | 91 | 92 | 93 | 94 | 95 | 96 | 97 | 98 | 99 | 100 |
| 26 | 75376 | 75376 | 75376 | 75376 | 75376 | 75376 | 75376 | 75376 | 75376 | 75376 |

| ITBS | NPRB | | | | | | | | | |
|---|---|---|---|---|---|---|---|---|---|---|
| | 101 | 102 | 103 | 104 | 105 | 106 | 107 | 108 | 109 | 110 |
| 26 | 75376 | 75376 | 75376 | 75376 | 75376 | 75376 | 75376 | 75376 | 75376 | 75376 |

TABLE 2-2

Layer-1 data transport block size table for optimizing TBSs included in the maximum modulation and coding scheme level in LTE REL.8

| ITBS | NPRB | | | | | | | | | |
|---|---|---|---|---|---|---|---|---|---|---|
| | 1 | 2 | 3 | 4 | 5 | 6 | 7 | 8 | 9 | 10 |
| 26 | 840 | 1672 | 2536 | 3368 | 4264 | 5160 | 5992 | 6712 | 7736 | 8504 |

| ITBS | NPRB | | | | | | | | | |
|---|---|---|---|---|---|---|---|---|---|---|
| | 11 | 12 | 13 | 14 | 15 | 16 | 17 | 18 | 19 | 20 |
| 26 | 9144 | 10296 | 11064 | 11832 | 12960 | 13536 | 14688 | 15264 | 16416 | 16992 |

| ITBS | NPRB | | | | | | | | | |
|---|---|---|---|---|---|---|---|---|---|---|
| | 21 | 22 | 23 | 24 | 25 | 26 | 27 | 28 | 29 | 30 |
| 26 | 17568 | 18336 | 19848 | 20616 | 21384 | 22152 | 22920 | 23688 | 24496 | 25456 |

| ITBS | NPRB | | | | | | | | | |
|---|---|---|---|---|---|---|---|---|---|---|
| | 31 | 32 | 33 | 34 | 35 | 36 | 37 | 38 | 39 | 40 |
| 26 | 26416 | 27376 | 28336 | 29296 | 29296 | 30576 | 31704 | 32856 | 32856 | 34008 |

| ITBS | NPRB | | | | | | | | | |
|---|---|---|---|---|---|---|---|---|---|---|
| | 41 | 42 | 43 | 44 | 45 | 46 | 47 | 48 | 49 | 50 |
| 26 | 35160 | 35160 | 36696 | 37888 | 37888 | 39232 | 40576 | 40576 | 42368 | 42368 |

TABLE 2-2-continued

Layer-1 data transport block size table for optimizing TBSs included in the maximum modulation and coding scheme level in LTE REL.8

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 26 | 43816 | 43816 | 45352 | 45352 | 46888 | 46888 | 48936 | 48936 | 51024 | 51024 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 26 | 52752 | 52752 | 52752 | 55056 | 55056 | 55056 | 57336 | 57336 | 59256 | 59256 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 26 | 59256 | 61664 | 61664 | 63776 | 63776 | 63776 | 66592 | 66592 | 66592 | 68808 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 26 | 68808 | 68808 | 71112 | 71112 | 71112 | 73712 | 75376 | 76208 | 76208 | 76208 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 26 | 78704 | 78704 | 78704 | 81176 | 81176 | 81176 | 81176 | 84760 | 84760 | 84760 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 26 | 84760 | 87936 | 87936 | 87936 | 90816 | 90816 | 90816 | 90816 | 93800 | 93800 |

TABLE 2-3

Layer-1 data transport block size table for optimizing TBSs included in the maximum modulation and coding scheme level in LTE REL.8

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 26 | 840 | 1704 | 2536 | 3432 | 4328 | 5160 | 6056 | 6840 | 7736 | 8632 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 26 | 9400 | 10296 | 11192 | 12088 | 12960 | 13728 | 14688 | 15456 | 16416 | 17184 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 26 | 18144 | 18824 | 19848 | 20616 | 21640 | 22408 | 23176 | 24200 | 24816 | 25776 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 26 | 26736 | 27696 | 28336 | 29296 | 30256 | 30936 | 31704 | 32856 | 33624 | 34392 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 26 | 35160 | 36312 | 36992 | 37888 | 38784 | 39680 | 40576 | 41472 | 42368 | 43304 |

TABLE 2-3-continued

Layer-1 data transport block size table for optimizing TBSs included in the maximum modulation and coding scheme level in LTE REL.8

| | | | | | NPRB | | | | | |
|---|---|---|---|---|---|---|---|---|---|---|
| ITBS | 51 | 52 | 53 | 54 | 55 | 56 | 57 | 58 | 59 | 60 |
| 26 | 43816 | 44840 | 45864 | 46376 | 47400 | 48424 | 49296 | 49872 | 51024 | 51600 |

| | | | | | NPRB | | | | | |
|---|---|---|---|---|---|---|---|---|---|---|
| ITBS | 61 | 62 | 63 | 64 | 65 | 66 | 67 | 68 | 69 | 70 |
| 26 | 52752 | 53328 | 54480 | 55056 | 56056 | 56696 | 57976 | 58616 | 59256 | 60536 |

| | | | | | NPRB | | | | | |
|---|---|---|---|---|---|---|---|---|---|---|
| ITBS | 71 | 72 | 73 | 74 | 75 | 76 | 77 | 78 | 79 | 80 |
| 26 | 61176 | 62368 | 63072 | 63776 | 64480 | 65184 | 66592 | 67296 | 68040 | 68808 |

| | | | | | NPRB | | | | | |
|---|---|---|---|---|---|---|---|---|---|---|
| ITBS | 81 | 82 | 83 | 84 | 85 | 86 | 87 | 88 | 89 | 90 |
| 26 | 69576 | 70344 | 71880 | 72648 | 73416 | 73712 | 75376 | 76208 | 77040 | 77872 |

| | | | | | NPRB | | | | | |
|---|---|---|---|---|---|---|---|---|---|---|
| ITBS | 91 | 92 | 93 | 94 | 95 | 96 | 97 | 98 | 99 | 100 |
| 26 | 78704 | 79536 | 80280 | 81176 | 82072 | 82968 | 83864 | 84760 | 85656 | 86016 |

| | | | | | NPRB | | | | | |
|---|---|---|---|---|---|---|---|---|---|---|
| ITBS | 101 | 102 | 103 | 104 | 105 | 106 | 107 | 108 | 109 | 110 |
| 26 | 86976 | 87936 | 88896 | 89856 | 90816 | 91776 | 91776 | 92776 | 93800 | 94824 |

In an LTE REL.8 system with a system overhead of 48 resource elements, a coding rate for performing coding on the service data using a TBS in the foregoing Table 2-1, Table 2-2, and Table 2-3 may be an effective coding rate, where the effective coding rate, for example, may be 0.93.

A TBS included in the maximum modulation and coding scheme level in the second transport block size table may further be a TBS corresponding to the set coding rate, where the set coding rate, for example, may be 0.93, so that in an LTE REL.12 system with a system overhead of 12 resource elements, a coding rate corresponding to a TBS included in the maximum modulation and coding scheme level in the second transport block size table is an effective coding rate. In other embodiments, when a requirement of the system for a bit error rate is changed or in other cases, the set coding rate may further be another value, which is not limited herein.

Further, the selecting, by the base station, one transport block size table from the first transport block size table and the second transport block size table may further include selecting, by the base station, one transport block size table from the first transport block size table and the second transport block size table according to a system configuration parameter or a system overhead.

When the base station selects one transport block size table from the first transport block size table and the second transport block size table, the base station may select the first transport block size table or the second transport block size table according to the system configuration parameter, further select a TBS in the first transport block size table or the second transport block size table, and perform coding on the service data according to the TBS and transmit the coded service data to the UE.

For example, when the system configuration parameter indicates that control signaling includes a physical downlink control channel, the base station selects the first transport block size table, so that a coding rate when the base station transmits the service data to the UE using the TBS in the first transport block size table is closer to a desired coding rate of the base station, where the desired coding rate may be a coding rate corresponding to the determined modulation and coding scheme level and the determined number of physical resource block pairs in LTE REL.8, or the desired target coding rate may also be an optimized coding rate of the coding rate corresponding to the determined modulation and coding scheme level in LTE REL.8. Table 3 shows the optimized coding rate of the coding rate corresponding to the modulation and coding scheme level in LTE REL.8.

TABLE 3

Optimized coding rate of the coding rate corresponding to the modulation and coding scheme level in LTE REL.8

| Modulation and Coding Scheme Level | Coding Rate |
|---|---|
| 0 | 0.1172 |
| 1 | 0.1533 |
| 2 | 0.1885 |
| 3 | 0.2451 |
| 4 | 0.3008 |
| 5 | 0.3701 |
| 6 | 0.4385 |
| 7 | 0.5137 |
| 8 | 0.5879 |
| 9 | 0.6631 |
| 10 | 0.3316 |
| 11 | 0.3691 |

TABLE 3-continued

Optimized coding rate of the coding rate corresponding to the modulation and coding scheme level in LTE REL.8

| Modulation and Coding Scheme Level | Coding Rate |
|---|---|
| 12 | 0.4238 |
| 13 | 0.4785 |
| 14 | 0.54 |
| 15 | 0.6016 |
| 16 | 0.6426 |
| 17 | 0.4284 |
| 18 | 0.4551 |
| 19 | 0.5049 |
| 20 | 0.5537 |
| 21 | 0.6016 |
| 22 | 0.6504 |
| 23 | 0.7021 |
| 24 | 0.7539 |
| 25 | 0.8027 |
| 26 | 0.8525 |
| 27 | 0.8887 |
| 28 | 0.9258 |

When the system configuration parameter indicates that the control signaling does not include a physical downlink control channel, the base station selects the second transport block size table, so that the coding rate corresponding to the TBS in the second transport block size table and used by the base station is closer to the desired coding rate of the base station.

The base station may further select the first transport block size table or the second transport block size table according to the system overhead. For example, when the system overhead is 48 resource elements, the base station selects the first transport block size table; and when the system overhead is 12 resource elements, the base station selects the second transport block size table.

Optionally, the base station transmits a higher-layer signaling message to the UE, where the higher-layer signaling message carries instruction information that instructs selection of the first transport block size table or the second transport block size table.

The base station may predetermine, according to the system overhead, which transport block size table is suitable for the base station, so that the coding rate reached when the base station transmits the service data using a TBS in the transport block size table is closest to the desired coding rate of the base station. In this case, the higher-layer signaling message that the base station transmits to the UE may carry instruction information that instructs the UE to select the first transport block size table or the second transport block size table, to instruct, using the instruction information, the UE to receive the service data according to the TBS in the first transport block size table or the second transport block size table.

Optionally, the base station sends a downlink control message to the UE, where the downlink control message carries instruction information that instructs selection of the first transport block size table or the second transport block size table, which may increase a speed of the base station in switching between different selections.

Optionally, all TBSs in the second transport block size table may be included in TBSs in the first transport block size table.

Still further, on the basis of the foregoing embodiment, any TBS in the second transport block size table may be a TBS in the first transport block size table, corresponding to a coding rate closest to a target coding rate.

When a TBS is determined in the second transport block size table, the determined TBS value is a TBS in the first transport block size table, and a coding rate corresponding to the determined TBS value in the LTE REL.12 system with the system overhead of 12 resource elements (REs) is closer to the target coding rate than coding rates corresponding to other TBSs in the first transport block size table in the LTE REL.12 system with the system overhead of 12 REs, where the target coding rate may be a coding rate corresponding to the modulation and coding scheme level and the number of physical resource block pairs in LTE REL.8. The second transport block size table in this embodiment may be shown in Table 4.

TABLE 4

Second transport block size table-1

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 0 | 24 | 56 | 72 | 120 | 152 | 208 | 224 | 280 | 296 | 336 |
| 1 | 40 | 72 | 120 | 208 | 224 | 280 | 296 | 344 | 440 | 456 |
| 2 | 56 | 104 | 208 | 224 | 280 | 336 | 392 | 440 | 488 | 552 |
| 3 | 56 | 144 | 224 | 280 | 336 | 440 | 520 | 584 | 648 | 744 |
| 4 | 72 | 152 | 280 | 344 | 440 | 536 | 648 | 712 | 840 | 904 |
| 5 | 104 | 208 | 296 | 440 | 552 | 648 | 776 | 904 | 1000 | 1128 |
| 6 | 328 | 224 | 336 | 520 | 648 | 776 | 936 | 1064 | 1224 | 1352 |
| 7 | 144 | 296 | 440 | 616 | 776 | 936 | 1096 | 1256 | 1416 | 1608 |
| 8 | 152 | 344 | 520 | 712 | 904 | 1064 | 1256 | 1416 | 1608 | 1800 |
| 9 | 176 | 392 | 600 | 808 | 1000 | 1224 | 1416 | 1608 | 1864 | 2024 |
| 10 | 208 | 440 | 648 | 904 | 1128 | 1352 | 1608 | 1800 | 2024 | 2280 |
| 11 | 224 | 504 | 776 | 1032 | 1320 | 1544 | 1800 | 2088 | 2344 | 2664 |
| 12 | 280 | 584 | 904 | 1192 | 1480 | 1736 | 2088 | 2344 | 2664 | 2984 |
| 13 | 296 | 648 | 968 | 1320 | 1608 | 2024 | 2344 | 2664 | 2984 | 3240 |
| 14 | 344 | 712 | 1096 | 1480 | 1864 | 2280 | 2600 | 2984 | 3368 | 3752 |
| 15 | 376 | 776 | 1192 | 1608 | 2024 | 2344 | 2792 | 3240 | 3496 | 4008 |
| 16 | 440 | 840 | 1256 | 1672 | 2088 | 2536 | 2984 | 3368 | 3880 | 4264 |
| 17 | 440 | 904 | 1384 | 1864 | 2344 | 2792 | 3240 | 3752 | 4264 | 4776 |
| 18 | 504 | 1032 | 1544 | 2024 | 2600 | 3112 | 3624 | 4008 | 4776 | 5160 |
| 19 | 536 | 1096 | 1672 | 2280 | 2792 | 3368 | 3880 | 4584 | 4968 | 5544 |
| 20 | 584 | 1192 | 1800 | 2408 | 3112 | 3624 | 4264 | 4968 | 5352 | 5992 |
| 21 | 648 | 1320 | 1928 | 2600 | 3240 | 3880 | 4584 | 5160 | 5992 | 6456 |
| 22 | 680 | 1384 | 2088 | 2792 | 3496 | 4264 | 4968 | 5544 | 6200 | 6968 |
| 23 | 712 | 1480 | 2280 | 2984 | 3752 | 4584 | 5160 | 5992 | 6712 | 7480 |

TABLE 4-continued

Second transport block size table-1

| ITBS | 1 | 2 | 3 | 4 | 5 | 6 | 7 | 8 | 9 | 10 |
|---|---|---|---|---|---|---|---|---|---|---|
| 24 | 776 | 1544 | 2344 | 3112 | 3880 | 4776 | 5544 | 6456 | 7224 | 7736 |
| 25 | 808 | 1672 | 2408 | 3368 | 4008 | 4968 | 5736 | 6712 | 7480 | 7992 |
| 26 | 936 | 1928 | 2856 | 3880 | 4968 | 5736 | 6712 | 7736 | 8760 | 9912 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 0 | 376 | 440 | 456 | 488 | 520 | 552 | 600 | 648 | 648 | 712 |
| 1 | 488 | 552 | 600 | 648 | 680 | 744 | 776 | 840 | 904 | 936 |
| 2 | 616 | 680 | 744 | 808 | 840 | 904 | 968 | 1000 | 1096 | 1128 |
| 3 | 808 | 904 | 968 | 1064 | 1128 | 1192 | 1256 | 1352 | 1416 | 1544 |
| 4 | 1000 | 1096 | 1192 | 1320 | 1384 | 1480 | 1544 | 1672 | 1736 | 1864 |
| 5 | 1256 | 1352 | 1480 | 1608 | 1736 | 1800 | 1928 | 2024 | 2152 | 2280 |
| 6 | 1480 | 1608 | 1736 | 1928 | 2024 | 2152 | 2280 | 2408 | 2600 | 2728 |
| 7 | 1736 | 1928 | 2088 | 2152 | 2344 | 2536 | 2728 | 2856 | 3112 | 3240 |
| 8 | 2024 | 2152 | 2344 | 2536 | 2728 | 2856 | 3112 | 3240 | 3496 | 3624 |
| 9 | 2280 | 2408 | 2664 | 2856 | 3112 | 3240 | 3496 | 3752 | 3880 | 4008 |
| 10 | 2536 | 2728 | 2984 | 3240 | 3496 | 3624 | 3880 | 4008 | 4392 | 4584 |
| 11 | 2856 | 3112 | 3368 | 3624 | 3880 | 4264 | 4584 | 4776 | 4968 | 5160 |
| 12 | 3240 | 3496 | 3880 | 4264 | 4392 | 4776 | 4968 | 5352 | 5736 | 5992 |
| 13 | 3752 | 4008 | 4392 | 4776 | 4968 | 5352 | 5736 | 5992 | 6456 | 6712 |
| 14 | 4008 | 4584 | 4968 | 5160 | 5544 | 5992 | 6456 | 6712 | 7224 | 7480 |
| 15 | 4392 | 4776 | 5160 | 5544 | 5992 | 6456 | 6712 | 7224 | 7480 | 7992 |
| 16 | 4776 | 4968 | 5544 | 5992 | 6456 | 6712 | 7224 | 7736 | 7992 | 8504 |
| 17 | 5160 | 5736 | 6200 | 6712 | 6968 | 7480 | 7992 | 8504 | 8760 | 9528 |
| 18 | 5736 | 6200 | 6712 | 7224 | 7736 | 7992 | 8760 | 9528 | 9912 | 10296 |
| 19 | 6200 | 6712 | 7224 | 7736 | 8504 | 9144 | 9528 | 9912 | 10680 | 11064 |
| 20 | 6712 | 7224 | 7736 | 8504 | 9144 | 9912 | 10296 | 10680 | 11448 | 11832 |
| 21 | 7224 | 7736 | 8504 | 9144 | 9912 | 10296 | 11064 | 11832 | 12216 | 12960 |
| 22 | 7736 | 8504 | 9144 | 9912 | 10296 | 11064 | 11832 | 12216 | 13536 | 14112 |
| 23 | 7992 | 9144 | 9912 | 10296 | 11064 | 11832 | 12960 | 13536 | 14112 | 14688 |
| 24 | 8760 | 9528 | 10296 | 11064 | 11832 | 12960 | 13536 | 14112 | 14688 | 15840 |
| 25 | 9144 | 9912 | 10680 | 11448 | 12216 | 13536 | 14112 | 14688 | 15840 | 16416 |
| 26 | 10680 | 11448 | 12216 | 13536 | 14112 | 15264 | 16416 | 17568 | 18336 | 19080 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 0 | 744 | 776 | 808 | 840 | 904 | 936 | 968 | 1000 | 1000 | 1064 |
| 1 | 968 | 1000 | 1064 | 1128 | 1192 | 1224 | 1256 | 1320 | 1352 | 1384 |
| 2 | 1224 | 1256 | 1320 | 1384 | 1416 | 1544 | 1544 | 1608 | 1672 | 1736 |
| 3 | 1608 | 1672 | 1736 | 1800 | 1864 | 1928 | 2024 | 2088 | 2152 | 2280 |
| 4 | 1928 | 2024 | 2088 | 2280 | 2344 | 2408 | 2536 | 2600 | 2728 | 2792 |
| 5 | 2408 | 2536 | 2664 | 2728 | 2856 | 2984 | 3112 | 3240 | 3240 | 3496 |
| 6 | 2856 | 2984 | 3112 | 3240 | 3368 | 3496 | 3624 | 3880 | 3880 | 4008 |
| 7 | 3240 | 3496 | 3624 | 3880 | 4008 | 4264 | 4392 | 4392 | 4584 | 4776 |
| 8 | 3880 | 4008 | 4264 | 4392 | 4584 | 4776 | 4968 | 4968 | 5160 | 5544 |
| 9 | 4392 | 4584 | 4776 | 4968 | 5160 | 5352 | 5544 | 5736 | 5992 | 6200 |
| 10 | 4968 | 4968 | 5160 | 5544 | 5736 | 5992 | 6200 | 6456 | 6712 | 6968 |
| 11 | 5544 | 5736 | 5992 | 6200 | 6456 | 6968 | 7224 | 7480 | 7736 | 7736 |
| 12 | 6200 | 6456 | 6968 | 7224 | 7480 | 7736 | 7992 | 8504 | 8760 | 8760 |
| 13 | 6968 | 7480 | 7736 | 7992 | 8504 | 8760 | 9144 | 9528 | 9912 | 9912 |
| 14 | 7736 | 7992 | 8504 | 9144 | 9528 | 9912 | 9912 | 10296 | 10680 | 11064 |
| 15 | 8504 | 8760 | 9144 | 9528 | 9912 | 10296 | 10680 | 11064 | 11448 | 11832 |
| 16 | 8760 | 9528 | 9912 | 9912 | 10296 | 11064 | 11448 | 11832 | 12576 | 12960 |
| 17 | 9912 | 10296 | 10680 | 11448 | 11832 | 12216 | 12960 | 13536 | 13536 | 14112 |
| 18 | 10680 | 11448 | 11832 | 12576 | 12960 | 13536 | 14112 | 14112 | 14688 | 15264 |
| 19 | 11832 | 12576 | 12960 | 13536 | 14112 | 14112 | 14688 | 15840 | 16416 | 16992 |
| 20 | 12960 | 13536 | 14112 | 14112 | 14688 | 15840 | 16416 | 16992 | 17568 | 18336 |
| 21 | 14112 | 14112 | 14688 | 15840 | 16416 | 16992 | 17568 | 18336 | 19080 | 19848 |
| 22 | 14688 | 15264 | 16416 | 16992 | 17568 | 18336 | 19080 | 19848 | 20616 | 21384 |
| 23 | 15840 | 16416 | 16992 | 17568 | 18336 | 19080 | 19848 | 20616 | 21384 | 22152 |
| 24 | 16992 | 17568 | 18336 | 19080 | 19848 | 20616 | 21384 | 22152 | 22920 | 23688 |
| 25 | 17568 | 18336 | 19080 | 19848 | 20616 | 21384 | 22152 | 22920 | 23688 | 24496 |
| 26 | 19848 | 21384 | 22152 | 22920 | 23688 | 24496 | 25456 | 26416 | 27376 | 28336 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1128 | 1192 | 1224 | 1256 | 1320 | 1352 | 1352 | 1384 | 1416 |
| 1 | 1480 | 1544 | 1544 | 1608 | 1672 | 1672 | 1736 | 1800 | 1864 | 1864 |
| 2 | 1800 | 1864 | 1928 | 2024 | 2024 | 2088 | 2152 | 2152 | 2280 | 2344 |
| 3 | 2344 | 2408 | 2536 | 2600 | 2664 | 2728 | 2792 | 2856 | 2984 | 3112 |
| 4 | 2856 | 2984 | 3112 | 3112 | 3240 | 3368 | 3496 | 3496 | 3624 | 3752 |
| 5 | 3496 | 3624 | 3752 | 3880 | 4008 | 4008 | 4264 | 4392 | 4584 | 4584 |

TABLE 4-continued

Second transport block size table-1

| ITBS | | | | | | | | | | |
|---|---|---|---|---|---|---|---|---|---|---|
| 6 | 4264 | 4392 | 4584 | 4584 | 4776 | 4968 | 4968 | 5160 | 5352 | 5352 |
| 7 | 4968 | 4968 | 5160 | 5352 | 5544 | 5736 | 5992 | 5992 | 6200 | 6456 |
| 8 | 5736 | 5992 | 5992 | 6200 | 6456 | 6456 | 6712 | 6968 | 7224 | 7224 |
| 9 | 6456 | 6712 | 6712 | 6968 | 7224 | 7480 | 7480 | 7736 | 7992 | 7992 |
| 10 | 7224 | 7480 | 7480 | 7736 | 7992 | 7992 | 8504 | 8760 | 8760 | 9144 |
| 11 | 7992 | 8504 | 8760 | 9144 | 9144 | 9528 | 9912 | 9912 | 9912 | 10296 |
| 12 | 9144 | 9528 | 9912 | 9912 | 10296 | 10680 | 11064 | 11448 | 11448 | 11832 |
| 13 | 10296 | 10680 | 11064 | 11448 | 11832 | 11832 | 12576 | 12960 | 12960 | 13536 |
| 14 | 11448 | 11832 | 12576 | 12960 | 12960 | 13536 | 14112 | 14112 | 14112 | 14688 |
| 15 | 12576 | 12960 | 13536 | 13536 | 14112 | 14112 | 14688 | 15264 | 15264 | 15840 |
| 16 | 12960 | 13536 | 14112 | 14112 | 14688 | 15264 | 15840 | 15840 | 16416 | 16992 |
| 17 | 14112 | 14688 | 15264 | 15840 | 16416 | 16992 | 17568 | 17568 | 18336 | 19080 |
| 18 | 15840 | 16416 | 16992 | 17568 | 18336 | 18336 | 19080 | 19848 | 19848 | 20616 |
| 19 | 17568 | 17568 | 18336 | 19080 | 19848 | 19848 | 20616 | 21384 | 22152 | 22152 |
| 20 | 19080 | 19080 | 19848 | 20616 | 21384 | 22152 | 22152 | 22920 | 23688 | 23688 |
| 21 | 20616 | 20616 | 21384 | 22152 | 22920 | 23688 | 23688 | 24496 | 25456 | 25456 |
| 22 | 22152 | 22152 | 22920 | 23688 | 24496 | 24496 | 25456 | 26416 | 27376 | 27376 |
| 23 | 22920 | 23688 | 24496 | 25456 | 25456 | 26416 | 27376 | 28336 | 28336 | 29296 |
| 24 | 24496 | 25456 | 25456 | 26416 | 27376 | 28336 | 29296 | 29296 | 30576 | 31704 |
| 25 | 25456 | 26416 | 26416 | 27376 | 28336 | 29296 | 30576 | 31704 | 31704 | 32856 |
| 26 | 29296 | 30576 | 31704 | 32856 | 32856 | 34008 | 35160 | 36696 | 37888 | 37888 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1544 | 1544 | 1608 | 1608 | 1672 | 1672 | 1736 | 1736 | 1800 |
| 1 | 1928 | 2024 | 2024 | 2088 | 2088 | 2152 | 2280 | 2280 | 2344 | 2344 |
| 2 | 2344 | 2408 | 2536 | 2600 | 2664 | 2728 | 2728 | 2792 | 2856 | 2856 |
| 3 | 3112 | 3240 | 3240 | 3368 | 3368 | 3496 | 3496 | 3624 | 3752 | 3752 |
| 4 | 3880 | 3880 | 4008 | 4008 | 4264 | 4264 | 4392 | 4584 | 4584 | 4776 |
| 5 | 4776 | 4968 | 4968 | 4968 | 5160 | 5160 | 5352 | 5544 | 5736 | 5736 |
| 6 | 5544 | 5736 | 5992 | 5992 | 6200 | 6200 | 6456 | 6456 | 6712 | 6712 |
| 7 | 6456 | 6712 | 6968 | 6968 | 7224 | 7480 | 7480 | 7736 | 7736 | 7992 |
| 8 | 7480 | 7736 | 7736 | 7992 | 7992 | 8504 | 8504 | 8760 | 9144 | 9144 |
| 9 | 8504 | 8760 | 8760 | 9144 | 9144 | 9528 | 9912 | 9912 | 9912 | 10296 |
| 10 | 9528 | 9912 | 9912 | 9912 | 10296 | 10296 | 10680 | 11064 | 11064 | 11448 |
| 11 | 10680 | 11064 | 11448 | 11448 | 11832 | 11832 | 12576 | 12576 | 12960 | 12960 |
| 12 | 12576 | 12216 | 12960 | 12960 | 13536 | 14112 | 14112 | 14112 | 14112 | 14688 |
| 13 | 14112 | 14112 | 14112 | 14688 | 14688 | 15264 | 15840 | 15840 | 16416 | 16992 |
| 14 | 15264 | 15840 | 15840 | 16416 | 16992 | 16992 | 17568 | 17568 | 18336 | 18336 |
| 15 | 16416 | 16992 | 16992 | 17568 | 17568 | 18336 | 19080 | 19080 | 19848 | 19848 |
| 16 | 17568 | 17568 | 18336 | 18336 | 19080 | 19080 | 19848 | 20616 | 20616 | 21384 |
| 17 | 19080 | 19848 | 19848 | 20616 | 21384 | 21384 | 22152 | 22920 | 22920 | 23688 |
| 18 | 21384 | 21384 | 22152 | 22920 | 22920 | 23688 | 23688 | 24496 | 24496 | 25456 |
| 19 | 22920 | 23688 | 23688 | 24496 | 24496 | 25456 | 26416 | 26416 | 27376 | 27376 |
| 20 | 24496 | 25456 | 25456 | 26416 | 26416 | 27376 | 28336 | 28336 | 29296 | 29296 |
| 21 | 26416 | 27376 | 27376 | 28336 | 29296 | 29296 | 30576 | 31704 | 31704 | 32856 |
| 22 | 28336 | 29296 | 29296 | 30576 | 31704 | 31704 | 32856 | 32856 | 34008 | 35160 |
| 23 | 30576 | 31704 | 31704 | 32856 | 32856 | 34008 | 35160 | 35160 | 36696 | 36696 |
| 24 | 32856 | 32856 | 34008 | 34008 | 35160 | 36696 | 36696 | 37888 | 37888 | 39232 |
| 25 | 34008 | 34008 | 35160 | 36696 | 36696 | 37888 | 37888 | 39232 | 40576 | 40576 |
| 26 | 39232 | 39232 | 40576 | 42368 | 42368 | 43816 | 45352 | 45352 | 46888 | 46888 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 0 | 1864 | 1864 | 1928 | 1928 | 2024 | 2024 | 2088 | 2088 | 2088 | 2152 |
| 1 | 2408 | 2408 | 2536 | 2600 | 2600 | 2664 | 2728 | 2728 | 2792 | 2792 |
| 2 | 2984 | 3112 | 3112 | 3112 | 3240 | 3240 | 3240 | 3496 | 3496 | 3496 |
| 3 | 3880 | 3880 | 4008 | 4008 | 4264 | 4264 | 4392 | 4392 | 4584 | 4584 |
| 4 | 4776 | 4968 | 4968 | 4968 | 5160 | 5160 | 5352 | 5352 | 5544 | 5544 |
| 5 | 5992 | 5992 | 6200 | 6200 | 6200 | 6456 | 6456 | 6712 | 6712 | 6968 |
| 6 | 6968 | 6968 | 7224 | 7480 | 7480 | 7736 | 7736 | 7992 | 7992 | 7992 |
| 7 | 7992 | 8504 | 8504 | 8760 | 8760 | 8760 | 9144 | 9144 | 9528 | 9528 |
| 8 | 9528 | 9528 | 9912 | 9912 | 9912 | 9912 | 10296 | 10296 | 10680 | 11064 |
| 9 | 10296 | 10680 | 10680 | 11064 | 11448 | 11448 | 11832 | 11832 | 11832 | 12216 |
| 10 | 11832 | 11832 | 11832 | 12216 | 12576 | 12960 | 12960 | 13536 | 13536 | 14112 |
| 11 | 13536 | 14112 | 14112 | 14112 | 14112 | 14688 | 14688 | 15264 | 15264 | 15840 |
| 12 | 15264 | 15264 | 15840 | 15840 | 16416 | 16416 | 16992 | 16992 | 17568 | 17568 |
| 13 | 16992 | 17568 | 17568 | 18336 | 18336 | 19080 | 19080 | 19080 | 19848 | 19848 |
| 14 | 19080 | 19080 | 19848 | 19848 | 20616 | 20616 | 20616 | 21384 | 22152 | 22152 |
| 15 | 20616 | 20616 | 21384 | 21384 | 22152 | 22152 | 22920 | 22920 | 23688 | 23688 |
| 16 | 21384 | 22152 | 22152 | 22920 | 22920 | 23688 | 23688 | 24496 | 24496 | 25456 |
| 17 | 23688 | 24496 | 24496 | 25456 | 25456 | 26416 | 26416 | 26416 | 27376 | 27376 |
| 18 | 25456 | 26416 | 27376 | 27376 | 28336 | 28336 | 29296 | 29296 | 30576 | 30576 |
| 19 | 28336 | 28336 | 29296 | 29296 | 30576 | 31704 | 31704 | 32856 | 32856 | 32856 |

TABLE 4-continued

Second transport block size table-1

| ITBS | | | | | | | | | |
|---|---|---|---|---|---|---|---|---|---|
| 20 | 30576 | 31704 | 31704 | 32856 | 32856 | 34008 | 34008 | 35160 | 35160 | 36696 |
| 21 | 32856 | 34008 | 34008 | 35160 | 35160 | 36696 | 36696 | 37888 | 37888 | 39232 |
| 22 | 35160 | 36696 | 36696 | 37888 | 37888 | 39232 | 39232 | 40576 | 40576 | 42368 |
| 23 | 37888 | 37888 | 39232 | 39232 | 40576 | 40576 | 42368 | 42368 | 43816 | 43816 |
| 24 | 40576 | 40576 | 42368 | 42368 | 43816 | 43816 | 45352 | 45352 | 46888 | 46888 |
| 25 | 42368 | 42368 | 43816 | 43816 | 45352 | 45352 | 46888 | 46888 | 48936 | 48936 |
| 26 | 48936 | 48936 | 51024 | 52752 | 52752 | 52752 | 55056 | 55056 | 57336 | 57336 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2152 | 2280 | 2280 | 2344 | 2344 | 2344 | 2408 | 2408 | 2536 | 2536 |
| 1 | 2856 | 2984 | 2984 | 3112 | 3112 | 3112 | 3240 | 3240 | 3240 | 3368 |
| 2 | 3496 | 3624 | 3752 | 3752 | 3752 | 3880 | 3880 | 4008 | 4008 | 4008 |
| 3 | 4776 | 4776 | 4776 | 4968 | 4968 | 4968 | 4968 | 5160 | 5160 | 5352 |
| 4 | 5736 | 5736 | 5992 | 5992 | 5992 | 6200 | 6200 | 6456 | 6456 | 6456 |
| 5 | 6968 | 7224 | 7224 | 7480 | 7480 | 7480 | 7736 | 7736 | 7736 | 7992 |
| 6 | 8504 | 8504 | 8504 | 8760 | 8760 | 9144 | 9144 | 9144 | 9528 | 9528 |
| 7 | 9912 | 9912 | 9912 | 9912 | 10296 | 10296 | 10680 | 10680 | 11064 | 11064 |
| 8 | 11064 | 11448 | 11448 | 11832 | 11832 | 11832 | 12216 | 12576 | 12576 | 12960 |
| 9 | 12216 | 12960 | 12960 | 13536 | 13536 | 13536 | 14112 | 14112 | 14112 | 14112 |
| 10 | 14112 | 14112 | 14112 | 14688 | 14688 | 14688 | 15264 | 15264 | 15840 | 15840 |
| 11 | 15840 | 16416 | 16416 | 16992 | 16992 | 17568 | 17568 | 17568 | 18336 | 18336 |
| 12 | 18336 | 18336 | 18336 | 19080 | 19080 | 19848 | 19848 | 19848 | 20616 | 20616 |
| 13 | 20616 | 20616 | 21384 | 21384 | 22152 | 22152 | 22152 | 22920 | 22920 | 23688 |
| 14 | 22920 | 22920 | 23688 | 23688 | 23688 | 24496 | 24496 | 25456 | 25456 | 25456 |
| 15 | 23688 | 24496 | 24496 | 25456 | 25456 | 26416 | 26416 | 26416 | 27376 | 27376 |
| 16 | 25456 | 25456 | 26416 | 26416 | 27376 | 27376 | 28336 | 28336 | 28336 | 29296 |
| 17 | 28336 | 28336 | 29296 | 29296 | 30576 | 30576 | 31704 | 31704 | 31704 | 32856 |
| 18 | 31704 | 31704 | 31704 | 32856 | 32856 | 34008 | 34008 | 35160 | 35160 | 35160 |
| 19 | 34008 | 34008 | 35160 | 35160 | 36696 | 36696 | 37888 | 37888 | 37888 | 39232 |
| 20 | 36696 | 37888 | 37888 | 37888 | 39232 | 39232 | 40576 | 40576 | 40576 | 42368 |
| 21 | 39232 | 40576 | 40576 | 40576 | 42368 | 42368 | 43816 | 43816 | 45352 | 45352 |
| 22 | 42368 | 43816 | 43816 | 43816 | 45352 | 45352 | 46888 | 46888 | 46888 | 48936 |
| 23 | 45352 | 45352 | 46888 | 46888 | 48936 | 48936 | 48936 | 51024 | 51024 | 52752 |
| 24 | 46888 | 48936 | 48936 | 51024 | 51024 | 52752 | 52752 | 55056 | 55056 | 55056 |
| 25 | 51024 | 51024 | 52752 | 52752 | 52752 | 55056 | 55056 | 57336 | 57336 | 57336 |
| 26 | 59256 | 59256 | 61664 | 61664 | 63776 | 63776 | 63776 | 66592 | 66592 | 68808 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2728 | 2728 | 2728 | 2792 | 2792 | 2856 | 2856 |
| 1 | 3368 | 3368 | 3496 | 3496 | 3496 | 3624 | 3624 | 3752 | 3752 | 3752 |
| 2 | 4264 | 4264 | 4264 | 4392 | 4392 | 4392 | 4584 | 4584 | 4584 | 4776 |
| 3 | 5352 | 5544 | 5544 | 5736 | 5736 | 5736 | 5992 | 5992 | 5992 | 6200 |
| 4 | 6712 | 6712 | 6712 | 6968 | 6968 | 7224 | 7224 | 7224 | 7480 | 7480 |
| 5 | 7992 | 7992 | 8504 | 8504 | 8760 | 8760 | 8760 | 9144 | 9144 | 9144 |
| 6 | 9912 | 9912 | 9912 | 9912 | 9912 | 10296 | 10296 | 10680 | 10680 | 10680 |
| 7 | 11448 | 11448 | 11448 | 11832 | 11832 | 11832 | 12216 | 12216 | 12576 | 12960 |
| 8 | 12960 | 12960 | 13536 | 13536 | 14112 | 14112 | 14112 | 14112 | 14112 | 14112 |
| 9 | 14112 | 14688 | 14688 | 15264 | 15264 | 15264 | 15840 | 15840 | 16416 | 16416 |
| 10 | 16416 | 16416 | 16992 | 16992 | 16992 | 17568 | 17568 | 17568 | 18336 | 18336 |
| 11 | 18336 | 19080 | 19080 | 19080 | 19848 | 19848 | 20616 | 20616 | 20616 | 21384 |
| 12 | 21384 | 21384 | 21384 | 22152 | 22152 | 22920 | 22920 | 22920 | 23688 | 23688 |
| 13 | 23688 | 23688 | 24496 | 24496 | 24496 | 25456 | 25456 | 25456 | 26416 | 26416 |
| 14 | 26416 | 26416 | 26416 | 27376 | 27376 | 28336 | 28336 | 28336 | 29296 | 29296 |
| 15 | 28336 | 28336 | 28336 | 29296 | 29296 | 30576 | 30576 | 30576 | 31704 | 31704 |
| 16 | 29296 | 30576 | 30576 | 31704 | 31704 | 31704 | 32856 | 32856 | 32856 | 34008 |
| 17 | 32856 | 34008 | 34008 | 34008 | 35160 | 35160 | 35160 | 36696 | 36696 | 37888 |
| 18 | 36696 | 36696 | 37888 | 37888 | 37888 | 39232 | 39232 | 39232 | 40576 | 40576 |
| 19 | 39232 | 39232 | 40576 | 40576 | 42368 | 42368 | 42368 | 43816 | 43816 | 43816 |
| 20 | 42368 | 43816 | 43816 | 43816 | 45352 | 45352 | 45352 | 46888 | 46888 | 46888 |
| 21 | 45352 | 46888 | 46888 | 46888 | 48936 | 48936 | 51024 | 51024 | 51024 | 52752 |
| 22 | 48936 | 51024 | 51024 | 52752 | 52752 | 52752 | 55056 | 55056 | 55056 | 57336 |
| 23 | 52752 | 52752 | 55056 | 55056 | 57336 | 57336 | 57336 | 59256 | 59256 | 59256 |
| 24 | 57336 | 57336 | 59256 | 59256 | 59256 | 61664 | 61664 | 61664 | 63776 | 63776 |
| 25 | 59256 | 59256 | 61664 | 61664 | 61664 | 63776 | 63776 | 63776 | 66592 | 66592 |
| 26 | 68808 | 68808 | 71112 | 71112 | 71112 | 71112 | 73712 | 73712 | 75376 | 75376 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2984 | 2984 | 2984 | 3112 | 3112 | 3112 | 3112 | 3240 | 3240 | 3240 |
| 1 | 3880 | 3880 | 3880 | 4008 | 4008 | 4008 | 4264 | 4264 | 4264 | 4264 |

TABLE 4-continued

Second transport block size table-1

| ITBS | | | | | | | | | | |
|---|---|---|---|---|---|---|---|---|---|---|
| 2 | 4776 | 4776 | 4968 | 4968 | 4968 | 4968 | 4968 | 5160 | 5160 | 5160 |
| 3 | 6200 | 6200 | 6200 | 6456 | 6456 | 6456 | 6712 | 6712 | 6712 | 6968 |
| 4 | 7480 | 7736 | 7736 | 7736 | 7736 | 7992 | 7992 | 7992 | 8504 | 8504 |
| 5 | 9528 | 9528 | 9528 | 9912 | 9912 | 9912 | 9912 | 9912 | 9912 | 10296 |
| 6 | 11064 | 11064 | 11448 | 11448 | 11448 | 11832 | 11832 | 11832 | 11832 | 12216 |
| 7 | 12960 | 12960 | 13536 | 13536 | 13536 | 14112 | 14112 | 14112 | 14112 | 14112 |
| 8 | 14688 | 14688 | 14688 | 15264 | 15264 | 15840 | 15840 | 15840 | 16416 | 16416 |
| 9 | 16992 | 16992 | 16992 | 17568 | 17568 | 17568 | 17568 | 18336 | 18336 | 18336 |
| 10 | 18336 | 19080 | 19080 | 19080 | 19080 | 19848 | 19848 | 19848 | 20616 | 20616 |
| 11 | 21384 | 21384 | 22152 | 22152 | 22152 | 22920 | 22920 | 22920 | 23688 | 23688 |
| 12 | 23688 | 24496 | 24496 | 24496 | 24496 | 25456 | 25456 | 25456 | 26416 | 26416 |
| 13 | 26416 | 27376 | 27376 | 27376 | 28336 | 28336 | 28336 | 29296 | 29296 | 29296 |
| 14 | 29296 | 30576 | 30576 | 31704 | 31704 | 31704 | 32856 | 32856 | 32856 | 32856 |
| 15 | 31704 | 32856 | 32856 | 32856 | 34008 | 34008 | 34008 | 35160 | 35160 | 35160 |
| 16 | 34008 | 34008 | 35160 | 35160 | 35160 | 36696 | 36696 | 36696 | 37888 | 37888 |
| 17 | 37888 | 37888 | 39232 | 39232 | 39232 | 39232 | 40576 | 40576 | 40576 | 42368 |
| 18 | 40576 | 42368 | 42368 | 42368 | 43816 | 43816 | 43816 | 45352 | 45352 | 45352 |
| 19 | 45352 | 45352 | 45352 | 46888 | 46888 | 46888 | 48936 | 48936 | 48936 | 51024 |
| 20 | 48936 | 48936 | 51024 | 51024 | 51024 | 52752 | 52752 | 52752 | 55056 | 55056 |
| 21 | 52752 | 52752 | 55056 | 55056 | 55056 | 57336 | 57336 | 57336 | 59256 | 59256 |
| 22 | 57336 | 57336 | 59256 | 59256 | 59256 | 61664 | 61664 | 61664 | 63776 | 63776 |
| 23 | 61664 | 61664 | 61664 | 63776 | 63776 | 63776 | 66592 | 66592 | 66592 | 66592 |
| 24 | 63776 | 66592 | 66592 | 66592 | 68808 | 68808 | 68808 | 68808 | 71112 | 71112 |
| 25 | 66592 | 68808 | 68808 | 68808 | 71112 | 71112 | 71112 | 71112 | 73712 | 73712 |
| 26 | 75376 | 75376 | 75376 | 75376 | 75376 | 75376 | 75376 | 75376 | 75376 | 75376 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 3240 | 3368 | 3368 | 3368 | 3496 | 3496 | 3496 | 3496 | 3496 | 3624 |
| 1 | 4392 | 4392 | 4392 | 4584 | 4584 | 4584 | 4584 | 4776 | 4776 | 4776 |
| 2 | 5352 | 5352 | 5352 | 5544 | 5544 | 5544 | 5736 | 5736 | 5736 | 5992 |
| 3 | 6968 | 6968 | 6968 | 7224 | 7224 | 7224 | 7480 | 7480 | 7480 | 7480 |
| 4 | 8504 | 8504 | 8760 | 8760 | 8760 | 9144 | 9144 | 9144 | 9144 | 9528 |
| 5 | 10296 | 10296 | 10680 | 10680 | 10680 | 11064 | 11064 | 11448 | 11448 | 11448 |
| 6 | 12576 | 12576 | 12576 | 12960 | 12960 | 12960 | 13536 | 13536 | 13536 | 13536 |
| 7 | 14112 | 14688 | 14688 | 14688 | 14688 | 15264 | 15264 | 15264 | 15840 | 15840 |
| 8 | 16416 | 16992 | 16992 | 16992 | 17568 | 17568 | 17568 | 17568 | 18336 | 18336 |
| 9 | 18336 | 19080 | 19080 | 19080 | 19848 | 19848 | 19848 | 20616 | 20616 | 20616 |
| 10 | 20616 | 21384 | 21384 | 21384 | 22152 | 22152 | 22152 | 22152 | 22920 | 22920 |
| 11 | 23688 | 23688 | 24496 | 24496 | 24496 | 24496 | 25456 | 25456 | 25456 | 25456 |
| 12 | 26416 | 27376 | 27376 | 27376 | 27376 | 28336 | 28336 | 28336 | 29296 | 29296 |
| 13 | 30576 | 30576 | 30576 | 31704 | 31704 | 31704 | 32856 | 32856 | 32856 | 32856 |
| 14 | 34008 | 34008 | 34008 | 35160 | 35160 | 35160 | 36696 | 36696 | 36696 | 36696 |
| 15 | 36696 | 36696 | 36696 | 37888 | 37888 | 37888 | 37888 | 39232 | 39232 | 39232 |
| 16 | 37888 | 39232 | 39232 | 39232 | 39232 | 40576 | 40576 | 40576 | 40576 | 42368 |
| 17 | 42368 | 42368 | 43816 | 43816 | 43816 | 45352 | 45352 | 45352 | 45352 | 46888 |
| 18 | 46888 | 46888 | 46888 | 48936 | 48936 | 48936 | 48936 | 51024 | 51024 | 51024 |
| 19 | 51024 | 51024 | 52752 | 52752 | 52752 | 52752 | 55056 | 55056 | 55056 | 57336 |
| 20 | 55056 | 55056 | 57336 | 57336 | 57336 | 59256 | 59256 | 59256 | 61664 | 61664 |
| 21 | 59256 | 61664 | 61664 | 61664 | 61664 | 63776 | 63776 | 63776 | 63776 | 66592 |
| 22 | 63776 | 63776 | 66592 | 66592 | 66592 | 66592 | 68808 | 68808 | 68808 | 71112 |
| 23 | 68808 | 68808 | 68808 | 71112 | 71112 | 71112 | 71112 | 73712 | 73712 | 73712 |
| 24 | 71112 | 73712 | 73712 | 73712 | 73712 | 75376 | 75376 | 75376 | 75376 | 75376 |
| 25 | 73712 | 75376 | 75376 | 75376 | 75376 | 75376 | 75376 | 75376 | 75376 | 75376 |
| 26 | 75376 | 75376 | 75376 | 75376 | 75376 | 75376 | 75376 | 75376 | 75376 | 75376 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 3624 | 3752 | 3752 | 3752 | 3880 | 3880 | 3880 | 3880 | 3880 | 4008 |
| 1 | 4968 | 4968 | 4968 | 4968 | 4968 | 4968 | 4968 | 5160 | 5160 | 5160 |
| 2 | 5992 | 5992 | 5992 | 5992 | 6200 | 6200 | 6200 | 6200 | 6456 | 6456 |
| 3 | 7736 | 7736 | 7736 | 7736 | 7992 | 7992 | 7992 | 7992 | 8504 | 8504 |
| 4 | 9528 | 9528 | 9912 | 9912 | 9912 | 9912 | 9912 | 9912 | 9912 | 10296 |
| 5 | 11448 | 11832 | 11832 | 11832 | 11832 | 12576 | 12216 | 12216 | 12576 | 12576 |
| 6 | 14112 | 14112 | 14112 | 14112 | 14112 | 14112 | 14112 | 14688 | 14688 | 14688 |
| 7 | 15840 | 16416 | 16416 | 16416 | 16992 | 16992 | 16992 | 16992 | 17568 | 17568 |
| 8 | 18336 | 18336 | 19080 | 19080 | 19080 | 19080 | 19848 | 19848 | 19848 | 19848 |
| 9 | 20616 | 21384 | 21384 | 21384 | 21384 | 22152 | 22152 | 22152 | 22152 | 22920 |
| 10 | 22920 | 23688 | 23688 | 23688 | 23688 | 23688 | 24496 | 24496 | 24496 | 24496 |
| 11 | 26416 | 26416 | 26416 | 27376 | 27376 | 27376 | 27376 | 28336 | 28336 | 28336 |
| 12 | 29296 | 30576 | 30576 | 30576 | 30576 | 31704 | 31704 | 31704 | 31704 | 32856 |
| 13 | 34008 | 34008 | 34008 | 34008 | 35160 | 35160 | 35160 | 35160 | 36696 | 36696 |
| 14 | 37888 | 37888 | 37888 | 37888 | 39232 | 39232 | 39232 | 39232 | 40576 | 40576 |
| 15 | 39232 | 40576 | 40576 | 40576 | 40576 | 42368 | 42368 | 42368 | 43816 | 43816 |

TABLE 4-continued

Second transport block size table-1

| | | | | | | | | | | |
|---|---|---|---|---|---|---|---|---|---|---|
| 16 | 42368 | 42368 | 43816 | 43816 | 43816 | 43816 | 45352 | 45352 | 45352 | 45352 |
| 17 | 46888 | 46888 | 46888 | 48936 | 48936 | 48936 | 51024 | 51024 | 51024 | 51024 |
| 18 | 52752 | 52752 | 52752 | 52752 | 55056 | 55056 | 55056 | 55056 | 57336 | 57336 |
| 19 | 57336 | 57336 | 57336 | 59256 | 59256 | 59256 | 61664 | 61664 | 61664 | 61664 |
| 20 | 61664 | 61664 | 63776 | 63776 | 63776 | 63776 | 63776 | 66592 | 66592 | 66592 |
| 21 | 66592 | 66592 | 66592 | 68808 | 68808 | 68808 | 68808 | 71112 | 71112 | 71112 |
| 22 | 71112 | 71112 | 71112 | 75376 | 73712 | 75376 | 75376 | 75376 | 75376 | 75376 |
| 23 | 73712 | 75376 | 75376 | 75376 | 75376 | 75376 | 75376 | 75376 | 75376 | 75376 |
| 24 | 75376 | 75376 | 75376 | 75376 | 75376 | 75376 | 75376 | 75376 | 75376 | 75376 |
| 25 | 75376 | 75376 | 75376 | 75376 | 75376 | 75376 | 75376 | 75376 | 75376 | 75376 |
| 26 | 75376 | 75376 | 75376 | 75376 | 75376 | 75376 | 75376 | 75376 | 75376 | 75376 |

Alternatively, the second transport block size table may be shown in Table 5. When a TBS is determined in the second transport block size table shown in Table 5, the determined TBS value is a TBS in the first transport block size table, and a coding rate corresponding to the determined TBS value in the LTE REL.12 system with the system overhead of 12 REs is closer to the target coding rate than coding rates corresponding to other TBSs in the first transport block size table in the LTE REL.12 system with the system overhead of 12 REs, where the target coding rate may be the optimized coding rate of the coding rate corresponding to the modulation and coding scheme level in LTE REL.8 shown in Table 3.

TABLE 5

Second transport block size table-2

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 0 | 16 | 56 | 88 | 120 | 152 | 208 | 224 | 280 | 296 | 344 |
| 1 | 24 | 72 | 120 | 176 | 208 | 256 | 296 | 344 | 408 | 456 |
| 2 | 32 | 88 | 152 | 208 | 280 | 328 | 392 | 440 | 504 | 568 |
| 3 | 56 | 136 | 208 | 280 | 344 | 440 | 504 | 584 | 680 | 744 |
| 4 | 72 | 152 | 256 | 344 | 440 | 536 | 632 | 712 | 808 | 904 |
| 5 | 88 | 208 | 328 | 440 | 552 | 680 | 776 | 904 | 1000 | 1128 |
| 6 | 120 | 256 | 392 | 520 | 648 | 808 | 936 | 1064 | 1192 | 1352 |
| 7 | 136 | 296 | 456 | 616 | 776 | 936 | 1096 | 1256 | 1416 | 1608 |
| 8 | 152 | 344 | 520 | 712 | 904 | 1064 | 1256 | 1416 | 1608 | 1800 |
| 9 | 176 | 392 | 600 | 808 | 1000 | 1224 | 1416 | 1608 | 1864 | 2024 |
| 10 | 208 | 440 | 680 | 904 | 1128 | 1352 | 1608 | 1800 | 2024 | 2280 |
| 11 | 256 | 504 | 776 | 1032 | 1288 | 1544 | 1800 | 2088 | 2344 | 2600 |
| 12 | 280 | 568 | 872 | 1160 | 1480 | 1736 | 2088 | 2344 | 2664 | 2984 |
| 13 | 328 | 648 | 1000 | 1320 | 1672 | 1992 | 2344 | 2664 | 2984 | 3368 |
| 14 | 344 | 712 | 1096 | 1480 | 1864 | 2216 | 2600 | 2984 | 3368 | 3752 |
| 15 | 376 | 776 | 1192 | 1608 | 1992 | 2408 | 2792 | 3240 | 3624 | 4008 |
| 16 | 408 | 840 | 1256 | 1672 | 2088 | 2536 | 2984 | 3368 | 3752 | 4264 |
| 17 | 456 | 936 | 1384 | 1864 | 2344 | 2792 | 3240 | 3752 | 4264 | 4776 |
| 18 | 488 | 1000 | 1544 | 2024 | 2536 | 3112 | 3624 | 4136 | 4584 | 5160 |
| 19 | 536 | 1096 | 1672 | 2216 | 2792 | 3368 | 3880 | 4392 | 4968 | 5544 |
| 20 | 584 | 1192 | 1800 | 2408 | 2984 | 3624 | 4264 | 4776 | 5544 | 5992 |
| 21 | 632 | 1288 | 1928 | 2600 | 3240 | 3880 | 4584 | 5160 | 5992 | 6456 |
| 22 | 680 | 1384 | 2088 | 2792 | 3496 | 4264 | 4968 | 5544 | 6200 | 6968 |
| 23 | 712 | 1480 | 2216 | 2984 | 3752 | 4392 | 5160 | 5992 | 6712 | 7480 |
| 24 | 776 | 1544 | 2344 | 3112 | 4008 | 4776 | 5544 | 6200 | 7224 | 7992 |
| 25 | 808 | 1608 | 2472 | 3240 | 4136 | 4968 | 5736 | 6456 | 7480 | 8248 |
| 26 | 840 | 1736 | 2600 | 3496 | 4264 | 5160 | 5992 | 6968 | 7736 | 8504 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 0 | 376 | 408 | 456 | 488 | 520 | 568 | 600 | 632 | 680 | 712 |
| 1 | 504 | 552 | 600 | 648 | 696 | 744 | 776 | 840 | 872 | 936 |
| 2 | 616 | 680 | 744 | 808 | 872 | 904 | 968 | 1032 | 1096 | 1160 |
| 3 | 808 | 904 | 968 | 1032 | 1128 | 1192 | 1288 | 1352 | 1416 | 1480 |
| 4 | 1000 | 1096 | 1192 | 1288 | 1384 | 1480 | 1544 | 1672 | 1736 | 1864 |
| 5 | 1256 | 1352 | 1480 | 1608 | 1736 | 1800 | 1928 | 2024 | 2152 | 2280 |
| 6 | 1480 | 1608 | 1736 | 1864 | 2024 | 2152 | 2280 | 2408 | 2600 | 2728 |
| 7 | 1736 | 1928 | 2088 | 2216 | 2408 | 2536 | 2728 | 2856 | 2984 | 3240 |
| 8 | 1992 | 2152 | 2344 | 2536 | 2728 | 2856 | 3112 | 3240 | 3496 | 3624 |
| 9 | 2280 | 2472 | 2664 | 2856 | 3112 | 3240 | 3496 | 3752 | 3880 | 4136 |
| 10 | 2536 | 2728 | 2984 | 3240 | 3368 | 3624 | 3880 | 4136 | 4392 | 4584 |
| 11 | 2856 | 3112 | 3368 | 3624 | 3880 | 4264 | 4392 | 4776 | 4968 | 5352 |
| 12 | 3240 | 3496 | 3880 | 4136 | 4392 | 4776 | 4968 | 5352 | 5736 | 5992 |
| 13 | 3624 | 4008 | 4392 | 4776 | 4968 | 5352 | 5736 | 5992 | 6456 | 6712 |

TABLE 5-continued

Second transport block size table-2

| ITBS | | | | | | | | | |
|---|---|---|---|---|---|---|---|---|---|
| 14 | 4136 | 4392 | 4776 | 5160 | 5544 | 5992 | 6200 | 6712 | 6968 | 7480 |
| 15 | 4392 | 4776 | 5160 | 5544 | 5992 | 6456 | 6712 | 7224 | 7480 | 7992 |
| 16 | 4584 | 5160 | 5544 | 5992 | 6200 | 6712 | 7224 | 7480 | 7992 | 8504 |
| 17 | 5160 | 5736 | 5992 | 6456 | 6968 | 7480 | 7992 | 8504 | 8760 | 9528 |
| 18 | 5736 | 6200 | 6712 | 7224 | 7736 | 8248 | 8760 | 9144 | 9912 | 10296 |
| 19 | 6200 | 6712 | 7224 | 7736 | 8248 | 8760 | 9528 | 9912 | 10680 | 11064 |
| 20 | 6712 | 7224 | 7736 | 8504 | 9144 | 9528 | 10296 | 11064 | 11448 | 12216 |
| 21 | 7224 | 7736 | 8504 | 9144 | 9912 | 10296 | 11064 | 11832 | 12576 | 12960 |
| 22 | 7736 | 8504 | 9144 | 9912 | 10680 | 11064 | 11832 | 12576 | 13536 | 14112 |
| 23 | 8248 | 8760 | 9528 | 10296 | 11064 | 11832 | 12576 | 13536 | 14112 | 14688 |
| 24 | 8760 | 9528 | 10296 | 11064 | 11832 | 12576 | 13536 | 14112 | 15264 | 15840 |
| 25 | 9144 | 9912 | 10680 | 11448 | 12216 | 12960 | 14112 | 14688 | 15840 | 16416 |
| 26 | 9528 | 10296 | 11064 | 12216 | 12960 | 13536 | 14688 | 15264 | 16416 | 16992 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 0 | 744 | 776 | 808 | 840 | 904 | 936 | 968 | 1000 | 1032 | 1064 |
| 1 | 968 | 1032 | 1064 | 1128 | 1160 | 1224 | 1256 | 1320 | 1352 | 1416 |
| 2 | 1224 | 1256 | 1320 | 1384 | 1416 | 1480 | 1544 | 1608 | 1672 | 1736 |
| 3 | 1608 | 1672 | 1736 | 1800 | 1864 | 1992 | 2024 | 2088 | 2216 | 2280 |
| 4 | 1928 | 2024 | 2152 | 2216 | 2344 | 2408 | 2536 | 2600 | 2728 | 2792 |
| 5 | 2408 | 2536 | 2600 | 2728 | 2856 | 2984 | 3112 | 3240 | 3368 | 3496 |
| 6 | 2856 | 2984 | 3112 | 3240 | 3368 | 3496 | 3624 | 3752 | 3880 | 4136 |
| 7 | 3368 | 3496 | 3624 | 3880 | 4008 | 4136 | 4264 | 4392 | 4584 | 4776 |
| 8 | 3880 | 4008 | 4136 | 4392 | 4584 | 4776 | 4968 | 5160 | 5352 | 5544 |
| 9 | 4264 | 4584 | 4776 | 4968 | 5160 | 5352 | 5544 | 5736 | 5992 | 6200 |
| 10 | 4776 | 4968 | 5352 | 5544 | 5736 | 5992 | 6200 | 6456 | 6712 | 6712 |
| 11 | 5544 | 5736 | 5992 | 6200 | 6456 | 6712 | 6968 | 7224 | 7480 | 7736 |
| 12 | 6200 | 6456 | 6712 | 6968 | 7480 | 7736 | 7992 | 8248 | 8504 | 8760 |
| 13 | 6968 | 7224 | 7736 | 7992 | 8248 | 8760 | 9144 | 9528 | 9528 | 9912 |
| 14 | 7736 | 8248 | 8504 | 8760 | 9144 | 9528 | 9912 | 10296 | 10680 | 11064 |
| 15 | 8248 | 8760 | 9144 | 9528 | 9912 | 10296 | 10680 | 11064 | 11448 | 11832 |
| 16 | 8760 | 9144 | 9912 | 10296 | 10680 | 11064 | 11448 | 11832 | 12216 | 12576 |
| 17 | 9912 | 10296 | 10680 | 11448 | 11832 | 12216 | 12576 | 12960 | 13536 | 14112 |
| 18 | 10680 | 11448 | 11832 | 12216 | 12960 | 13536 | 14112 | 14688 | 14688 | 15264 |
| 19 | 11832 | 12216 | 12960 | 13536 | 14112 | 14688 | 15264 | 15840 | 16416 | 16992 |
| 20 | 12576 | 13536 | 14112 | 14688 | 15264 | 15840 | 16416 | 16992 | 17568 | 18336 |
| 21 | 13536 | 14112 | 15264 | 15840 | 16416 | 16992 | 17568 | 18336 | 19080 | 19848 |
| 22 | 14688 | 15264 | 16416 | 16992 | 17568 | 18336 | 19080 | 19848 | 20616 | 21384 |
| 23 | 15840 | 16416 | 16992 | 17568 | 18336 | 19080 | 19848 | 20616 | 21384 | 22152 |
| 24 | 16416 | 17568 | 18336 | 19080 | 19848 | 20616 | 21384 | 22152 | 22920 | 23688 |
| 25 | 17568 | 18336 | 19080 | 19848 | 20616 | 21384 | 22152 | 22920 | 23688 | 24496 |
| 26 | 18336 | 19080 | 19848 | 20616 | 21384 | 22152 | 22920 | 24496 | 25456 | 25456 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1160 | 1192 | 1224 | 1256 | 1288 | 1320 | 1352 | 1416 | 1416 |
| 1 | 1480 | 1480 | 1544 | 1608 | 1672 | 1672 | 1736 | 1800 | 1864 | 1864 |
| 2 | 1800 | 1864 | 1928 | 1992 | 2024 | 2088 | 2152 | 2216 | 2280 | 2344 |
| 3 | 2344 | 2408 | 2472 | 2600 | 2664 | 2728 | 2792 | 2856 | 2984 | 2984 |
| 4 | 2856 | 2984 | 3112 | 3112 | 3240 | 3368 | 3496 | 3496 | 3624 | 3752 |
| 5 | 3496 | 3624 | 3752 | 3880 | 4008 | 4136 | 4264 | 4392 | 4392 | 4584 |
| 6 | 4264 | 4392 | 4584 | 4584 | 4776 | 4968 | 4968 | 5160 | 5352 | 5544 |
| 7 | 4968 | 5160 | 5352 | 5352 | 5544 | 5736 | 5992 | 5992 | 6200 | 6456 |
| 8 | 5736 | 5736 | 5992 | 6200 | 6456 | 6456 | 6712 | 6968 | 6968 | 7224 |
| 9 | 6456 | 6456 | 6712 | 6968 | 7224 | 7480 | 7480 | 7736 | 7992 | 8248 |
| 10 | 6968 | 7224 | 7480 | 7736 | 7992 | 8248 | 8504 | 8760 | 8760 | 9144 |
| 11 | 8248 | 8504 | 8760 | 8760 | 9144 | 9528 | 9528 | 9912 | 10296 | 10680 |
| 12 | 9144 | 9528 | 9912 | 9912 | 10296 | 10680 | 11064 | 11448 | 11448 | 11832 |
| 13 | 10296 | 10680 | 11064 | 11448 | 11832 | 12216 | 12216 | 12576 | 12960 | 13536 |
| 14 | 11448 | 11832 | 12216 | 12576 | 12960 | 13536 | 13536 | 14112 | 14688 | 14688 |
| 15 | 12216 | 12576 | 12960 | 13536 | 14112 | 14112 | 14688 | 15264 | 15264 | 15840 |
| 16 | 12960 | 13536 | 14112 | 14112 | 14688 | 15264 | 15840 | 15840 | 16416 | 16992 |
| 17 | 14688 | 15264 | 15264 | 15840 | 16416 | 16992 | 17568 | 17568 | 18336 | 19080 |
| 18 | 15840 | 16416 | 16992 | 17568 | 18336 | 18336 | 19080 | 19848 | 19848 | 20616 |
| 19 | 17568 | 17568 | 18336 | 19080 | 19848 | 19848 | 20616 | 21384 | 22152 | 22152 |
| 20 | 19080 | 19080 | 19848 | 20616 | 21384 | 22152 | 22152 | 22920 | 23688 | 24496 |
| 21 | 20616 | 20616 | 21384 | 22152 | 22920 | 23688 | 24496 | 24496 | 25456 | 26416 |
| 22 | 21384 | 22152 | 22920 | 23688 | 24496 | 25456 | 26416 | 26416 | 27376 | 28336 |
| 23 | 22920 | 23688 | 24496 | 25456 | 26416 | 27376 | 27376 | 28336 | 29296 | 29296 |
| 24 | 24496 | 25456 | 26416 | 27376 | 27376 | 28336 | 29296 | 30576 | 30576 | 31704 |
| 25 | 25456 | 26416 | 27376 | 28336 | 29296 | 29296 | 30576 | 31704 | 31704 | 32856 |
| 26 | 26416 | 27376 | 28336 | 29296 | 30576 | 30576 | 31704 | 32856 | 34008 | 34008 |

TABLE 5-continued

Second transport block size table-2

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1480 | 1544 | 1608 | 1608 | 1672 | 1672 | 1736 | 1736 | 1800 |
| 1 | 1928 | 1992 | 2024 | 2088 | 2152 | 2152 | 2216 | 2280 | 2344 | 2344 |
| 2 | 2408 | 2472 | 2536 | 2536 | 2600 | 2664 | 2728 | 2792 | 2856 | 2856 |
| 3 | 3112 | 3240 | 3240 | 3368 | 3368 | 3496 | 3624 | 3624 | 3752 | 3752 |
| 4 | 3880 | 3880 | 4008 | 4136 | 4136 | 4264 | 4392 | 4392 | 4584 | 4584 |
| 5 | 4776 | 4776 | 4968 | 4968 | 5160 | 5352 | 5352 | 5544 | 5544 | 5736 |
| 6 | 5544 | 5736 | 5736 | 5992 | 6200 | 6200 | 6456 | 6456 | 6712 | 6712 |
| 7 | 6456 | 6712 | 6712 | 6968 | 7224 | 7224 | 7480 | 7736 | 7736 | 7992 |
| 8 | 7480 | 7736 | 7736 | 7992 | 8248 | 8248 | 8504 | 8760 | 8760 | 9144 |
| 9 | 8504 | 8504 | 8760 | 9144 | 9144 | 9528 | 9528 | 9912 | 9912 | 10296 |
| 10 | 9528 | 9528 | 9912 | 9912 | 10296 | 10680 | 10680 | 11064 | 11064 | 11448 |
| 11 | 10680 | 11064 | 11448 | 11448 | 11832 | 12216 | 12216 | 12576 | 12960 | 12960 |
| 12 | 12216 | 12576 | 12576 | 12960 | 13536 | 13536 | 14112 | 14112 | 14688 | 14688 |
| 13 | 13536 | 14112 | 14112 | 14688 | 15264 | 15264 | 15840 | 15840 | 16416 | 16992 |
| 14 | 15264 | 15840 | 15840 | 16416 | 16992 | 16992 | 17568 | 17568 | 18336 | 18336 |
| 15 | 16416 | 16992 | 16992 | 17568 | 17568 | 18336 | 19080 | 19080 | 19848 | 19848 |
| 16 | 17568 | 17568 | 18336 | 18336 | 19080 | 19848 | 19848 | 20616 | 20616 | 21384 |
| 17 | 19080 | 19848 | 19848 | 20616 | 21384 | 21384 | 22152 | 22920 | 22920 | 23688 |
| 18 | 21384 | 21384 | 22152 | 22920 | 22920 | 23688 | 24496 | 24496 | 25456 | 25456 |
| 19 | 22920 | 23688 | 23688 | 24496 | 25456 | 25456 | 26416 | 26416 | 27376 | 28336 |
| 20 | 24496 | 25456 | 26416 | 26416 | 27376 | 28336 | 28336 | 29296 | 29296 | 30576 |
| 21 | 26416 | 27376 | 28336 | 28336 | 29296 | 30576 | 30576 | 31704 | 31704 | 32856 |
| 22 | 28336 | 29296 | 30576 | 30576 | 31704 | 32856 | 32856 | 34008 | 34008 | 35160 |
| 23 | 30576 | 31704 | 31704 | 32856 | 34008 | 34008 | 35160 | 35160 | 36696 | 37888 |
| 24 | 32856 | 32856 | 34008 | 35160 | 35160 | 36696 | 37888 | 37888 | 39232 | 39232 |
| 25 | 34008 | 35160 | 35160 | 36696 | 36696 | 37888 | 39232 | 39232 | 40576 | 40576 |
| 26 | 35160 | 36696 | 36696 | 37888 | 39232 | 39232 | 40576 | 40576 | 42368 | 43816 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 0 | 1864 | 1864 | 1928 | 1928 | 1992 | 2024 | 2088 | 2088 | 2152 | 2152 |
| 1 | 2408 | 2472 | 2536 | 2536 | 2600 | 2664 | 2728 | 2728 | 2792 | 2856 |
| 2 | 2984 | 2984 | 3112 | 3112 | 3240 | 3240 | 3368 | 3368 | 3496 | 3496 |
| 3 | 3880 | 4008 | 4008 | 4136 | 4136 | 4264 | 4392 | 4392 | 4584 | 4584 |
| 4 | 4776 | 4776 | 4968 | 4968 | 5160 | 5160 | 5352 | 5352 | 5544 | 5544 |
| 5 | 5992 | 5992 | 5992 | 6200 | 6200 | 6456 | 6456 | 6712 | 6712 | 6968 |
| 6 | 6968 | 6968 | 7224 | 7224 | 7480 | 7480 | 7736 | 7736 | 7992 | 8248 |
| 7 | 7992 | 8248 | 8504 | 8504 | 8760 | 8760 | 9144 | 9144 | 9528 | 9528 |
| 8 | 9144 | 9528 | 9528 | 9912 | 9912 | 10296 | 10296 | 10680 | 10680 | 11064 |
| 9 | 10296 | 10680 | 11064 | 11064 | 11448 | 11448 | 11832 | 11832 | 12216 | 12216 |
| 10 | 11832 | 11832 | 12216 | 12216 | 12576 | 12960 | 12960 | 13536 | 13536 | 13536 |
| 11 | 13536 | 13536 | 14112 | 14112 | 14688 | 14688 | 15264 | 15264 | 15840 | 15840 |
| 12 | 15264 | 15264 | 15840 | 15840 | 16416 | 16416 | 16992 | 16992 | 17568 | 17568 |
| 13 | 16992 | 17568 | 17568 | 18336 | 18336 | 19080 | 19080 | 19080 | 19848 | 19848 |
| 14 | 19080 | 19080 | 19848 | 19848 | 20616 | 20616 | 21384 | 21384 | 22152 | 22152 |
| 15 | 20616 | 20616 | 21384 | 21384 | 22152 | 22152 | 22920 | 22920 | 23688 | 23688 |
| 16 | 21384 | 22152 | 22152 | 22920 | 23688 | 23688 | 24496 | 24496 | 25456 | 25456 |
| 17 | 23688 | 24496 | 24496 | 25456 | 25456 | 26416 | 26416 | 27376 | 27376 | 28336 |
| 18 | 26416 | 26416 | 27376 | 27376 | 28336 | 29296 | 29296 | 29296 | 30576 | 30576 |
| 19 | 28336 | 29296 | 29296 | 30576 | 30576 | 31704 | 31704 | 32856 | 32856 | 34008 |
| 20 | 30576 | 31704 | 31704 | 32856 | 32856 | 34008 | 34008 | 35160 | 35160 | 36696 |
| 21 | 32856 | 34008 | 35160 | 35160 | 36696 | 36696 | 36696 | 37888 | 39232 | 39232 |
| 22 | 35160 | 36696 | 36696 | 37888 | 39232 | 39232 | 40576 | 40576 | 40576 | 42368 |
| 23 | 37888 | 39232 | 39232 | 40576 | 40576 | 42368 | 42368 | 43816 | 43816 | 45352 |
| 24 | 40576 | 40576 | 42368 | 42368 | 43816 | 43816 | 45352 | 45352 | 46888 | 46888 |
| 25 | 42368 | 42368 | 43816 | 45352 | 45352 | 46888 | 46888 | 48936 | 48936 | 48936 |
| 26 | 43816 | 45352 | 45352 | 46888 | 46888 | 48936 | 48936 | 51024 | 51024 | 51024 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2216 | 2216 | 2280 | 2344 | 2344 | 2408 | 2408 | 2472 | 2472 | 2536 |
| 1 | 2856 | 2984 | 2984 | 2984 | 3112 | 3112 | 3240 | 3240 | 3240 | 3368 |
| 2 | 3624 | 3624 | 3624 | 3752 | 3752 | 3880 | 3880 | 4008 | 4008 | 4136 |
| 3 | 4584 | 4776 | 4776 | 4776 | 4968 | 4968 | 5160 | 5160 | 5160 | 5352 |
| 4 | 5736 | 5736 | 5992 | 5992 | 5992 | 6200 | 6200 | 6200 | 6456 | 6456 |
| 5 | 6968 | 6968 | 7224 | 7224 | 7480 | 7480 | 7736 | 7736 | 7992 | 7992 |
| 6 | 8248 | 8504 | 8504 | 8760 | 8760 | 9144 | 9144 | 9144 | 9528 | 9528 |
| 7 | 9528 | 9912 | 9912 | 10296 | 10296 | 10680 | 10680 | 10680 | 11064 | 11064 |
| 8 | 11064 | 11448 | 11448 | 11832 | 11832 | 12216 | 12216 | 12216 | 12576 | 12576 |
| 9 | 12576 | 12576 | 12960 | 12960 | 13536 | 13536 | 13536 | 14112 | 14112 | 14112 |

TABLE 5-continued

Second transport block size table-2

| ITBS | | | | | | | | | | |
|---|---|---|---|---|---|---|---|---|---|---|
| 10 | 14112 | 14112 | 14688 | 14688 | 14688 | 15264 | 15264 | 15840 | 15840 | 15840 |
| 11 | 15840 | 16416 | 16416 | 16992 | 16992 | 17568 | 17568 | 17568 | 18336 | 18336 |
| 12 | 18336 | 18336 | 18336 | 19080 | 19080 | 19848 | 19848 | 19848 | 20616 | 20616 |
| 13 | 20616 | 20616 | 21384 | 21384 | 22152 | 22152 | 22152 | 22920 | 22920 | 23688 |
| 14 | 22920 | 22920 | 23688 | 23688 | 24496 | 24496 | 25456 | 25456 | 25456 | 26416 |
| 15 | 24496 | 24496 | 25456 | 25456 | 25456 | 26416 | 26416 | 27376 | 27376 | 28336 |
| 16 | 25456 | 26416 | 26416 | 27376 | 27376 | 28336 | 28336 | 29296 | 29296 | 29296 |
| 17 | 28336 | 29296 | 29296 | 30576 | 30576 | 30576 | 31704 | 31704 | 32856 | 32856 |
| 18 | 31704 | 31704 | 32856 | 32856 | 34008 | 34008 | 34008 | 35160 | 35160 | 36696 |
| 19 | 34008 | 35160 | 35160 | 35160 | 36696 | 36696 | 37888 | 37888 | 39232 | 39232 |
| 20 | 36696 | 37888 | 37888 | 39232 | 39232 | 40576 | 40576 | 40576 | 42368 | 42368 |
| 21 | 39232 | 40576 | 40576 | 42368 | 42368 | 43816 | 43816 | 43816 | 45352 | 45352 |
| 22 | 42368 | 43816 | 43816 | 45352 | 45352 | 46888 | 46888 | 46888 | 48936 | 48936 |
| 23 | 45352 | 46888 | 46888 | 46888 | 48936 | 48936 | 51024 | 51024 | 51024 | 52752 |
| 24 | 48936 | 48936 | 51024 | 51024 | 51024 | 52752 | 52752 | 55056 | 55056 | 55056 |
| 25 | 51024 | 51024 | 52752 | 52752 | 52752 | 55056 | 55056 | 57336 | 57336 | 57336 |
| 26 | 52752 | 52752 | 55056 | 55056 | 55056 | 57336 | 57336 | 59256 | 59256 | 59256 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2664 | 2728 | 2728 | 2792 | 2856 | 2856 | 2856 |
| 1 | 3368 | 3368 | 3496 | 3496 | 3624 | 3624 | 3624 | 3752 | 3752 | 3752 |
| 2 | 4136 | 4264 | 4264 | 4392 | 4392 | 4392 | 4584 | 4584 | 4584 | 4776 |
| 3 | 5352 | 5544 | 5544 | 5544 | 5736 | 5736 | 5992 | 5992 | 5992 | 5992 |
| 4 | 6712 | 6712 | 6712 | 6968 | 6968 | 6968 | 7224 | 7224 | 7224 | 7480 |
| 5 | 8248 | 8248 | 8248 | 8504 | 8504 | 8760 | 8760 | 8760 | 9144 | 9144 |
| 6 | 9528 | 9912 | 9912 | 9912 | 10296 | 10296 | 10296 | 10680 | 10680 | 11064 |
| 7 | 11448 | 11448 | 11448 | 11832 | 11832 | 12216 | 12216 | 12576 | 12576 | 12576 |
| 8 | 12960 | 12960 | 13536 | 13536 | 13536 | 14112 | 14112 | 14112 | 14688 | 14688 |
| 9 | 14688 | 14688 | 15264 | 15264 | 15264 | 15840 | 15840 | 15840 | 16416 | 16416 |
| 10 | 16416 | 16416 | 16992 | 16992 | 16992 | 17568 | 17568 | 17568 | 18336 | 18336 |
| 11 | 18336 | 19080 | 19080 | 19080 | 19848 | 19848 | 20616 | 20616 | 20616 | 21384 |
| 12 | 21384 | 21384 | 21384 | 22152 | 22152 | 22920 | 22920 | 22920 | 23688 | 23688 |
| 13 | 23688 | 24496 | 24496 | 24496 | 25456 | 25456 | 25456 | 26416 | 26416 | 26416 |
| 14 | 26416 | 26416 | 27376 | 27376 | 28336 | 28336 | 28336 | 29296 | 29296 | 29296 |
| 15 | 28336 | 28336 | 29296 | 29296 | 29296 | 30576 | 30576 | 30576 | 31704 | 31704 |
| 16 | 30576 | 30576 | 30576 | 31704 | 31704 | 31704 | 32856 | 32856 | 34008 | 34008 |
| 17 | 32856 | 34008 | 34008 | 35160 | 35160 | 35160 | 36696 | 36696 | 36696 | 37888 |
| 18 | 36696 | 36696 | 37888 | 37888 | 39232 | 39232 | 39232 | 40576 | 40576 | 40576 |
| 19 | 39232 | 40576 | 40576 | 42368 | 42368 | 42368 | 43816 | 43816 | 43816 | 45352 |
| 20 | 42368 | 43816 | 43816 | 45352 | 45352 | 45352 | 46888 | 46888 | 46888 | 48936 |
| 21 | 46888 | 46888 | 48936 | 48936 | 48936 | 51024 | 51024 | 51024 | 51024 | 52752 |
| 22 | 48936 | 51024 | 51024 | 52752 | 52752 | 52752 | 55056 | 55056 | 55056 | 57336 |
| 23 | 52752 | 52752 | 55056 | 55056 | 55056 | 57336 | 57336 | 59256 | 59256 | 59256 |
| 24 | 57336 | 57336 | 57336 | 59256 | 59256 | 59256 | 61664 | 61664 | 63776 | 63776 |
| 25 | 59256 | 59256 | 59256 | 61664 | 61664 | 63776 | 63776 | 63776 | 66592 | 66592 |
| 26 | 61664 | 61664 | 63776 | 63776 | 63776 | 66592 | 66592 | 66592 | 68808 | 68808 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2984 | 2984 | 2984 | 2984 | 3112 | 3112 | 3112 | 3240 | 3240 | 3240 |
| 1 | 3880 | 3880 | 4008 | 4008 | 4008 | 4136 | 4136 | 4136 | 4264 | 4264 |
| 2 | 4776 | 4776 | 4776 | 4968 | 4968 | 4968 | 5160 | 5160 | 5160 | 5352 |
| 3 | 6200 | 6200 | 6200 | 6456 | 6456 | 6456 | 6456 | 6712 | 6712 | 6712 |
| 4 | 7480 | 7736 | 7736 | 7736 | 7992 | 7992 | 7992 | 8248 | 8248 | 8248 |
| 5 | 9144 | 9528 | 9528 | 9528 | 9912 | 9912 | 9912 | 9912 | 10296 | 10296 |
| 6 | 11064 | 11064 | 11448 | 11448 | 11448 | 11832 | 11832 | 11832 | 12216 | 12216 |
| 7 | 12960 | 12960 | 12960 | 13536 | 13536 | 13536 | 14112 | 14112 | 14112 | 14112 |
| 8 | 14688 | 14688 | 15264 | 15264 | 15264 | 15840 | 15840 | 15840 | 16416 | 16416 |
| 9 | 16416 | 16992 | 16992 | 17568 | 17568 | 17568 | 17568 | 18336 | 18336 | 18336 |
| 10 | 18336 | 19080 | 19080 | 19080 | 19080 | 19848 | 19848 | 20616 | 20616 | 20616 |
| 11 | 21384 | 21384 | 22152 | 22152 | 22152 | 22920 | 22920 | 22920 | 23688 | 23688 |
| 12 | 23688 | 24496 | 24496 | 24496 | 25456 | 25456 | 25456 | 26416 | 26416 | 26416 |
| 13 | 27376 | 27376 | 27376 | 28336 | 28336 | 29296 | 29296 | 29296 | 29296 | 30576 |
| 14 | 30576 | 30576 | 30576 | 31704 | 31704 | 31704 | 32856 | 32856 | 32856 | 34008 |
| 15 | 32856 | 32856 | 32856 | 34008 | 34008 | 34008 | 35160 | 35160 | 35160 | 35160 |
| 16 | 34008 | 35160 | 35160 | 35160 | 36696 | 36696 | 36696 | 37888 | 37888 | 37888 |
| 17 | 37888 | 39232 | 39232 | 39232 | 40576 | 40576 | 40576 | 40576 | 42368 | 42368 |
| 18 | 42368 | 42368 | 42368 | 43816 | 43816 | 43816 | 45352 | 45352 | 45352 | 46888 |
| 19 | 45352 | 45352 | 46888 | 46888 | 46888 | 48936 | 48936 | 48936 | 48936 | 51024 |
| 20 | 48936 | 48936 | 51024 | 51024 | 51024 | 52752 | 52752 | 52752 | 55056 | 55056 |
| 21 | 52752 | 52752 | 55056 | 55056 | 55056 | 57336 | 57336 | 57336 | 57336 | 59256 |
| 22 | 57336 | 57336 | 59256 | 59256 | 59256 | 59256 | 61664 | 61664 | 61664 | 63776 |
| 23 | 61664 | 61664 | 61664 | 63776 | 63776 | 63776 | 63776 | 66592 | 66592 | 66592 |

TABLE 5-continued

Second transport block size table-2

| | | | | | | | | | |
|---|---|---|---|---|---|---|---|---|---|
| 24 | 63776 | 63776 | 66592 | 66592 | 66592 | 68808 | 68808 | 68808 | 71112 | 71112 |
| 25 | 66592 | 68808 | 68808 | 68808 | 71112 | 71112 | 71112 | 73712 | 73712 | 73712 |
| 26 | 68808 | 71112 | 71112 | 73712 | 73712 | 73712 | 75376 | 75376 | 75376 | 75376 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 3240 | 3368 | 3368 | 3368 | 3496 | 3496 | 3496 | 3496 | 3624 | 3624 |
| 1 | 4392 | 4392 | 4392 | 4392 | 4584 | 4584 | 4584 | 4584 | 4776 | 4776 |
| 2 | 5352 | 5352 | 5352 | 5544 | 5544 | 5544 | 5736 | 5736 | 5736 | 5736 |
| 3 | 6968 | 6968 | 6968 | 7224 | 7224 | 7224 | 7224 | 7480 | 7480 | 7480 |
| 4 | 8504 | 8504 | 8760 | 8760 | 8760 | 8760 | 9144 | 9144 | 9144 | 9144 |
| 5 | 10296 | 10680 | 10680 | 10680 | 11064 | 11064 | 11064 | 11064 | 11448 | 11448 |
| 6 | 12216 | 12576 | 12576 | 12576 | 12960 | 12960 | 12960 | 13536 | 13536 | 13536 |
| 7 | 14688 | 14688 | 14688 | 14688 | 15264 | 15264 | 15264 | 15840 | 15840 | 15840 |
| 8 | 16416 | 16992 | 16992 | 16992 | 17568 | 17568 | 17568 | 17568 | 18336 | 18336 |
| 9 | 19080 | 19080 | 19080 | 19080 | 19848 | 19848 | 19848 | 19848 | 20616 | 20616 |
| 10 | 20616 | 21384 | 21384 | 21384 | 21384 | 22152 | 22152 | 22152 | 22920 | 22920 |
| 11 | 23688 | 24496 | 24496 | 24496 | 25456 | 25456 | 25456 | 25456 | 26416 | 26416 |
| 12 | 27376 | 27376 | 27376 | 28336 | 28336 | 28336 | 29296 | 29296 | 29296 | 29296 |
| 13 | 30576 | 30576 | 31704 | 31704 | 31704 | 31704 | 32856 | 32856 | 32856 | 34008 |
| 14 | 34008 | 34008 | 35160 | 35160 | 35160 | 35160 | 36696 | 36696 | 36696 | 37888 |
| 15 | 36696 | 36696 | 36696 | 37888 | 37888 | 37888 | 39232 | 39232 | 39232 | 40576 |
| 16 | 39232 | 39232 | 39232 | 39232 | 40576 | 40576 | 40576 | 42368 | 42368 | 42368 |
| 17 | 42368 | 43816 | 43816 | 43816 | 45352 | 45352 | 45352 | 45352 | 46888 | 46888 |
| 18 | 46888 | 46888 | 48936 | 48936 | 48936 | 48936 | 51024 | 51024 | 51024 | 51024 |
| 19 | 51024 | 51024 | 52752 | 52752 | 52752 | 52752 | 55056 | 55056 | 55056 | 55056 |
| 20 | 55056 | 55056 | 57336 | 57336 | 57336 | 57336 | 59256 | 59256 | 59256 | 61664 |
| 21 | 59256 | 59256 | 61664 | 61664 | 61664 | 63776 | 63776 | 63776 | 63776 | 66592 |
| 22 | 63776 | 63776 | 66592 | 66592 | 66592 | 66592 | 68808 | 68808 | 68808 | 71112 |
| 23 | 68808 | 68808 | 68808 | 71112 | 71112 | 71112 | 73712 | 73712 | 73712 | 75376 |
| 24 | 71112 | 73712 | 73712 | 75376 | 75376 | 75376 | 75376 | 75376 | 75376 | 75376 |
| 25 | 75376 | 75376 | 75376 | 75376 | 75376 | 75376 | 75376 | 75376 | 75376 | 75376 |
| 26 | 75376 | 75376 | 75376 | 75376 | 75376 | 75376 | 75376 | 75376 | 75376 | 75376 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 3624 | 3752 | 3752 | 3752 | 3752 | 3880 | 3880 | 3880 | 4008 | 4008 |
| 1 | 4776 | 4776 | 4968 | 4968 | 4968 | 4968 | 5160 | 5160 | 5160 | 5160 |
| 2 | 5992 | 5992 | 5992 | 5992 | 6200 | 6200 | 6200 | 6200 | 6456 | 6456 |
| 3 | 7736 | 7736 | 7736 | 7992 | 7992 | 7992 | 7992 | 8248 | 8248 | 8248 |
| 4 | 9528 | 9528 | 9528 | 9528 | 9912 | 9912 | 9912 | 9912 | 10296 | 10296 |
| 5 | 11448 | 11832 | 11832 | 11832 | 12216 | 12216 | 12216 | 12216 | 12576 | 12576 |
| 6 | 13536 | 14112 | 14112 | 14112 | 14112 | 14688 | 14688 | 14688 | 14688 | 14688 |
| 7 | 15840 | 16416 | 16416 | 16416 | 16992 | 16992 | 16992 | 16992 | 17568 | 17568 |
| 8 | 18336 | 18336 | 19080 | 19080 | 19080 | 19080 | 19848 | 19848 | 19848 | 19848 |
| 9 | 20616 | 20616 | 21384 | 21384 | 21384 | 22152 | 22152 | 22152 | 22152 | 22920 |
| 10 | 22920 | 23688 | 23688 | 23688 | 23688 | 24496 | 24496 | 24496 | 24496 | 25456 |
| 11 | 26416 | 26416 | 27376 | 27376 | 27376 | 28336 | 28336 | 28336 | 28336 | 29296 |
| 12 | 30576 | 30576 | 30576 | 30576 | 31704 | 31704 | 31704 | 31704 | 32856 | 32856 |
| 13 | 34008 | 34008 | 34008 | 35160 | 35160 | 35160 | 35160 | 36696 | 36696 | 36696 |
| 14 | 37888 | 37888 | 37888 | 39232 | 39232 | 39232 | 40576 | 40576 | 40576 | 40576 |
| 15 | 40576 | 40576 | 40576 | 42368 | 42368 | 42368 | 42368 | 43816 | 43816 | 43816 |
| 16 | 42368 | 43816 | 43816 | 43816 | 45352 | 45352 | 45352 | 46888 | 46888 | 46888 |
| 17 | 46888 | 48936 | 48936 | 48936 | 48936 | 48936 | 51024 | 51024 | 51024 | 51024 |
| 18 | 52752 | 52752 | 52752 | 52752 | 55056 | 55056 | 55056 | 55056 | 57336 | 57336 |
| 19 | 57336 | 57336 | 57336 | 59256 | 59256 | 59256 | 59256 | 61664 | 61664 | 61664 |
| 20 | 61664 | 61664 | 61664 | 63776 | 63776 | 63776 | 63776 | 66592 | 66592 | 66592 |
| 21 | 66592 | 66592 | 66592 | 68808 | 68808 | 68808 | 71112 | 71112 | 71112 | 71112 |
| 22 | 71112 | 71112 | 71112 | 73712 | 73712 | 73712 | 75376 | 75376 | 75376 | 75376 |
| 23 | 75376 | 75376 | 75376 | 75376 | 75376 | 75376 | 75376 | 75376 | 75376 | 75376 |
| 24 | 75376 | 75376 | 75376 | 75376 | 75376 | 75376 | 75376 | 75376 | 75376 | 75376 |
| 25 | 75376 | 75376 | 75376 | 75376 | 75376 | 75376 | 75376 | 75376 | 75376 | 75376 |
| 26 | 75376 | 75376 | 75376 | 75376 | 75376 | 75376 | 75376 | 75376 | 75376 | 75376 |

Further, the foregoing Table 4 and Table 5 may be optimized to form optimized second transport block size tables 4-1 and 5-1, so that coding rates corresponding to all TBSs included in a maximum modulation and coding scheme level in the optimized second transport block size tables are equal to a set coding rate, where the set coding rate, for example, may be 0.93.

TABLE 4-1

Optimized second transport block size table-1

| ITBS | NPRB | | | | | | | | | |
|------|---|---|---|---|---|---|---|---|---|----|
|      | 1 | 2 | 3 | 4 | 5 | 6 | 7 | 8 | 9 | 10 |
| 26   | 840 | 1672 | 2536 | 3368 | 4264 | 5160 | 5992 | 6712 | 7736 | 8504 |

| ITBS | NPRB | | | | | | | | | |
|------|----|----|----|----|----|----|----|----|----|----|
|      | 11 | 12 | 13 | 14 | 15 | 16 | 17 | 18 | 19 | 20 |
| 26   | 9144 | 10296 | 11064 | 11832 | 12960 | 13536 | 14688 | 15264 | 16416 | 16992 |

| ITBS | NPRB | | | | | | | | | |
|------|----|----|----|----|----|----|----|----|----|----|
|      | 21 | 22 | 23 | 24 | 25 | 26 | 27 | 28 | 29 | 30 |
| 26   | 17568 | 18336 | 19848 | 20616 | 21384 | 22152 | 22920 | 23688 | 24496 | 25456 |

| ITBS | NPRB | | | | | | | | | |
|------|----|----|----|----|----|----|----|----|----|----|
|      | 31 | 32 | 33 | 34 | 35 | 36 | 37 | 38 | 39 | 40 |
| 26   | 26416 | 27376 | 28336 | 29296 | 29296 | 30576 | 31704 | 32856 | 32856 | 34008 |

| ITBS | NPRB | | | | | | | | | |
|------|----|----|----|----|----|----|----|----|----|----|
|      | 41 | 42 | 43 | 44 | 45 | 46 | 47 | 48 | 49 | 50 |
| 26   | 35160 | 35160 | 36696 | 37888 | 37888 | 39232 | 40576 | 40576 | 42368 | 42368 |

| ITBS | NPRB | | | | | | | | | |
|------|----|----|----|----|----|----|----|----|----|----|
|      | 51 | 52 | 53 | 54 | 55 | 56 | 57 | 58 | 59 | 60 |
| 26   | 43816 | 43816 | 45352 | 45352 | 46888 | 46888 | 48936 | 48936 | 51024 | 51024 |

| ITBS | NPRB | | | | | | | | | |
|------|----|----|----|----|----|----|----|----|----|----|
|      | 61 | 62 | 63 | 64 | 65 | 66 | 67 | 68 | 69 | 70 |
| 26   | 52752 | 52752 | 52752 | 55056 | 55056 | 55056 | 57336 | 57336 | 59256 | 59256 |

| ITBS | NPRB | | | | | | | | | |
|------|----|----|----|----|----|----|----|----|----|----|
|      | 71 | 72 | 73 | 74 | 75 | 76 | 77 | 78 | 79 | 80 |
| 26   | 59256 | 61664 | 61664 | 63776 | 63776 | 63776 | 66592 | 66592 | 66592 | 68808 |

| ITBS | NPRB | | | | | | | | | |
|------|----|----|----|----|----|----|----|----|----|----|
|      | 81 | 82 | 83 | 84 | 85 | 86 | 87 | 88 | 89 | 90 |
| 26   | 68808 | 68808 | 71112 | 71112 | 71112 | 73712 | 75376 | 75376 | 75376 | 75376 |

| ITBS | NPRB | | | | | | | | | |
|------|----|----|----|----|----|----|----|----|----|----|
|      | 91 | 92 | 93 | 94 | 95 | 96 | 97 | 98 | 99 | 100 |
| 26   | 75376 | 75376 | 75376 | 75376 | 75376 | 75376 | 75376 | 75376 | 75376 | 75376 |

| ITBS | NPRB | | | | | | | | | |
|------|----|----|----|----|----|----|----|----|----|----|
|      | 101 | 102 | 103 | 104 | 105 | 106 | 107 | 108 | 109 | 110 |
| 26   | 75376 | 75376 | 75376 | 75376 | 75376 | 75376 | 75376 | 75376 | 75376 | 75376 |

TABLE 5-1

Optimized second transport block size table-2

| ITBS | NPRB 1 | 2 | 3 | 4 | 5 | 6 | 7 | 8 | 9 | 10 |
|---|---|---|---|---|---|---|---|---|---|---|
| 26 | 840 | 1672 | 2536 | 3368 | 4264 | 5160 | 5992 | 6712 | 7736 | 8504 |

| ITBS | NPRB 11 | 12 | 13 | 14 | 15 | 16 | 17 | 18 | 19 | 20 |
|---|---|---|---|---|---|---|---|---|---|---|
| 26 | 9144 | 10296 | 11064 | 11832 | 12960 | 13536 | 14688 | 15264 | 16416 | 16992 |

| ITBS | NPRB 21 | 22 | 23 | 24 | 25 | 26 | 27 | 28 | 29 | 30 |
|---|---|---|---|---|---|---|---|---|---|---|
| 26 | 17568 | 18336 | 19848 | 20616 | 21384 | 22152 | 22920 | 23688 | 24496 | 25456 |

| ITBS | NPRB 31 | 32 | 33 | 34 | 35 | 36 | 37 | 38 | 39 | 40 |
|---|---|---|---|---|---|---|---|---|---|---|
| 26 | 26416 | 27376 | 28336 | 29296 | 29296 | 30576 | 31704 | 32856 | 32856 | 34008 |

| ITBS | NPRB 41 | 42 | 43 | 44 | 45 | 46 | 47 | 48 | 49 | 50 |
|---|---|---|---|---|---|---|---|---|---|---|
| 26 | 35160 | 35160 | 36696 | 37888 | 37888 | 39232 | 40576 | 40576 | 42368 | 42368 |

| ITBS | NPRB 51 | 52 | 53 | 54 | 55 | 56 | 57 | 58 | 59 | 60 |
|---|---|---|---|---|---|---|---|---|---|---|
| 26 | 43816 | 43816 | 45352 | 45352 | 46888 | 46888 | 48936 | 48936 | 51024 | 51024 |

| ITBS | NPRB 61 | 62 | 63 | 64 | 65 | 66 | 67 | 68 | 69 | 70 |
|---|---|---|---|---|---|---|---|---|---|---|
| 26 | 52752 | 52752 | 52752 | 55056 | 55056 | 55056 | 57336 | 57336 | 59256 | 59256 |

| ITBS | NPRB 71 | 72 | 73 | 74 | 75 | 76 | 77 | 78 | 79 | 80 |
|---|---|---|---|---|---|---|---|---|---|---|
| 26 | 59256 | 61664 | 61664 | 63776 | 63776 | 63776 | 66592 | 66592 | 66592 | 68808 |

| ITBS | NPRB 81 | 82 | 83 | 84 | 85 | 86 | 87 | 88 | 89 | 90 |
|---|---|---|---|---|---|---|---|---|---|---|
| 26 | 68808 | 68808 | 71112 | 71112 | 71112 | 73712 | 75376 | 75376 | 75376 | 75376 |

| ITBS | NPRB 91 | 92 | 93 | 94 | 95 | 96 | 97 | 98 | 99 | 100 |
|---|---|---|---|---|---|---|---|---|---|---|
| 26 | 75376 | 75376 | 75376 | 75376 | 75376 | 75376 | 75376 | 75376 | 75376 | 75376 |

| ITBS | NPRB 101 | 102 | 103 | 104 | 105 | 106 | 107 | 108 | 109 | 110 |
|---|---|---|---|---|---|---|---|---|---|---|
| 26 | 75376 | 75376 | 75376 | 75376 | 75376 | 75376 | 75376 | 75376 | 75376 | 75376 |

Optionally, some TBSs in the second transport block size table may further be included in TBSs in the first transport block size table and some TBSs in the second transport block size table may be included in the set layer-2 data transport block size table.

Still further, on the basis of the foregoing embodiment, any TBS in the second transport block size table may be a TBS in the first transport block size table and the set layer-2 data transport block size table, corresponding to a coding rate closest to the target coding rate.

When a TBS is determined in the second transport block size table, the determined TBS value is a TBS in the first transport block size table or the layer-2 data transport block size table, and a coding rate corresponding to the determined TBS value in the LTE REL.12 system with the system overhead of 12 REs is closer to the target coding rate than coding rates corresponding to other TBSs in the first transport block size table or the layer-2 data transport block size table in the LTE REL.12 system with the system overhead of 12 REs, where the target coding rate may be the coding rate corresponding to the modulation and coding scheme level and the number of physical resource block pairs in LTE REL.8. The second transport block size table in this embodiment may be shown in Table 6.

TABLE 6

Second transport block size table-3

| ITBS | \multicolumn{10}{c}{NPRB} |
|---|---|---|---|---|---|---|---|---|---|---|

| ITBS | 1 | 2 | 3 | 4 | 5 | 6 | 7 | 8 | 9 | 10 |
|---|---|---|---|---|---|---|---|---|---|---|
| 0 | 24 | 56 | 72 | 120 | 152 | 208 | 224 | 280 | 296 | 336 |
| 1 | 40 | 72 | 120 | 208 | 224 | 280 | 296 | 344 | 440 | 456 |
| 2 | 56 | 104 | 208 | 224 | 280 | 336 | 392 | 440 | 488 | 552 |
| 3 | 56 | 144 | 224 | 280 | 336 | 440 | 520 | 584 | 648 | 744 |
| 4 | 72 | 152 | 280 | 344 | 440 | 536 | 648 | 712 | 840 | 904 |
| 5 | 104 | 208 | 296 | 440 | 552 | 648 | 776 | 904 | 1000 | 1128 |
| 6 | 328 | 224 | 336 | 520 | 648 | 776 | 936 | 1064 | 1224 | 1352 |
| 7 | 144 | 296 | 440 | 616 | 776 | 936 | 1096 | 1256 | 1416 | 1608 |
| 8 | 152 | 344 | 520 | 712 | 904 | 1064 | 1256 | 1416 | 1608 | 1800 |
| 9 | 176 | 392 | 600 | 808 | 1000 | 1224 | 1416 | 1608 | 1864 | 2024 |
| 10 | 208 | 440 | 648 | 904 | 1128 | 1352 | 1608 | 1800 | 2024 | 2280 |
| 11 | 224 | 504 | 776 | 1032 | 1320 | 1544 | 1800 | 2088 | 2344 | 2664 |
| 12 | 280 | 584 | 904 | 1192 | 1480 | 1736 | 2088 | 2344 | 2664 | 2984 |
| 13 | 296 | 648 | 968 | 1320 | 1608 | 2024 | 2344 | 2664 | 2984 | 3240 |
| 14 | 344 | 712 | 1096 | 1480 | 1864 | 2280 | 2600 | 2984 | 3368 | 3752 |
| 15 | 376 | 776 | 1192 | 1608 | 2024 | 2344 | 2792 | 3240 | 3496 | 4008 |
| 16 | 440 | 840 | 1256 | 1672 | 2088 | 2536 | 2984 | 3368 | 3880 | 4264 |
| 17 | 440 | 904 | 1384 | 1864 | 2344 | 2792 | 3240 | 3752 | 4264 | 4776 |
| 18 | 504 | 1032 | 1544 | 2024 | 2600 | 3112 | 3624 | 4008 | 4776 | 5160 |
| 19 | 536 | 1096 | 1672 | 2280 | 2792 | 3368 | 3880 | 4584 | 4968 | 5544 |
| 20 | 584 | 1192 | 1800 | 2408 | 3112 | 3624 | 4264 | 4968 | 5352 | 5992 |
| 21 | 648 | 1320 | 1928 | 2600 | 3240 | 3880 | 4584 | 5160 | 5992 | 6456 |
| 22 | 680 | 1384 | 2088 | 2792 | 3496 | 4264 | 4968 | 5544 | 6200 | 6968 |
| 23 | 712 | 1480 | 2280 | 2984 | 3752 | 4584 | 5160 | 5992 | 6712 | 7480 |
| 24 | 776 | 1544 | 2344 | 3112 | 3880 | 4776 | 5544 | 6456 | 7224 | 7736 |
| 25 | 808 | 1672 | 2408 | 3368 | 4008 | 4968 | 5736 | 6712 | 7480 | 7992 |
| 26 | 936 | 1928 | 2856 | 3880 | 4968 | 5736 | 6712 | 7736 | 8760 | 9912 |

| ITBS | 11 | 12 | 13 | 14 | 15 | 16 | 17 | 18 | 19 | 20 |
|---|---|---|---|---|---|---|---|---|---|---|
| 0 | 376 | 440 | 456 | 488 | 520 | 552 | 600 | 648 | 648 | 712 |
| 1 | 488 | 552 | 600 | 648 | 680 | 744 | 776 | 840 | 904 | 936 |
| 2 | 616 | 680 | 744 | 808 | 840 | 904 | 968 | 1000 | 1096 | 1128 |
| 3 | 808 | 904 | 968 | 1064 | 1128 | 1192 | 1256 | 1352 | 1416 | 1544 |
| 4 | 1000 | 1096 | 1192 | 1320 | 1384 | 1480 | 1544 | 1672 | 1736 | 1864 |
| 5 | 1256 | 1352 | 1480 | 1608 | 1736 | 1800 | 1928 | 2024 | 2152 | 2280 |
| 6 | 1480 | 1608 | 1736 | 1928 | 2024 | 2152 | 2280 | 2408 | 2600 | 2728 |
| 7 | 1736 | 1928 | 2088 | 2152 | 2344 | 2536 | 2728 | 2856 | 3112 | 3240 |
| 8 | 2024 | 2152 | 2344 | 2536 | 2728 | 2856 | 3112 | 3240 | 3496 | 3624 |
| 9 | 2280 | 2408 | 2664 | 2856 | 3112 | 3240 | 3496 | 3752 | 3880 | 4008 |
| 10 | 2536 | 2728 | 2984 | 3240 | 3496 | 3624 | 3880 | 4008 | 4392 | 4584 |
| 11 | 2856 | 3112 | 3368 | 3624 | 3880 | 4264 | 4584 | 4776 | 4968 | 5160 |
| 12 | 3240 | 3496 | 3880 | 4264 | 4392 | 4776 | 4968 | 5352 | 5736 | 5992 |
| 13 | 3752 | 4008 | 4392 | 4776 | 4968 | 5352 | 5736 | 5992 | 6456 | 6712 |
| 14 | 4008 | 4584 | 4968 | 5160 | 5544 | 5992 | 6456 | 6712 | 7224 | 7480 |
| 15 | 4392 | 4776 | 5160 | 5544 | 5992 | 6456 | 6712 | 7224 | 7480 | 7992 |
| 16 | 4776 | 4968 | 5544 | 5992 | 6456 | 6712 | 7224 | 7736 | 7992 | 8504 |
| 17 | 5160 | 5736 | 6200 | 6712 | 6968 | 7480 | 7992 | 8504 | 8760 | 9528 |
| 18 | 5736 | 6200 | 6712 | 7224 | 7736 | 7992 | 8760 | 9528 | 9912 | 10296 |
| 19 | 6200 | 6712 | 7224 | 7736 | 8504 | 9144 | 9528 | 9912 | 10680 | 11064 |
| 20 | 6712 | 7224 | 7736 | 8504 | 9144 | 9912 | 10296 | 10680 | 11448 | 11832 |
| 21 | 7224 | 7736 | 8504 | 9144 | 9912 | 10296 | 11064 | 11832 | 12216 | 12960 |
| 22 | 7736 | 8504 | 9144 | 9912 | 10296 | 11064 | 11832 | 12216 | 13536 | 14112 |
| 23 | 7992 | 9144 | 9912 | 10296 | 11064 | 11832 | 12960 | 13536 | 14112 | 14688 |
| 24 | 8760 | 9528 | 10296 | 11064 | 11832 | 12960 | 13536 | 14112 | 14688 | 15840 |
| 25 | 9144 | 9912 | 10680 | 11448 | 12216 | 13536 | 14112 | 14688 | 15840 | 16416 |
| 26 | 10680 | 11448 | 12216 | 13536 | 14112 | 15264 | 16416 | 17568 | 18336 | 19080 |

| ITBS | 21 | 22 | 23 | 24 | 25 | 26 | 27 | 28 | 29 | 30 |
|---|---|---|---|---|---|---|---|---|---|---|
| 0 | 744 | 776 | 808 | 840 | 904 | 936 | 968 | 1000 | 1000 | 1064 |
| 1 | 968 | 1000 | 1064 | 1128 | 1192 | 1224 | 1256 | 1320 | 1352 | 1384 |
| 2 | 1224 | 1256 | 1320 | 1384 | 1416 | 1544 | 1544 | 1608 | 1672 | 1736 |
| 3 | 1608 | 1672 | 1736 | 1800 | 1864 | 1928 | 2024 | 2088 | 2152 | 2280 |

TABLE 6-continued

Second transport block size table-3

| ITBS | | | | | | | | | |
|---|---|---|---|---|---|---|---|---|---|
| 4 | 1928 | 2024 | 2088 | 2280 | 2344 | 2408 | 2536 | 2600 | 2728 | 2792 |
| 5 | 2408 | 2536 | 2664 | 2728 | 2856 | 2984 | 3112 | 3240 | 3240 | 3496 |
| 6 | 2856 | 2984 | 3112 | 3240 | 3368 | 3496 | 3624 | 3880 | 3880 | 4008 |
| 7 | 3240 | 3496 | 3624 | 3880 | 4008 | 4264 | 4392 | 4392 | 4584 | 4776 |
| 8 | 3880 | 4008 | 4264 | 4392 | 4584 | 4776 | 4968 | 4968 | 5160 | 5544 |
| 9 | 4392 | 4584 | 4776 | 4968 | 5160 | 5352 | 5544 | 5736 | 5992 | 6200 |
| 10 | 4968 | 4968 | 5160 | 5544 | 5736 | 5992 | 6200 | 6456 | 6712 | 6968 |
| 11 | 5544 | 5736 | 5992 | 6200 | 6456 | 6968 | 7224 | 7480 | 7736 | 7736 |
| 12 | 6200 | 6456 | 6968 | 7224 | 7480 | 7736 | 7992 | 8504 | 8760 | 8760 |
| 13 | 6968 | 7480 | 7736 | 7992 | 8504 | 8760 | 9144 | 9528 | 9912 | 9912 |
| 14 | 7736 | 7992 | 8504 | 9144 | 9528 | 9912 | 9912 | 10296 | 10680 | 11064 |
| 15 | 8504 | 8760 | 9144 | 9528 | 9912 | 10296 | 10680 | 11064 | 11448 | 11832 |
| 16 | 8760 | 9528 | 9912 | 9912 | 10296 | 11064 | 11448 | 11832 | 12576 | 12960 |
| 17 | 9912 | 10296 | 10680 | 11448 | 11832 | 12216 | 12960 | 13536 | 13536 | 14112 |
| 18 | 10680 | 11448 | 11832 | 12576 | 12960 | 13536 | 14112 | 14112 | 14688 | 15264 |
| 19 | 11832 | 12576 | 12960 | 13536 | 14112 | 14112 | 14688 | 15840 | 16416 | 16992 |
| 20 | 12960 | 13536 | 14112 | 14112 | 14688 | 15840 | 16416 | 16992 | 17568 | 18336 |
| 21 | 14112 | 14112 | 14688 | 15840 | 16416 | 16992 | 17568 | 18336 | 19080 | 19848 |
| 22 | 14688 | 15264 | 16416 | 16992 | 17568 | 18336 | 19080 | 19848 | 20616 | 21384 |
| 23 | 15840 | 16416 | 16992 | 17568 | 18336 | 19080 | 19848 | 20616 | 21384 | 22152 |
| 24 | 16992 | 17568 | 18336 | 19080 | 19848 | 20616 | 21384 | 22152 | 22920 | 23688 |
| 25 | 17568 | 18336 | 19080 | 19848 | 20616 | 21384 | 22152 | 22920 | 23688 | 24496 |
| 26 | 19848 | 21384 | 22152 | 22920 | 23688 | 24496 | 25456 | 26416 | 27376 | 28336 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1128 | 1192 | 1224 | 1256 | 1320 | 1352 | 1352 | 1384 | 1416 |
| 1 | 1480 | 1544 | 1544 | 1608 | 1672 | 1672 | 1736 | 1800 | 1864 | 1864 |
| 2 | 1800 | 1864 | 1928 | 2024 | 2024 | 2088 | 2152 | 2152 | 2280 | 2344 |
| 3 | 2344 | 2408 | 2536 | 2600 | 2664 | 2728 | 2792 | 2856 | 2984 | 3112 |
| 4 | 2856 | 2984 | 3112 | 3112 | 3240 | 3368 | 3496 | 3496 | 3624 | 3752 |
| 5 | 3496 | 3624 | 3752 | 3880 | 4008 | 4008 | 4264 | 4392 | 4584 | 4584 |
| 6 | 4264 | 4392 | 4584 | 4584 | 4776 | 4968 | 4968 | 5160 | 5352 | 5352 |
| 7 | 4968 | 4968 | 5160 | 5352 | 5544 | 5736 | 5992 | 5992 | 6200 | 6456 |
| 8 | 5736 | 5992 | 5992 | 6200 | 6456 | 6456 | 6712 | 6968 | 7224 | 7224 |
| 9 | 6456 | 6712 | 6712 | 6968 | 7224 | 7480 | 7480 | 7736 | 7992 | 7992 |
| 10 | 7224 | 7480 | 7480 | 7736 | 7992 | 7992 | 8504 | 8760 | 8760 | 9144 |
| 11 | 7992 | 8504 | 8760 | 9144 | 9144 | 9528 | 9912 | 9912 | 9912 | 10296 |
| 12 | 9144 | 9528 | 9912 | 9912 | 10296 | 10680 | 11064 | 11448 | 11448 | 11832 |
| 13 | 10296 | 10680 | 11064 | 11448 | 11832 | 11832 | 12576 | 12960 | 12960 | 13536 |
| 14 | 11448 | 11832 | 12576 | 12960 | 12960 | 13536 | 14112 | 14112 | 14112 | 14688 |
| 15 | 12576 | 12960 | 13536 | 13536 | 14112 | 14112 | 14688 | 15264 | 15264 | 15840 |
| 16 | 12960 | 13536 | 14112 | 14112 | 14688 | 15264 | 15840 | 15840 | 16416 | 16992 |
| 17 | 14112 | 14688 | 15264 | 15840 | 16416 | 16992 | 17568 | 17568 | 18336 | 19080 |
| 18 | 15840 | 16416 | 16992 | 17568 | 18336 | 18336 | 19080 | 19848 | 19848 | 20616 |
| 19 | 17568 | 17568 | 18336 | 19080 | 19848 | 19848 | 20616 | 21384 | 22152 | 22152 |
| 20 | 19080 | 19080 | 19848 | 20616 | 21384 | 22152 | 22152 | 22920 | 23688 | 23688 |
| 21 | 20616 | 20616 | 21384 | 22152 | 22920 | 23688 | 23688 | 24496 | 25456 | 25456 |
| 22 | 22152 | 22152 | 22920 | 23688 | 24496 | 24496 | 25456 | 26416 | 27376 | 27376 |
| 23 | 22920 | 23688 | 24496 | 25456 | 25456 | 26416 | 27376 | 28336 | 28336 | 29296 |
| 24 | 24496 | 25456 | 25456 | 26416 | 27376 | 28336 | 29296 | 29296 | 30576 | 31704 |
| 25 | 25456 | 26416 | 26416 | 27376 | 28336 | 29296 | 30576 | 31704 | 31704 | 32856 |
| 26 | 29296 | 30576 | 31704 | 32856 | 32856 | 34008 | 35160 | 36696 | 37888 | 37888 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1544 | 1544 | 1608 | 1608 | 1672 | 1672 | 1736 | 1736 | 1800 |
| 1 | 1928 | 2024 | 2024 | 2088 | 2088 | 2152 | 2280 | 2280 | 2344 | 2344 |
| 2 | 2344 | 2408 | 2536 | 2600 | 2664 | 2728 | 2728 | 2792 | 2856 | 2856 |
| 3 | 3112 | 3240 | 3240 | 3368 | 3368 | 3496 | 3496 | 3624 | 3752 | 3752 |
| 4 | 3880 | 3880 | 4008 | 4008 | 4264 | 4264 | 4392 | 4584 | 4584 | 4776 |
| 5 | 4776 | 4968 | 4968 | 4968 | 5160 | 5160 | 5352 | 5544 | 5736 | 5736 |
| 6 | 5544 | 5736 | 5992 | 5992 | 6200 | 6200 | 6456 | 6456 | 6712 | 6712 |
| 7 | 6456 | 6712 | 6968 | 6968 | 7224 | 7480 | 7480 | 7736 | 7736 | 7992 |
| 8 | 7480 | 7736 | 7736 | 7992 | 7992 | 8504 | 8504 | 8760 | 9144 | 9144 |
| 9 | 8504 | 8760 | 8760 | 9144 | 9144 | 9528 | 9912 | 9912 | 9912 | 10296 |
| 10 | 9528 | 9912 | 9912 | 9912 | 10296 | 10296 | 10680 | 11064 | 11064 | 11448 |
| 11 | 10680 | 11064 | 11448 | 11448 | 11832 | 11832 | 12576 | 12576 | 12960 | 12960 |
| 12 | 12576 | 12216 | 12960 | 12960 | 13536 | 14112 | 14112 | 14112 | 14112 | 14688 |
| 13 | 14112 | 14112 | 14112 | 14688 | 14688 | 15264 | 15840 | 15840 | 16416 | 16992 |
| 14 | 15264 | 15840 | 15840 | 16416 | 16992 | 16992 | 17568 | 17568 | 18336 | 18336 |
| 15 | 16416 | 16992 | 16992 | 17568 | 17568 | 18336 | 19080 | 19080 | 19848 | 19848 |
| 16 | 17568 | 17568 | 18336 | 18336 | 19080 | 19080 | 19848 | 20616 | 20616 | 21384 |
| 17 | 19080 | 19848 | 19848 | 20616 | 21384 | 21384 | 22152 | 22920 | 22920 | 23688 |

TABLE 6-continued

Second transport block size table-3

| | | | | | | | | | |
|---|---|---|---|---|---|---|---|---|---|
| 18 | 21384 | 21384 | 22152 | 22920 | 22920 | 23688 | 23688 | 24496 | 24496 | 25456 |
| 19 | 22920 | 23688 | 23688 | 24496 | 24496 | 25456 | 26416 | 26416 | 27376 | 27376 |
| 20 | 24496 | 25456 | 25456 | 26416 | 26416 | 27376 | 28336 | 28336 | 29296 | 29296 |
| 21 | 26416 | 27376 | 27376 | 28336 | 29296 | 29296 | 30576 | 31704 | 31704 | 32856 |
| 22 | 28336 | 29296 | 29296 | 30576 | 31704 | 31704 | 32856 | 32856 | 34008 | 35160 |
| 23 | 30576 | 31704 | 31704 | 32856 | 32856 | 34008 | 35160 | 35160 | 36696 | 36696 |
| 24 | 32856 | 32856 | 34008 | 34008 | 35160 | 36696 | 36696 | 37888 | 37888 | 39232 |
| 25 | 34008 | 34008 | 35160 | 36696 | 36696 | 37888 | 37888 | 39232 | 40576 | 40576 |
| 26 | 39232 | 39232 | 40576 | 42368 | 42368 | 43816 | 45352 | 45352 | 46888 | 46888 |

| | NPRB | | | | | | | | |
|---|---|---|---|---|---|---|---|---|---|
| ITBS | 51 | 52 | 53 | 54 | 55 | 56 | 57 | 58 | 59 | 60 |
| 0 | 1864 | 1864 | 1928 | 1928 | 2024 | 2024 | 2088 | 2088 | 2088 | 2152 |
| 1 | 2408 | 2408 | 2536 | 2600 | 2600 | 2664 | 2728 | 2728 | 2792 | 2792 |
| 2 | 2984 | 3112 | 3112 | 3112 | 3240 | 3240 | 3240 | 3368 | 3496 | 3496 |
| 3 | 3880 | 3880 | 4008 | 4008 | 4264 | 4264 | 4392 | 4392 | 4584 | 4584 |
| 4 | 4776 | 4968 | 4968 | 4968 | 5160 | 5160 | 5352 | 5352 | 5544 | 5544 |
| 5 | 5992 | 5992 | 6200 | 6200 | 6200 | 6456 | 6456 | 6712 | 6712 | 6968 |
| 6 | 6968 | 6968 | 7224 | 7480 | 7480 | 7736 | 7736 | 7736 | 7992 | 7992 |
| 7 | 7992 | 8504 | 8504 | 8760 | 8760 | 8760 | 9144 | 9144 | 9528 | 9528 |
| 8 | 9528 | 9528 | 9912 | 9912 | 9912 | 9912 | 10296 | 10296 | 10680 | 11064 |
| 9 | 10296 | 10680 | 10680 | 11064 | 11448 | 11448 | 11832 | 11832 | 11832 | 12216 |
| 10 | 11832 | 11832 | 11832 | 12216 | 12576 | 12960 | 12960 | 13536 | 13536 | 14112 |
| 11 | 13536 | 14112 | 14112 | 14112 | 14112 | 14688 | 14688 | 15264 | 15264 | 15840 |
| 12 | 15264 | 15264 | 15840 | 15840 | 16416 | 16416 | 16992 | 16992 | 17568 | 17568 |
| 13 | 16992 | 17568 | 17568 | 18336 | 18336 | 19080 | 19080 | 19080 | 19848 | 19848 |
| 14 | 19080 | 19080 | 19848 | 19848 | 20616 | 20616 | 21384 | 21384 | 22152 | 22152 |
| 15 | 20616 | 20616 | 21384 | 21384 | 22152 | 22152 | 22920 | 22920 | 23688 | 23688 |
| 16 | 21384 | 22152 | 22152 | 22920 | 22920 | 23688 | 23688 | 24496 | 24496 | 25456 |
| 17 | 23688 | 24496 | 24496 | 25456 | 25456 | 26416 | 26416 | 26416 | 27376 | 27376 |
| 18 | 25456 | 26416 | 27376 | 27376 | 28336 | 28336 | 29296 | 29296 | 30576 | 30576 |
| 19 | 28336 | 28336 | 29296 | 29296 | 30576 | 31704 | 31704 | 32856 | 32856 | 32856 |
| 20 | 30576 | 31704 | 31704 | 32856 | 32856 | 34008 | 34008 | 35160 | 35160 | 36696 |
| 21 | 32856 | 34008 | 34008 | 35160 | 35160 | 36696 | 36696 | 37888 | 37888 | 39232 |
| 22 | 35160 | 36696 | 36696 | 37888 | 37888 | 39232 | 39232 | 40576 | 40576 | 42368 |
| 23 | 37888 | 37888 | 39232 | 39232 | 40576 | 40576 | 42368 | 42368 | 43816 | 43816 |
| 24 | 40576 | 40576 | 42368 | 42368 | 43816 | 43816 | 45352 | 45352 | 46888 | 46888 |
| 25 | 42368 | 42368 | 43816 | 43816 | 45352 | 45352 | 46888 | 46888 | 48936 | 48936 |
| 26 | 48936 | 48936 | 51024 | 52752 | 52752 | 52752 | 55056 | 55056 | 57336 | 57336 |

| | NPRB | | | | | | | | |
|---|---|---|---|---|---|---|---|---|---|
| ITBS | 61 | 62 | 63 | 64 | 65 | 66 | 67 | 68 | 69 | 70 |
| 0 | 2152 | 2280 | 2280 | 2344 | 2344 | 2344 | 2408 | 2408 | 2536 | 2536 |
| 1 | 2856 | 2984 | 2984 | 3112 | 3112 | 3112 | 3240 | 3240 | 3240 | 3368 |
| 2 | 3496 | 3624 | 3752 | 3752 | 3752 | 3880 | 3880 | 4008 | 4008 | 4008 |
| 3 | 4776 | 4776 | 4776 | 4968 | 4968 | 4968 | 4968 | 5160 | 5160 | 5352 |
| 4 | 5736 | 5736 | 5992 | 5992 | 5992 | 6200 | 6200 | 6456 | 6456 | 6456 |
| 5 | 6968 | 7224 | 7224 | 7480 | 7480 | 7480 | 7736 | 7736 | 7736 | 7992 |
| 6 | 8504 | 8504 | 8504 | 8760 | 8760 | 9144 | 9144 | 9144 | 9528 | 9528 |
| 7 | 9912 | 9912 | 9912 | 9912 | 10296 | 10296 | 10680 | 10680 | 11064 | 11064 |
| 8 | 11064 | 11448 | 11448 | 11832 | 11832 | 11832 | 12216 | 12576 | 12576 | 12960 |
| 9 | 12216 | 12960 | 12960 | 13536 | 13536 | 13536 | 14112 | 14112 | 14112 | 14112 |
| 10 | 14112 | 14112 | 14112 | 14688 | 14688 | 14688 | 15264 | 15264 | 15840 | 15840 |
| 11 | 15840 | 16416 | 16416 | 16992 | 16992 | 17568 | 17568 | 17568 | 18336 | 18336 |
| 12 | 18336 | 18336 | 18336 | 19080 | 19080 | 19848 | 19848 | 19848 | 20616 | 20616 |
| 13 | 20616 | 20616 | 21384 | 21384 | 22152 | 22152 | 22152 | 22920 | 22920 | 23688 |
| 14 | 22920 | 22920 | 23688 | 23688 | 23688 | 24496 | 24496 | 25456 | 25456 | 25456 |
| 15 | 23688 | 24496 | 24496 | 25456 | 25456 | 26416 | 26416 | 26416 | 27376 | 27376 |
| 16 | 25456 | 25456 | 26416 | 26416 | 27376 | 27376 | 28336 | 28336 | 28336 | 29296 |
| 17 | 28336 | 28336 | 29296 | 29296 | 30576 | 30576 | 31704 | 31704 | 31704 | 32856 |
| 18 | 31704 | 31704 | 31704 | 32856 | 32856 | 34008 | 34008 | 35160 | 35160 | 35160 |
| 19 | 34008 | 34008 | 35160 | 35160 | 36696 | 36696 | 37888 | 37888 | 37888 | 39232 |
| 20 | 36696 | 37888 | 37888 | 37888 | 39232 | 39232 | 40576 | 40576 | 40576 | 42368 |
| 21 | 39232 | 40576 | 40576 | 40576 | 42368 | 42368 | 43816 | 43816 | 45352 | 45352 |
| 22 | 42368 | 43816 | 43816 | 43816 | 45352 | 45352 | 46888 | 46888 | 46888 | 48936 |
| 23 | 45352 | 45352 | 46888 | 46888 | 48936 | 48936 | 48936 | 51024 | 51024 | 52752 |
| 24 | 46888 | 48936 | 48936 | 51024 | 51024 | 52752 | 52752 | 55056 | 55056 | 55056 |

TABLE 6-continued

Second transport block size table-3

| | | | | | | | | | |
|---|---|---|---|---|---|---|---|---|---|
| 25 | 51024 | 51024 | 52752 | 52752 | 52752 | 55056 | 55056 | 57336 | 57336 | 57336 |
| 26 | 59256 | 59256 | 61664 | 61664 | 63776 | 63776 | 63776 | 66592 | 66592 | 68808 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2728 | 2728 | 2728 | 2792 | 2792 | 2856 | 2856 |
| 1 | 3368 | 3368 | 3496 | 3496 | 3496 | 3624 | 3624 | 3752 | 3752 | 3752 |
| 2 | 4264 | 4264 | 4264 | 4392 | 4392 | 4392 | 4584 | 4584 | 4584 | 4776 |
| 3 | 5352 | 5544 | 5544 | 5736 | 5736 | 5736 | 5992 | 5992 | 5992 | 6200 |
| 4 | 6712 | 6712 | 6712 | 6968 | 6968 | 7224 | 7224 | 7224 | 7480 | 7480 |
| 5 | 7992 | 7992 | 8504 | 8504 | 8760 | 8760 | 8760 | 9144 | 9144 | 9144 |
| 6 | 9912 | 9912 | 9912 | 9912 | 9912 | 10296 | 10296 | 10680 | 10680 | 10680 |
| 7 | 11448 | 11448 | 11448 | 11832 | 11832 | 11832 | 12216 | 12216 | 12576 | 12960 |
| 8 | 12960 | 12960 | 13536 | 13536 | 14112 | 14112 | 14112 | 14112 | 14112 | 14112 |
| 9 | 14112 | 14688 | 14688 | 15264 | 15264 | 15264 | 15840 | 15840 | 16416 | 16416 |
| 10 | 16416 | 16416 | 16992 | 16992 | 16992 | 17568 | 17568 | 17568 | 18336 | 18336 |
| 11 | 18336 | 19080 | 19080 | 19848 | 19848 | 20616 | 20616 | 20616 | 21384 |
| 12 | 21384 | 21384 | 21384 | 22152 | 22152 | 22920 | 22920 | 22920 | 23688 | 23688 |
| 13 | 23688 | 23688 | 24496 | 24496 | 24496 | 25456 | 25456 | 25456 | 26416 | 26416 |
| 14 | 26416 | 26416 | 26416 | 27376 | 27376 | 28336 | 28336 | 28336 | 29296 | 29296 |
| 15 | 28336 | 28336 | 28336 | 29296 | 29296 | 30576 | 30576 | 30576 | 31704 | 31704 |
| 16 | 29296 | 30576 | 30576 | 31704 | 31704 | 31704 | 32856 | 32856 | 32856 | 34008 |
| 17 | 32856 | 34008 | 34008 | 34008 | 35160 | 35160 | 35160 | 36696 | 36696 | 37888 |
| 18 | 36696 | 36696 | 37888 | 37888 | 37888 | 39232 | 39232 | 39232 | 40576 | 40576 |
| 19 | 39232 | 39232 | 40576 | 40576 | 42368 | 42368 | 42368 | 43816 | 43816 | 43816 |
| 20 | 42368 | 43816 | 43816 | 43816 | 45352 | 45352 | 45352 | 46888 | 46888 | 46888 |
| 21 | 45352 | 46888 | 46888 | 46888 | 48936 | 48936 | 51024 | 51024 | 51024 | 52752 |
| 22 | 48936 | 51024 | 51024 | 52752 | 52752 | 52752 | 55056 | 55056 | 55056 | 57336 |
| 23 | 52752 | 52752 | 55056 | 55056 | 57336 | 57336 | 57336 | 59256 | 59256 | 59256 |
| 24 | 57336 | 57336 | 59256 | 59256 | 59256 | 61664 | 61664 | 61664 | 63776 | 63776 |
| 25 | 59256 | 59256 | 61664 | 61664 | 61664 | 63776 | 63776 | 63776 | 66592 | 66592 |
| 26 | 68808 | 68808 | 71112 | 71112 | 71112 | 71112 | 73712 | 73712 | 75376 | 76208 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2984 | 2984 | 2984 | 3112 | 3112 | 3112 | 3112 | 3240 | 3240 | 3240 |
| 1 | 3880 | 3880 | 3880 | 4008 | 4008 | 4008 | 4264 | 4264 | 4264 | 4264 |
| 2 | 4776 | 4776 | 4968 | 4968 | 4968 | 4968 | 4968 | 5160 | 5160 | 5160 |
| 3 | 6200 | 6200 | 6200 | 6456 | 6456 | 6456 | 6712 | 6712 | 6712 | 6968 |
| 4 | 7480 | 7736 | 7736 | 7736 | 7736 | 7992 | 7992 | 7992 | 8504 | 8504 |
| 5 | 9528 | 9528 | 9528 | 9912 | 9912 | 9912 | 9912 | 9912 | 9912 | 10296 |
| 6 | 11064 | 11064 | 11448 | 11448 | 11448 | 11832 | 11832 | 11832 | 11832 | 12216 |
| 7 | 12960 | 12960 | 13536 | 13536 | 13536 | 14112 | 14112 | 14112 | 14112 | 14112 |
| 8 | 14688 | 14688 | 14688 | 15264 | 15264 | 15840 | 15840 | 16416 | 16416 | 16416 |
| 9 | 16992 | 16992 | 16992 | 17568 | 17568 | 17568 | 17568 | 18336 | 18336 | 18336 |
| 10 | 18336 | 19080 | 19080 | 19080 | 19080 | 19848 | 19848 | 19848 | 20616 | 20616 |
| 11 | 21384 | 21384 | 22152 | 22152 | 22152 | 22920 | 22920 | 22920 | 23688 | 23688 |
| 12 | 23688 | 24496 | 24496 | 24496 | 25456 | 25456 | 25456 | 26416 | 26416 |
| 13 | 26416 | 27376 | 27376 | 27376 | 28336 | 28336 | 28336 | 29296 | 29296 | 29296 |
| 14 | 29296 | 30576 | 30576 | 31704 | 31704 | 31704 | 32856 | 32856 | 32856 | 32856 |
| 15 | 31704 | 32856 | 32856 | 32856 | 34008 | 34008 | 34008 | 35160 | 35160 | 35160 |
| 16 | 34008 | 34008 | 35160 | 35160 | 35160 | 36696 | 36696 | 37888 | 37888 |
| 17 | 37888 | 37888 | 39232 | 39232 | 39232 | 39232 | 40576 | 40576 | 40576 | 42368 |
| 18 | 40576 | 42368 | 42368 | 42368 | 43816 | 43816 | 43816 | 45352 | 45352 | 45352 |
| 19 | 45352 | 45352 | 45352 | 46888 | 46888 | 46888 | 48936 | 48936 | 48936 | 51024 |
| 20 | 48936 | 48936 | 51024 | 51024 | 51024 | 52752 | 52752 | 52752 | 55056 | 55056 |
| 21 | 52752 | 52752 | 55056 | 55056 | 55056 | 57336 | 57336 | 57336 | 59256 |
| 22 | 57336 | 57336 | 59256 | 59256 | 59256 | 61664 | 61664 | 61664 | 63776 | 63776 |
| 23 | 61664 | 61664 | 61664 | 63776 | 63776 | 63776 | 66592 | 66592 | 66592 | 66592 |
| 24 | 63776 | 66592 | 66592 | 66592 | 68808 | 68808 | 68808 | 68808 | 71112 | 71112 |
| 25 | 66592 | 68808 | 68808 | 68808 | 71112 | 71112 | 71112 | 71112 | 73712 | 73712 |
| 26 | 76208 | 76208 | 81176 | 81176 | 81176 | 81176 | 81176 | 81176 | 87936 | 87936 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 3240 | 3368 | 3368 | 3368 | 3496 | 3496 | 3496 | 3496 | 3496 | 3624 |
| 1 | 4392 | 4392 | 4776 | 4584 | 4584 | 4584 | 4776 | 4776 | 4776 |
| 2 | 5352 | 5352 | 5352 | 5544 | 5544 | 5544 | 5736 | 5736 | 5736 | 5992 |
| 3 | 6968 | 6968 | 6968 | 7224 | 7224 | 7224 | 7480 | 7480 | 7480 | 7480 |
| 4 | 8504 | 8504 | 8760 | 8760 | 8760 | 9144 | 9144 | 9144 | 9144 | 9528 |
| 5 | 10296 | 10296 | 10680 | 10680 | 10680 | 11064 | 11064 | 11448 | 11448 | 11448 |
| 6 | 12576 | 12576 | 12576 | 12960 | 12960 | 12960 | 13536 | 13536 | 13536 | 13536 |

TABLE 6-continued

Second transport block size table-3

| ITBS | | | | | | | | | | |
|---|---|---|---|---|---|---|---|---|---|---|
| 7 | 14112 | 14688 | 14688 | 14688 | 14688 | 15264 | 15264 | 15264 | 15840 | 15840 |
| 8 | 16416 | 16992 | 16992 | 16992 | 17568 | 17568 | 17568 | 17568 | 18336 | 18336 |
| 9 | 18336 | 19080 | 19080 | 19080 | 19848 | 19848 | 19848 | 19848 | 20616 | 20616 |
| 10 | 20616 | 21384 | 21384 | 21384 | 22152 | 22152 | 22152 | 22152 | 22920 | 22920 |
| 11 | 23688 | 23688 | 24496 | 24496 | 24496 | 24496 | 25456 | 25456 | 25456 | 25456 |
| 12 | 26416 | 27376 | 27376 | 27376 | 27376 | 28336 | 28336 | 29296 | 29296 | 29296 |
| 13 | 30576 | 30576 | 30576 | 31704 | 31704 | 31704 | 32856 | 32856 | 32856 | 32856 |
| 14 | 34008 | 34008 | 34008 | 35160 | 35160 | 35160 | 36696 | 36696 | 36696 | 36696 |
| 15 | 36696 | 36696 | 36696 | 37888 | 37888 | 37888 | 37888 | 39232 | 39232 | 39232 |
| 16 | 37888 | 39232 | 39232 | 39232 | 39232 | 40576 | 40576 | 40576 | 40576 | 42368 |
| 17 | 42368 | 42368 | 43816 | 43816 | 43816 | 45352 | 45352 | 45352 | 45352 | 46888 |
| 18 | 46888 | 46888 | 46888 | 48936 | 48936 | 48936 | 48936 | 51024 | 51024 | 51024 |
| 19 | 51024 | 51024 | 52752 | 52752 | 52752 | 52752 | 55056 | 55056 | 55056 | 57336 |
| 20 | 55056 | 55056 | 57336 | 57336 | 57336 | 59256 | 59256 | 59256 | 61664 | 61664 |
| 21 | 59256 | 61664 | 61664 | 61664 | 61664 | 63776 | 63776 | 63776 | 63776 | 66592 |
| 22 | 63776 | 63776 | 66592 | 66592 | 66592 | 66592 | 68808 | 68808 | 68808 | 71112 |
| 23 | 68808 | 68808 | 68808 | 71112 | 71112 | 71112 | 71112 | 73712 | 73712 | 73712 |
| 24 | 71112 | 73712 | 73712 | 73712 | 73712 | 76208 | 76208 | 76208 | 81176 | 81176 |
| 25 | 73712 | 76208 | 76208 | 76208 | 81176 | 81176 | 81176 | 81176 | 81176 | 81176 |
| 26 | 87936 | 90816 | 90816 | 90816 | 93800 | 93800 | 93800 | 97896 | 97896 | 97896 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 3624 | 3752 | 3752 | 3752 | 3880 | 3880 | 3880 | 3880 | 3880 | 4008 |
| 1 | 4968 | 4968 | 4968 | 4968 | 4968 | 4968 | 4968 | 5160 | 5160 | 5160 |
| 2 | 5992 | 5992 | 5992 | 5992 | 6200 | 6200 | 6200 | 6200 | 6456 | 6456 |
| 3 | 7736 | 7736 | 7736 | 7736 | 7992 | 7992 | 7992 | 7992 | 8504 | 8504 |
| 4 | 9528 | 9528 | 9912 | 9912 | 9912 | 9912 | 9912 | 9912 | 9912 | 10296 |
| 5 | 11448 | 11832 | 11832 | 11832 | 11832 | 12576 | 12216 | 12216 | 12576 | 12576 |
| 6 | 14112 | 14112 | 14112 | 14112 | 14112 | 14112 | 14112 | 14688 | 14688 | 14688 |
| 7 | 15840 | 16416 | 16416 | 16416 | 16992 | 16992 | 16992 | 16992 | 17568 | 17568 |
| 8 | 18336 | 18336 | 19080 | 19080 | 19080 | 19080 | 19848 | 19848 | 19848 | 19848 |
| 9 | 20616 | 21384 | 21384 | 21384 | 21384 | 22152 | 22152 | 22152 | 22152 | 22920 |
| 10 | 22920 | 23688 | 23688 | 23688 | 23688 | 23688 | 24496 | 24496 | 24496 | 24496 |
| 11 | 26416 | 26416 | 26416 | 27376 | 27376 | 27376 | 27376 | 28336 | 28336 | 28336 |
| 12 | 29296 | 30576 | 30576 | 30576 | 30576 | 31704 | 31704 | 31704 | 31704 | 32856 |
| 13 | 34008 | 34008 | 34008 | 34008 | 35160 | 35160 | 35160 | 35160 | 36696 | 36696 |
| 14 | 37888 | 37888 | 37888 | 37888 | 39232 | 39232 | 39232 | 40576 | 40576 | 40576 |
| 15 | 39232 | 40576 | 40576 | 40576 | 40576 | 42368 | 42368 | 42368 | 43816 | 43816 |
| 16 | 42368 | 42368 | 43816 | 43816 | 43816 | 43816 | 45352 | 45352 | 45352 | 45352 |
| 17 | 46888 | 46888 | 46888 | 48936 | 48936 | 48936 | 51024 | 51024 | 51024 | 51024 |
| 18 | 52752 | 52752 | 52752 | 52752 | 55056 | 55056 | 55056 | 55056 | 57336 | 57336 |
| 19 | 57336 | 57336 | 57336 | 59256 | 59256 | 59256 | 61664 | 61664 | 61664 | 61664 |
| 20 | 61664 | 61664 | 63776 | 63776 | 63776 | 63776 | 63776 | 66592 | 66592 | 66592 |
| 21 | 66592 | 66592 | 66592 | 68808 | 68808 | 68808 | 68808 | 71112 | 71112 | 71112 |
| 22 | 71112 | 71112 | 71112 | 75376 | 73712 | 75376 | 75376 | 76208 | 76208 | 76208 |
| 23 | 73712 | 76208 | 76208 | 76208 | 76208 | 81176 | 81176 | 81176 | 81176 | 81176 |
| 24 | 81176 | 81176 | 81176 | 81176 | 81176 | 81176 | 87936 | 87936 | 87936 | 87936 |
| 25 | 81176 | 81176 | 87936 | 87936 | 87936 | 87936 | 90816 | 90816 | 90816 | 93800 |
| 26 | 97896 | 97896 | 97896 | 97896 | 97896 | 97896 | 97896 | 97896 | 97896 | 97896 |

For all TBS values included in Table 6, some may be included in the layer-1 data transport block size table shown in Table 1 and others may be included in the set layer-2 data transport block size table, where the set layer-2 data transport block size table is shown in Table 7.

TABLE 7

Set layer-2 data transport block size table

| TBS_L1 | TBS_L2 |
|---|---|
| 1544 | 3112 |
| 1608 | 3240 |
| 1672 | 3368 |
| 1736 | 3496 |
| 1800 | 3624 |
| 1864 | 3752 |
| 1928 | 3880 |
| 1992 | 4008 |
| 2024 | 4008 |
| 2088 | 4136 |
| 2152 | 4264 |
| 2216 | 4392 |
| 2280 | 4584 |
| 2344 | 4776 |
| 2408 | 4776 |
| 2472 | 4968 |
| 2536 | 5160 |
| 2600 | 5160 |
| 2664 | 5352 |
| 2728 | 5544 |
| 2792 | 5544 |
| 2856 | 5736 |
| 2984 | 5992 |
| 3112 | 6200 |
| 3240 | 6456 |

TABLE 7-continued

Set layer-2 data transport block size table

| TBS_L1 | TBS_L2 |
|---|---|
| 3368 | 6712 |
| 3496 | 6968 |
| 3624 | 7224 |
| 3752 | 7480 |
| 3880 | 7736 |
| 4008 | 7992 |
| 4136 | 8248 |
| 4264 | 8504 |
| 4392 | 8760 |
| 4584 | 9144 |
| 4776 | 9528 |
| 4968 | 9912 |
| 5160 | 10296 |
| 5352 | 10680 |
| 5544 | 11064 |
| 5736 | 11448 |
| 5992 | 11832 |
| 6200 | 12576 |
| 6456 | 12960 |
| 6712 | 13536 |
| 6968 | 14112 |
| 7224 | 14688 |
| 7480 | 14688 |
| 7736 | 15264 |
| 7992 | 15840 |
| 8248 | 16416 |
| 8504 | 16992 |
| 8760 | 17568 |
| 9144 | 18336 |
| 9528 | 19080 |
| 9912 | 19848 |
| 10296 | 20616 |
| 10680 | 21384 |
| 11064 | 22152 |
| 11448 | 22920 |
| 11832 | 23688 |
| 12216 | 24496 |
| 12576 | 25456 |
| 12960 | 25456 |
| 13536 | 27376 |
| 14112 | 28336 |
| 14688 | 29296 |
| 15264 | 30576 |
| 15840 | 31704 |
| 16416 | 32856 |
| 16992 | 34008 |
| 17568 | 35160 |
| 18336 | 36696 |
| 19080 | 37888 |
| 19848 | 39232 |
| 20616 | 40576 |
| 21384 | 42368 |
| 22152 | 43816 |
| 22920 | 45352 |
| 23688 | 46888 |
| 24496 | 48936 |
| 25456 | 51024 |
| 26416 | 52752 |
| 27376 | 55056 |
| 28336 | 57336 |
| 29296 | 59256 |
| 30576 | 61664 |
| 31704 | 63776 |
| 32856 | 66592 |
| 34008 | 68808 |
| 35160 | 71112 |
| 36696 | 73712 |
| 37888 | 76208 |
| 39232 | 78704 |
| 40576 | 81176 |
| 42368 | 84760 |
| 43816 | 87936 |
| 45352 | 90816 |
| 46888 | 93800 |
| 48936 | 97896 |
| 51024 | 101840 |
| 52752 | 105528 |
| 55056 | 110136 |
| 57336 | 115040 |
| 59256 | 119816 |
| 61664 | 124464 |
| 63776 | 128496 |
| 66592 | 133208 |
| 68808 | 137792 |
| 71112 | 142248 |
| 73712 | 146856 |
| 75376 | 149776 |

Alternatively, the second transport block size table may further be shown in Table 8. When a TBS is determined in the second transport block size table shown in Table 8, the determined TBS value is a TBS in the first transport block size table or the layer-2 data transport block size table, and a coding rate corresponding to the determined TBS value in the LTE REL.12 system with the system overhead of 12 REs is closer to the target coding rate than coding rates corresponding to other TBSs in the first transport block size table or the layer-2 data transport block size table in the LTE REL.12 system with the system overhead of 12 REs, where the target coding rate may be the optimized coding rate of the coding rate corresponding to the modulation and coding scheme level in LTE REL.8 shown in Table 3.

TABLE 8

Second transport block size table-4

| ITBS | NPRB | | | | | | | | | |
|---|---|---|---|---|---|---|---|---|---|---|
| | 1 | 2 | 3 | 4 | 5 | 6 | 7 | 8 | 9 | 10 |
| 0 | 16 | 56 | 88 | 120 | 152 | 208 | 224 | 280 | 296 | 344 |
| 1 | 24 | 72 | 120 | 176 | 208 | 256 | 296 | 344 | 408 | 456 |
| 2 | 32 | 88 | 152 | 208 | 280 | 328 | 392 | 440 | 504 | 568 |
| 3 | 56 | 136 | 208 | 280 | 344 | 440 | 504 | 584 | 680 | 744 |
| 4 | 72 | 152 | 256 | 344 | 440 | 536 | 632 | 712 | 808 | 904 |
| 5 | 88 | 208 | 328 | 440 | 552 | 680 | 776 | 904 | 1000 | 1128 |
| 6 | 120 | 256 | 392 | 520 | 648 | 808 | 936 | 1064 | 1192 | 1352 |
| 7 | 136 | 296 | 456 | 616 | 776 | 936 | 1096 | 1256 | 1416 | 1608 |
| 8 | 152 | 344 | 520 | 712 | 904 | 1064 | 1256 | 1416 | 1608 | 1800 |
| 9 | 176 | 392 | 600 | 808 | 1000 | 1224 | 1416 | 1608 | 1864 | 2024 |
| 10 | 208 | 440 | 680 | 904 | 1128 | 1352 | 1608 | 1800 | 2024 | 2280 |
| 11 | 256 | 504 | 776 | 1032 | 1288 | 1544 | 1800 | 2088 | 2344 | 2600 |
| 12 | 280 | 568 | 872 | 1160 | 1480 | 1736 | 2088 | 2344 | 2664 | 2984 |

TABLE 8-continued

Second transport block size table-4

| | | | | | | | | | |
|---|---|---|---|---|---|---|---|---|---|
| 13 | 328 | 648 | 1000 | 1320 | 1672 | 1992 | 2344 | 2664 | 2984 | 3368 |
| 14 | 344 | 712 | 1096 | 1480 | 1864 | 2216 | 2600 | 2984 | 3368 | 3752 |
| 15 | 376 | 776 | 1192 | 1608 | 1992 | 2408 | 2792 | 3240 | 3624 | 4008 |
| 16 | 408 | 840 | 1256 | 1672 | 2088 | 2536 | 2984 | 3368 | 3752 | 4264 |
| 17 | 456 | 936 | 1384 | 1864 | 2344 | 2792 | 3240 | 3752 | 4264 | 4776 |
| 18 | 488 | 1000 | 1544 | 2024 | 2536 | 3112 | 3624 | 4136 | 4584 | 5160 |
| 19 | 536 | 1096 | 1672 | 2216 | 2792 | 3368 | 3880 | 4392 | 4968 | 5544 |
| 20 | 584 | 1192 | 1800 | 2408 | 2984 | 3624 | 4264 | 4776 | 5544 | 5992 |
| 21 | 632 | 1288 | 1928 | 2600 | 3240 | 3880 | 4584 | 5160 | 5992 | 6456 |
| 22 | 680 | 1384 | 2088 | 2792 | 3496 | 4264 | 4968 | 5544 | 6200 | 6968 |
| 23 | 712 | 1480 | 2216 | 2984 | 3752 | 4392 | 5160 | 5992 | 6712 | 7480 |
| 24 | 776 | 1544 | 2344 | 3112 | 4008 | 4776 | 5544 | 6200 | 7224 | 7992 |
| 25 | 808 | 1608 | 2472 | 3240 | 4136 | 4968 | 5736 | 6456 | 7480 | 8248 |
| 26 | 840 | 1736 | 2600 | 3496 | 4264 | 5160 | 5992 | 6968 | 7736 | 8504 |

| | NPRB | | | | | | | | |
|---|---|---|---|---|---|---|---|---|---|
| ITBS | 11 | 12 | 13 | 14 | 15 | 16 | 17 | 18 | 19 | 20 |
| 0 | 376 | 408 | 456 | 488 | 520 | 568 | 600 | 632 | 680 | 712 |
| 1 | 504 | 552 | 600 | 648 | 696 | 744 | 776 | 840 | 872 | 936 |
| 2 | 616 | 680 | 744 | 808 | 872 | 904 | 968 | 1032 | 1096 | 1160 |
| 3 | 808 | 904 | 968 | 1032 | 1128 | 1192 | 1288 | 1352 | 1416 | 1480 |
| 4 | 1000 | 1096 | 1192 | 1288 | 1384 | 1480 | 1544 | 1672 | 1736 | 1864 |
| 5 | 1256 | 1352 | 1480 | 1608 | 1736 | 1800 | 1928 | 2024 | 2152 | 2280 |
| 6 | 1480 | 1608 | 1736 | 1864 | 2024 | 2152 | 2280 | 2408 | 2600 | 2728 |
| 7 | 1736 | 1928 | 2088 | 2216 | 2408 | 2536 | 2728 | 2856 | 2984 | 3240 |
| 8 | 1992 | 2152 | 2344 | 2536 | 2728 | 2856 | 3112 | 3240 | 3496 | 3624 |
| 9 | 2280 | 2472 | 2664 | 2856 | 3112 | 3240 | 3496 | 3752 | 3880 | 4136 |
| 10 | 2536 | 2728 | 2984 | 3240 | 3368 | 3624 | 3880 | 4136 | 4392 | 4584 |
| 11 | 2856 | 3112 | 3368 | 3624 | 3880 | 4264 | 4392 | 4776 | 4968 | 5352 |
| 12 | 3240 | 3496 | 3880 | 4136 | 4392 | 4776 | 4968 | 5352 | 5736 | 5992 |
| 13 | 3624 | 4008 | 4392 | 4776 | 4968 | 5352 | 5736 | 5992 | 6456 | 6712 |
| 14 | 4136 | 4392 | 4776 | 5160 | 5544 | 5992 | 6200 | 6712 | 6968 | 7480 |
| 15 | 4392 | 4776 | 5160 | 5544 | 5992 | 6456 | 6712 | 7224 | 7480 | 7992 |
| 16 | 4584 | 5160 | 5544 | 5992 | 6200 | 6712 | 7224 | 7480 | 7992 | 8504 |
| 17 | 5160 | 5736 | 5992 | 6456 | 6968 | 7480 | 7992 | 8504 | 8760 | 9528 |
| 18 | 5736 | 6200 | 6712 | 7224 | 7736 | 8248 | 8760 | 9144 | 9912 | 10296 |
| 19 | 6200 | 6712 | 7224 | 7736 | 8248 | 8760 | 9528 | 9912 | 10680 | 11064 |
| 20 | 6712 | 7224 | 7736 | 8504 | 9144 | 9528 | 10296 | 11064 | 11448 | 12216 |
| 21 | 7224 | 7736 | 8504 | 9144 | 9912 | 10296 | 11064 | 11832 | 12576 | 12960 |
| 22 | 7736 | 8504 | 9144 | 9912 | 10680 | 11064 | 11832 | 12576 | 13536 | 14112 |
| 23 | 8248 | 8760 | 9528 | 10296 | 11064 | 11832 | 12576 | 13536 | 14112 | 14688 |
| 24 | 8760 | 9528 | 10296 | 11064 | 11832 | 12576 | 13536 | 14112 | 15264 | 15840 |
| 25 | 9144 | 9912 | 10680 | 11448 | 12216 | 12960 | 14112 | 14688 | 15840 | 16416 |
| 26 | 9528 | 10296 | 11064 | 12216 | 12960 | 13536 | 14688 | 15264 | 16416 | 16992 |

| | NPRB | | | | | | | | |
|---|---|---|---|---|---|---|---|---|---|
| ITBS | 21 | 22 | 23 | 24 | 25 | 26 | 27 | 28 | 29 | 30 |
| 0 | 744 | 776 | 808 | 840 | 904 | 936 | 968 | 1000 | 1032 | 1064 |
| 1 | 968 | 1032 | 1064 | 1128 | 1160 | 1224 | 1256 | 1320 | 1352 | 1416 |
| 2 | 1224 | 1256 | 1320 | 1384 | 1416 | 1480 | 1544 | 1608 | 1672 | 1736 |
| 3 | 1608 | 1672 | 1736 | 1800 | 1864 | 1992 | 2024 | 2088 | 2216 | 2280 |
| 4 | 1928 | 2024 | 2152 | 2216 | 2344 | 2408 | 2536 | 2600 | 2728 | 2792 |
| 5 | 2408 | 2536 | 2600 | 2728 | 2856 | 2984 | 3112 | 3240 | 3368 | 3496 |
| 6 | 2856 | 2984 | 3112 | 3240 | 3368 | 3496 | 3624 | 3752 | 3880 | 4136 |
| 7 | 3368 | 3496 | 3624 | 3880 | 4008 | 4136 | 4264 | 4392 | 4584 | 4776 |
| 8 | 3880 | 4008 | 4136 | 4392 | 4584 | 4776 | 4968 | 5160 | 5352 | 5544 |
| 9 | 4264 | 4584 | 4776 | 4968 | 5160 | 5352 | 5544 | 5736 | 5992 | 6200 |
| 10 | 4776 | 4968 | 5352 | 5544 | 5736 | 5992 | 6200 | 6456 | 6712 | 6712 |
| 11 | 5544 | 5736 | 5992 | 6200 | 6456 | 6712 | 6968 | 7224 | 7480 | 7736 |
| 12 | 6200 | 6456 | 6712 | 6968 | 7480 | 7736 | 7992 | 8248 | 8504 | 8760 |
| 13 | 6968 | 7224 | 7736 | 7992 | 8248 | 8760 | 9144 | 9528 | 9528 | 9912 |
| 14 | 7736 | 8248 | 8504 | 8760 | 9144 | 9528 | 9912 | 10296 | 10680 | 11064 |
| 15 | 8248 | 8760 | 9144 | 9528 | 9912 | 10296 | 10680 | 11064 | 11448 | 11832 |
| 16 | 8760 | 9144 | 9912 | 10296 | 10680 | 11064 | 11448 | 11832 | 12216 | 12576 |
| 17 | 9912 | 10296 | 10680 | 11448 | 11832 | 12216 | 12576 | 12960 | 13536 | 14112 |
| 18 | 10680 | 11448 | 11832 | 12216 | 12960 | 13536 | 14112 | 14688 | 14688 | 15264 |
| 19 | 11832 | 12216 | 12960 | 13536 | 14112 | 14688 | 15264 | 15840 | 16416 | 16992 |
| 20 | 12576 | 13536 | 14112 | 14688 | 15264 | 15840 | 16416 | 16992 | 17568 | 18336 |
| 21 | 13536 | 14112 | 15264 | 15840 | 16416 | 16992 | 17568 | 18336 | 19080 | 19848 |
| 22 | 14688 | 15264 | 16416 | 16992 | 17568 | 18336 | 19080 | 19848 | 20616 | 21384 |
| 23 | 15840 | 16416 | 16992 | 17568 | 18336 | 19080 | 19848 | 20616 | 21384 | 22152 |
| 24 | 16416 | 17568 | 18336 | 19080 | 19848 | 20616 | 21384 | 22152 | 22920 | 23688 |

TABLE 8-continued

Second transport block size table-4

| | | | | | | | | | |
|---|---|---|---|---|---|---|---|---|---|
| 25 | 17568 | 18336 | 19080 | 19848 | 20616 | 21384 | 22152 | 22920 | 23688 | 24496 |
| 26 | 18336 | 19080 | 19848 | 20616 | 21384 | 22152 | 22920 | 24496 | 25456 | 25456 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1160 | 1192 | 1224 | 1256 | 1288 | 1320 | 1352 | 1416 | 1416 |
| 1 | 1480 | 1480 | 1544 | 1608 | 1672 | 1672 | 1736 | 1800 | 1864 | 1864 |
| 2 | 1800 | 1864 | 1928 | 1992 | 2024 | 2088 | 2152 | 2216 | 2280 | 2344 |
| 3 | 2344 | 2408 | 2472 | 2600 | 2664 | 2728 | 2792 | 2856 | 2984 | 2984 |
| 4 | 2856 | 2984 | 3112 | 3112 | 3240 | 3368 | 3496 | 3496 | 3624 | 3752 |
| 5 | 3496 | 3624 | 3752 | 3880 | 4008 | 4136 | 4264 | 4392 | 4392 | 4584 |
| 6 | 4264 | 4392 | 4584 | 4584 | 4776 | 4968 | 4968 | 5160 | 5352 | 5544 |
| 7 | 4968 | 5160 | 5352 | 5352 | 5544 | 5736 | 5992 | 5992 | 6200 | 6456 |
| 8 | 5736 | 5736 | 5992 | 6200 | 6456 | 6456 | 6712 | 6968 | 6968 | 7224 |
| 9 | 6456 | 6456 | 6712 | 6968 | 7224 | 7480 | 7480 | 7736 | 7992 | 8248 |
| 10 | 6968 | 7224 | 7480 | 7736 | 7992 | 8248 | 8504 | 8760 | 8760 | 9144 |
| 11 | 8248 | 8504 | 8760 | 8760 | 9144 | 9528 | 9528 | 9912 | 10296 | 10680 |
| 12 | 9144 | 9528 | 9912 | 9912 | 10296 | 10680 | 11064 | 11448 | 11448 | 11832 |
| 13 | 10296 | 10680 | 11064 | 11448 | 11832 | 12216 | 12216 | 12576 | 12960 | 13536 |
| 14 | 11448 | 11832 | 12216 | 12576 | 12960 | 13536 | 13536 | 14112 | 14688 | 14688 |
| 15 | 12216 | 12576 | 12960 | 13536 | 14112 | 14112 | 14688 | 15264 | 15264 | 15840 |
| 16 | 12960 | 13536 | 14112 | 14112 | 14688 | 15264 | 15840 | 15840 | 16416 | 16992 |
| 17 | 14688 | 15264 | 15264 | 15840 | 16416 | 16992 | 17568 | 17568 | 18336 | 19080 |
| 18 | 15840 | 16416 | 16992 | 17568 | 18336 | 18336 | 19080 | 19848 | 19848 | 20616 |
| 19 | 17568 | 17568 | 18336 | 19080 | 19848 | 19848 | 20616 | 21384 | 22152 | 22152 |
| 20 | 19080 | 19080 | 19848 | 20616 | 21384 | 22152 | 22152 | 22920 | 23688 | 24496 |
| 21 | 20616 | 20616 | 21384 | 22152 | 22920 | 23688 | 24496 | 24496 | 25456 | 26416 |
| 22 | 21384 | 22152 | 22920 | 23688 | 24496 | 25456 | 26416 | 26416 | 27376 | 28336 |
| 23 | 22920 | 23688 | 24496 | 25456 | 26416 | 26416 | 27376 | 28336 | 29296 | 29296 |
| 24 | 24496 | 25456 | 26416 | 27376 | 27376 | 28336 | 29296 | 30576 | 30576 | 31704 |
| 25 | 25456 | 26416 | 27376 | 28336 | 29296 | 29296 | 30576 | 31704 | 31704 | 32856 |
| 26 | 26416 | 27376 | 28336 | 29296 | 30576 | 30576 | 31704 | 32856 | 34008 | 34008 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1480 | 1544 | 1608 | 1608 | 1672 | 1672 | 1736 | 1736 | 1800 |
| 1 | 1928 | 1992 | 2024 | 2088 | 2152 | 2152 | 2216 | 2280 | 2344 | 2344 |
| 2 | 2408 | 2472 | 2536 | 2536 | 2600 | 2664 | 2728 | 2792 | 2856 | 2856 |
| 3 | 3112 | 3240 | 3240 | 3368 | 3368 | 3496 | 3624 | 3624 | 3752 | 3752 |
| 4 | 3880 | 3880 | 4008 | 4136 | 4136 | 4264 | 4392 | 4392 | 4584 | 4584 |
| 5 | 4776 | 4776 | 4968 | 4968 | 5160 | 5352 | 5352 | 5544 | 5544 | 5736 |
| 6 | 5544 | 5736 | 5736 | 5992 | 6200 | 6200 | 6456 | 6456 | 6712 | 6712 |
| 7 | 6456 | 6712 | 6712 | 6968 | 7224 | 7224 | 7480 | 7736 | 7736 | 7992 |
| 8 | 7480 | 7736 | 7736 | 7992 | 8248 | 8248 | 8504 | 8504 | 8760 | 9144 |
| 9 | 8504 | 8504 | 8760 | 9144 | 9144 | 9528 | 9528 | 9912 | 9912 | 10296 |
| 10 | 9528 | 9528 | 9912 | 9912 | 10296 | 10680 | 10680 | 11064 | 11064 | 11448 |
| 11 | 10680 | 11064 | 11448 | 11448 | 11832 | 12216 | 12216 | 12576 | 12960 | 12960 |
| 12 | 12216 | 12576 | 12576 | 12960 | 13536 | 13536 | 14112 | 14112 | 14688 | 14688 |
| 13 | 13536 | 14112 | 14112 | 14688 | 15264 | 15264 | 15840 | 15840 | 16416 | 16992 |
| 14 | 15264 | 15840 | 15840 | 16416 | 16992 | 16992 | 17568 | 17568 | 18336 | 18336 |
| 15 | 16416 | 16992 | 16992 | 17568 | 17568 | 18336 | 19080 | 19080 | 19848 | 19848 |
| 16 | 17568 | 17568 | 18336 | 18336 | 19080 | 19848 | 19848 | 20616 | 20616 | 21384 |
| 17 | 19080 | 19848 | 19848 | 20616 | 21384 | 21384 | 22152 | 22920 | 22920 | 23688 |
| 18 | 21384 | 21384 | 22152 | 22920 | 22920 | 23688 | 24496 | 24496 | 25456 | 25456 |
| 19 | 22920 | 23688 | 23688 | 24496 | 25456 | 25456 | 26416 | 26416 | 27376 | 28336 |
| 20 | 24496 | 25456 | 26416 | 26416 | 27376 | 28336 | 28336 | 29296 | 29296 | 30576 |
| 21 | 26416 | 27376 | 28336 | 28336 | 29296 | 30576 | 30576 | 31704 | 31704 | 32856 |
| 22 | 28336 | 29296 | 30576 | 30576 | 31704 | 32856 | 32856 | 34008 | 34008 | 35160 |
| 23 | 30576 | 31704 | 31704 | 32856 | 34008 | 34008 | 35160 | 35160 | 36696 | 37888 |
| 24 | 32856 | 32856 | 34008 | 35160 | 35160 | 36696 | 37888 | 37888 | 39232 | 39232 |
| 25 | 34008 | 35160 | 35160 | 36696 | 36696 | 37888 | 39232 | 39232 | 40576 | 40576 |
| 26 | 35160 | 36696 | 36696 | 37888 | 39232 | 39232 | 40576 | 40576 | 42368 | 43816 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 0 | 1864 | 1864 | 1928 | 1928 | 1992 | 2024 | 2088 | 2088 | 2152 | 2152 |
| 1 | 2408 | 2472 | 2536 | 2536 | 2600 | 2664 | 2728 | 2728 | 2792 | 2856 |
| 2 | 2984 | 2984 | 3112 | 3112 | 3240 | 3240 | 3368 | 3368 | 3496 | 3496 |
| 3 | 3880 | 4008 | 4008 | 4136 | 4136 | 4264 | 4392 | 4392 | 4392 | 4584 |
| 4 | 4776 | 4776 | 4968 | 4968 | 5160 | 5160 | 5352 | 5352 | 5544 | 5544 |
| 5 | 5992 | 5992 | 5992 | 6200 | 6200 | 6456 | 6456 | 6712 | 6712 | 6968 |
| 6 | 6968 | 6968 | 7224 | 7224 | 7480 | 7480 | 7736 | 7736 | 7992 | 8248 |

TABLE 8-continued

Second transport block size table-4

| ITBS | | | | | | | | | |
|---|---|---|---|---|---|---|---|---|---|
| 7 | 7992 | 8248 | 8504 | 8504 | 8760 | 8760 | 9144 | 9144 | 9528 | 9528 |
| 8 | 9144 | 9528 | 9528 | 9912 | 9912 | 10296 | 10296 | 10680 | 10680 | 11064 |
| 9 | 10296 | 10680 | 11064 | 11064 | 11448 | 11448 | 11832 | 11832 | 12216 | 12216 |
| 10 | 11832 | 11832 | 12216 | 12216 | 12576 | 12960 | 12960 | 13536 | 13536 | 13536 |
| 11 | 13536 | 13536 | 14112 | 14112 | 14688 | 14688 | 15264 | 15264 | 15264 | 15840 |
| 12 | 15264 | 15264 | 15840 | 15840 | 16416 | 16416 | 16992 | 16992 | 17568 | 17568 |
| 13 | 16992 | 17568 | 17568 | 18336 | 18336 | 19080 | 19080 | 19080 | 19848 | 19848 |
| 14 | 19080 | 19080 | 19848 | 19848 | 20616 | 20616 | 21384 | 21384 | 22152 | 22152 |
| 15 | 20616 | 20616 | 21384 | 21384 | 22152 | 22152 | 22920 | 22920 | 23688 | 23688 |
| 16 | 21384 | 22152 | 22152 | 22920 | 23688 | 23688 | 24496 | 24496 | 25456 | 25456 |
| 17 | 23688 | 24496 | 24496 | 25456 | 25456 | 26416 | 26416 | 27376 | 27376 | 28336 |
| 18 | 26416 | 26416 | 27376 | 27376 | 28336 | 29296 | 29296 | 29296 | 30576 | 30576 |
| 19 | 28336 | 29296 | 29296 | 30576 | 30576 | 31704 | 31704 | 32856 | 32856 | 34008 |
| 20 | 30576 | 31704 | 31704 | 32856 | 32856 | 34008 | 34008 | 35160 | 35160 | 36696 |
| 21 | 32856 | 34008 | 35160 | 35160 | 36696 | 36696 | 36696 | 37888 | 39232 | 39232 |
| 22 | 35160 | 36696 | 36696 | 37888 | 39232 | 39232 | 40576 | 40576 | 40576 | 42368 |
| 23 | 37888 | 39232 | 39232 | 40576 | 40576 | 42368 | 42368 | 43816 | 43816 | 45352 |
| 24 | 40576 | 40576 | 42368 | 42368 | 43816 | 43816 | 45352 | 45352 | 46888 | 46888 |
| 25 | 42368 | 42368 | 43816 | 45352 | 45352 | 46888 | 46888 | 48936 | 48936 | 48936 |
| 26 | 43816 | 45352 | 45352 | 46888 | 46888 | 48936 | 48936 | 51024 | 51024 | 51024 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2216 | 2216 | 2280 | 2344 | 2344 | 2408 | 2408 | 2472 | 2472 | 2536 |
| 1 | 2856 | 2984 | 2984 | 2984 | 3112 | 3112 | 3240 | 3240 | 3240 | 3368 |
| 2 | 3624 | 3624 | 3624 | 3752 | 3752 | 3880 | 3880 | 4008 | 4008 | 4136 |
| 3 | 4584 | 4776 | 4776 | 4776 | 4968 | 4968 | 5160 | 5160 | 5160 | 5352 |
| 4 | 5736 | 5736 | 5992 | 5992 | 5992 | 6200 | 6200 | 6200 | 6456 | 6456 |
| 5 | 6968 | 6968 | 7224 | 7224 | 7480 | 7480 | 7736 | 7736 | 7992 | 7992 |
| 6 | 8248 | 8504 | 8504 | 8760 | 8760 | 9144 | 9144 | 9144 | 9528 | 9528 |
| 7 | 9528 | 9912 | 9912 | 10296 | 10296 | 10680 | 10680 | 10680 | 11064 | 11064 |
| 8 | 11064 | 11448 | 11448 | 11832 | 11832 | 12216 | 12216 | 12216 | 12576 | 12576 |
| 9 | 12576 | 12576 | 12960 | 12960 | 13536 | 13536 | 13536 | 14112 | 14112 | 14112 |
| 10 | 14112 | 14112 | 14688 | 14688 | 14688 | 15264 | 15264 | 15840 | 15840 | 15840 |
| 11 | 15840 | 16416 | 16416 | 16992 | 16992 | 17568 | 17568 | 17568 | 18336 | 18336 |
| 12 | 18336 | 18336 | 18336 | 19080 | 19080 | 19848 | 19848 | 19848 | 20616 | 20616 |
| 13 | 20616 | 20616 | 21384 | 21384 | 22152 | 22152 | 22152 | 22920 | 22920 | 23688 |
| 14 | 22920 | 22920 | 23688 | 23688 | 24496 | 24496 | 25456 | 25456 | 25456 | 26416 |
| 15 | 24496 | 24496 | 25456 | 25456 | 25456 | 26416 | 26416 | 27376 | 27376 | 28336 |
| 16 | 25456 | 26416 | 26416 | 27376 | 27376 | 28336 | 28336 | 29296 | 29296 | 29296 |
| 17 | 28336 | 29296 | 29296 | 30576 | 30576 | 30576 | 31704 | 31704 | 32856 | 32856 |
| 18 | 31704 | 31704 | 32856 | 32856 | 34008 | 34008 | 34008 | 35160 | 35160 | 36696 |
| 19 | 34008 | 35160 | 35160 | 35160 | 36696 | 36696 | 37888 | 37888 | 39232 | 39232 |
| 20 | 36696 | 37888 | 37888 | 39232 | 39232 | 40576 | 40576 | 40576 | 42368 | 42368 |
| 21 | 39232 | 40576 | 40576 | 42368 | 42368 | 43816 | 43816 | 43816 | 45352 | 45352 |
| 22 | 42368 | 43816 | 43816 | 45352 | 45352 | 46888 | 46888 | 46888 | 48936 | 48936 |
| 23 | 45352 | 46888 | 46888 | 46888 | 48936 | 48936 | 51024 | 51024 | 51024 | 52752 |
| 24 | 48936 | 48936 | 51024 | 51024 | 51024 | 52752 | 52752 | 55056 | 55056 | 55056 |
| 25 | 51024 | 51024 | 52752 | 52752 | 52752 | 55056 | 55056 | 57336 | 57336 | 57336 |
| 26 | 52752 | 52752 | 55056 | 55056 | 55056 | 57336 | 57336 | 59256 | 59256 | 59256 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2664 | 2728 | 2728 | 2792 | 2856 | 2856 | 2856 |
| 1 | 3368 | 3368 | 3496 | 3496 | 3624 | 3624 | 3624 | 3752 | 3752 | 3752 |
| 2 | 4136 | 4264 | 4264 | 4392 | 4392 | 4392 | 4584 | 4584 | 4584 | 4776 |
| 3 | 5352 | 5544 | 5544 | 5544 | 5736 | 5736 | 5992 | 5992 | 5992 | 5992 |
| 4 | 6712 | 6712 | 6712 | 6968 | 6968 | 6968 | 7224 | 7224 | 7224 | 7480 |
| 5 | 8248 | 8248 | 8248 | 8504 | 8504 | 8760 | 8760 | 8760 | 9144 | 9144 |
| 6 | 9528 | 9912 | 9912 | 9912 | 10296 | 10296 | 10296 | 10680 | 10680 | 11064 |
| 7 | 11448 | 11448 | 11448 | 11832 | 11832 | 12216 | 12216 | 12216 | 12576 | 12576 |
| 8 | 12960 | 12960 | 13536 | 13536 | 13536 | 14112 | 14112 | 14112 | 14112 | 14688 |
| 9 | 14688 | 14688 | 15264 | 15264 | 15264 | 15840 | 15840 | 15840 | 16416 | 16416 |
| 10 | 16416 | 16416 | 16992 | 16992 | 16992 | 17568 | 17568 | 17568 | 18336 | 18336 |
| 11 | 18336 | 19080 | 19080 | 19080 | 19848 | 19848 | 20616 | 20616 | 20616 | 21384 |
| 12 | 21384 | 21384 | 21384 | 22152 | 22152 | 22920 | 22920 | 22920 | 23688 | 23688 |
| 13 | 23688 | 24496 | 24496 | 24496 | 25456 | 25456 | 25456 | 26416 | 26416 | 26416 |
| 14 | 26416 | 26416 | 27376 | 27376 | 28336 | 28336 | 28336 | 29296 | 29296 | 29296 |
| 15 | 28336 | 28336 | 29296 | 29296 | 29296 | 30576 | 30576 | 30576 | 31704 | 31704 |
| 16 | 30576 | 30576 | 30576 | 31704 | 31704 | 31704 | 32856 | 32856 | 34008 | 34008 |
| 17 | 32856 | 34008 | 34008 | 35160 | 35160 | 35160 | 36696 | 36696 | 36696 | 37888 |
| 18 | 36696 | 36696 | 37888 | 37888 | 39232 | 39232 | 39232 | 40576 | 40576 | 40576 |
| 19 | 39232 | 40576 | 40576 | 42368 | 42368 | 42368 | 43816 | 43816 | 43816 | 45352 |
| 20 | 42368 | 43816 | 43816 | 45352 | 45352 | 45352 | 46888 | 46888 | 46888 | 48936 |

TABLE 8-continued

Second transport block size table-4

| ITBS | | | | | | | | | |
|---|---|---|---|---|---|---|---|---|---|
| 21 | 46888 | 46888 | 46888 | 48936 | 48936 | 48936 | 51024 | 51024 | 51024 | 52752 |
| 22 | 48936 | 51024 | 51024 | 52752 | 52752 | 52752 | 55056 | 55056 | 55056 | 57336 |
| 23 | 52752 | 52752 | 55056 | 55056 | 55056 | 57336 | 57336 | 59256 | 59256 | 59256 |
| 24 | 57336 | 57336 | 57336 | 59256 | 59256 | 59256 | 61664 | 61664 | 63776 | 63776 |
| 25 | 59256 | 59256 | 59256 | 61664 | 61664 | 63776 | 63776 | 63776 | 66592 | 66592 |
| 26 | 61664 | 61664 | 63776 | 63776 | 63776 | 66592 | 66592 | 66592 | 68808 | 68808 |

| | NPRB | | | | | | | | |
|---|---|---|---|---|---|---|---|---|---|
| ITBS | 81 | 82 | 83 | 84 | 85 | 86 | 87 | 88 | 89 | 90 |
| 0 | 2984 | 2984 | 2984 | 2984 | 3112 | 3112 | 3112 | 3240 | 3240 | 3240 |
| 1 | 3880 | 3880 | 4008 | 4008 | 4008 | 4136 | 4136 | 4136 | 4264 | 4264 |
| 2 | 4776 | 4776 | 4776 | 4968 | 4968 | 4968 | 5160 | 5160 | 5160 | 5352 |
| 3 | 6200 | 6200 | 6200 | 6456 | 6456 | 6456 | 6456 | 6712 | 6712 | 6712 |
| 4 | 7480 | 7736 | 7736 | 7736 | 7992 | 7992 | 7992 | 8248 | 8248 | 8248 |
| 5 | 9144 | 9528 | 9528 | 9528 | 9912 | 9912 | 9912 | 9912 | 10296 | 10296 |
| 6 | 11064 | 11064 | 11448 | 11448 | 11448 | 11832 | 11832 | 11832 | 12216 | 12216 |
| 7 | 12960 | 12960 | 12960 | 13536 | 13536 | 13536 | 14112 | 14112 | 14112 | 14112 |
| 8 | 14688 | 14688 | 15264 | 15264 | 15264 | 15840 | 15840 | 15840 | 16416 | 16416 |
| 9 | 16416 | 16992 | 16992 | 17568 | 17568 | 17568 | 17568 | 18336 | 18336 | 18336 |
| 10 | 18336 | 19080 | 19080 | 19080 | 19080 | 19848 | 19848 | 19848 | 20616 | 20616 |
| 11 | 21384 | 21384 | 22152 | 22152 | 22152 | 22920 | 22920 | 22920 | 23688 | 23688 |
| 12 | 23688 | 24496 | 24496 | 24496 | 25456 | 25456 | 25456 | 26416 | 26416 | 26416 |
| 13 | 27376 | 27376 | 27376 | 28336 | 28336 | 29296 | 29296 | 29296 | 29296 | 30576 |
| 14 | 30576 | 30576 | 30576 | 31704 | 31704 | 31704 | 32856 | 32856 | 32856 | 34008 |
| 15 | 32856 | 32856 | 32856 | 34008 | 34008 | 34008 | 35160 | 35160 | 35160 | 35160 |
| 16 | 34008 | 35160 | 35160 | 35160 | 36696 | 36696 | 36696 | 37888 | 37888 | 37888 |
| 17 | 37888 | 39232 | 39232 | 39232 | 40576 | 40576 | 40576 | 40576 | 42368 | 42368 |
| 18 | 42368 | 42368 | 42368 | 43816 | 43816 | 43816 | 45352 | 45352 | 45352 | 46888 |
| 19 | 45352 | 45352 | 46888 | 46888 | 46888 | 48936 | 48936 | 48936 | 51024 | 51024 |
| 20 | 48936 | 48936 | 48936 | 51024 | 51024 | 51024 | 52752 | 52752 | 52752 | 55056 | 55056 |
| 21 | 52752 | 52752 | 55056 | 55056 | 55056 | 57336 | 57336 | 57336 | 57336 | 59256 |
| 22 | 57336 | 57336 | 59256 | 59256 | 59256 | 59256 | 61664 | 61664 | 61664 | 63776 |
| 23 | 61664 | 61664 | 61664 | 63776 | 63776 | 63776 | 63776 | 66592 | 66592 | 66592 |
| 24 | 63776 | 63776 | 66592 | 66592 | 66592 | 68808 | 68808 | 68808 | 71112 | 71112 |
| 25 | 66592 | 68808 | 68808 | 68808 | 71112 | 71112 | 71112 | 73712 | 73712 | 73712 |
| 26 | 68808 | 71112 | 71112 | 73712 | 73712 | 73712 | 75376 | 76208 | 76208 | 78704 |

| | NPRB | | | | | | | | |
|---|---|---|---|---|---|---|---|---|---|
| ITBS | 91 | 92 | 93 | 94 | 95 | 96 | 97 | 98 | 99 | 100 |
| 0 | 3240 | 3368 | 3368 | 3368 | 3496 | 3496 | 3496 | 3496 | 3624 | 3624 |
| 1 | 4392 | 4392 | 4392 | 4392 | 4584 | 4584 | 4584 | 4584 | 4776 | 4776 |
| 2 | 5352 | 5352 | 5352 | 5544 | 5544 | 5544 | 5736 | 5736 | 5736 | 5736 |
| 3 | 6968 | 6968 | 6968 | 7224 | 7224 | 7224 | 7224 | 7480 | 7480 | 7480 |
| 4 | 8504 | 8504 | 8760 | 8760 | 8760 | 8760 | 9144 | 9144 | 9144 | 9144 |
| 5 | 10296 | 10680 | 10680 | 10680 | 11064 | 11064 | 11064 | 11064 | 11448 | 11448 |
| 6 | 12216 | 12576 | 12576 | 12576 | 12960 | 12960 | 12960 | 13536 | 13536 | 13536 |
| 7 | 14688 | 14688 | 14688 | 14688 | 15264 | 15264 | 15264 | 15840 | 15840 | 15840 |
| 8 | 16416 | 16992 | 16992 | 16992 | 17568 | 17568 | 17568 | 17568 | 18336 | 18336 |
| 9 | 19080 | 19080 | 19080 | 19080 | 19848 | 19848 | 19848 | 19848 | 20616 | 20616 |
| 10 | 20616 | 21384 | 21384 | 21384 | 21384 | 22152 | 22152 | 22152 | 22920 | 22920 |
| 11 | 23688 | 24496 | 24496 | 24496 | 25456 | 25456 | 25456 | 25456 | 26416 | 26416 |
| 12 | 27376 | 27376 | 27376 | 28336 | 28336 | 28336 | 29296 | 29296 | 29296 | 29296 |
| 13 | 30576 | 30576 | 31704 | 31704 | 31704 | 31704 | 32856 | 32856 | 32856 | 34008 |
| 14 | 34008 | 34008 | 35160 | 35160 | 35160 | 35160 | 36696 | 36696 | 36696 | 37888 |
| 15 | 36696 | 36696 | 36696 | 37888 | 37888 | 37888 | 39232 | 39232 | 39232 | 40576 |
| 16 | 39232 | 39232 | 39232 | 39232 | 40576 | 40576 | 40576 | 42368 | 42368 | 42368 |
| 17 | 42368 | 43816 | 43816 | 43816 | 45352 | 45352 | 45352 | 46888 | 46888 | 46888 |
| 18 | 46888 | 46888 | 48936 | 48936 | 48936 | 48936 | 51024 | 51024 | 51024 | 51024 |
| 19 | 51024 | 51024 | 52752 | 52752 | 52752 | 52752 | 55056 | 55056 | 55056 | 55056 |
| 20 | 55056 | 55056 | 57336 | 57336 | 57336 | 57336 | 59256 | 59256 | 59256 | 61664 |
| 21 | 59256 | 59256 | 61664 | 61664 | 61664 | 61664 | 63776 | 63776 | 63776 | 66592 |
| 22 | 63776 | 63776 | 66592 | 66592 | 66592 | 66592 | 68808 | 68808 | 68808 | 71112 |
| 23 | 68808 | 68808 | 68808 | 71112 | 71112 | 71112 | 73712 | 73712 | 73712 | 75376 |
| 24 | 71112 | 73712 | 73712 | 75376 | 75376 | 76208 | 76208 | 78704 | 78704 | 78704 |
| 25 | 75376 | 76208 | 76208 | 78704 | 78704 | 78704 | 81176 | 81176 | 81176 | 81176 |
| 26 | 78704 | 78704 | 81176 | 81176 | 81176 | 81176 | 84760 | 84760 | 84760 | 84760 |

| | NPRB | | | | | | | | |
|---|---|---|---|---|---|---|---|---|---|
| ITBS | 101 | 102 | 103 | 104 | 105 | 106 | 107 | 108 | 109 | 110 |
| 0 | 3624 | 3752 | 3752 | 3752 | 3752 | 3880 | 3880 | 3880 | 4008 | 4008 |
| 1 | 4776 | 4776 | 4968 | 4968 | 4968 | 4968 | 5160 | 5160 | 5160 | 5160 |
| 2 | 5992 | 5992 | 5992 | 5992 | 6200 | 6200 | 6200 | 6200 | 6456 | 6456 |

TABLE 8-continued

Second transport block size table-4

| | | | | | | | | | | |
|---|---|---|---|---|---|---|---|---|---|---|
| 3 | 7736 | 7736 | 7736 | 7992 | 7992 | 7992 | 7992 | 8248 | 8248 | 8248 |
| 4 | 9528 | 9528 | 9528 | 9528 | 9912 | 9912 | 9912 | 9912 | 10296 | 10296 |
| 5 | 11448 | 11832 | 11832 | 11832 | 12216 | 12216 | 12216 | 12216 | 12576 | 12576 |
| 6 | 13536 | 14112 | 14112 | 14112 | 14112 | 14688 | 14688 | 14688 | 14688 | 14688 |
| 7 | 15840 | 16416 | 16416 | 16416 | 16992 | 16992 | 16992 | 16992 | 17568 | 17568 |
| 8 | 18336 | 18336 | 19080 | 19080 | 19080 | 19080 | 19848 | 19848 | 19848 | 19848 |
| 9 | 20616 | 20616 | 21384 | 21384 | 21384 | 22152 | 22152 | 22152 | 22152 | 22920 |
| 10 | 22920 | 23688 | 23688 | 23688 | 23688 | 24496 | 24496 | 24496 | 24496 | 25456 |
| 11 | 26416 | 26416 | 27376 | 27376 | 27376 | 28336 | 28336 | 28336 | 28336 | 29296 |
| 12 | 30576 | 30576 | 30576 | 30576 | 31704 | 31704 | 31704 | 31704 | 32856 | 32856 |
| 13 | 34008 | 34008 | 34008 | 35160 | 35160 | 35160 | 35160 | 36696 | 36696 | 36696 |
| 14 | 37888 | 37888 | 37888 | 39232 | 39232 | 39232 | 40576 | 40576 | 40576 | 40576 |
| 15 | 40576 | 40576 | 40576 | 42368 | 42368 | 42368 | 42368 | 43816 | 43816 | 43816 |
| 16 | 42368 | 43816 | 43816 | 43816 | 43816 | 45352 | 45352 | 45352 | 46888 | 46888 |
| 17 | 46888 | 48936 | 48936 | 48936 | 48936 | 51024 | 51024 | 51024 | 51024 | 51024 |
| 18 | 52752 | 52752 | 52752 | 52752 | 55056 | 55056 | 55056 | 55056 | 57336 | 57336 |
| 19 | 57336 | 57336 | 57336 | 59256 | 59256 | 59256 | 59256 | 61664 | 61664 | 61664 |
| 20 | 61664 | 61664 | 61664 | 63776 | 63776 | 63776 | 63776 | 66592 | 66592 | 66592 |
| 21 | 66592 | 66592 | 66592 | 68808 | 68808 | 68808 | 71112 | 71112 | 71112 | 71112 |
| 22 | 71112 | 71112 | 71112 | 73712 | 73712 | 73712 | 75376 | 76208 | 76208 | 76208 |
| 23 | 75376 | 76208 | 76208 | 78704 | 78704 | 78704 | 81176 | 81176 | 81176 | 81176 |
| 24 | 81176 | 81176 | 81176 | 81176 | 84760 | 84760 | 84760 | 84760 | 87936 | 87936 |
| 25 | 84760 | 84760 | 84760 | 84760 | 87936 | 87936 | 87936 | 90816 | 90816 | 90816 |
| 26 | 87936 | 87936 | 87936 | 90816 | 90816 | 90816 | 93800 | 93800 | 93800 | 93800 |

For all TBS values included in Table 8, some may be included in the layer-1 data transport block size table in LTE REL.8 shown in Table 1, and others may be included in the set layer-2 data transport block size table.

Further, the foregoing Table 6 and Table 8 may be optimized to form optimized second transport block size tables 6-1 and 8-1, so that coding rates corresponding to all TBSs included in a maximum modulation and coding scheme level in the optimized second transport block size tables are equal to a set coding rate, where the set coding rate, for example, may be 0.93.

TABLE 6-1

Optimized second transport block size table-3

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 26 | 840 | 1672 | 2536 | 3368 | 4264 | 5160 | 5992 | 6712 | 7736 | 8504 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 26 | 9144 | 10296 | 11064 | 11832 | 12960 | 13536 | 14688 | 15264 | 16416 | 16992 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 26 | 17568 | 18336 | 19848 | 20616 | 21384 | 22152 | 22920 | 23688 | 24496 | 25456 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 26 | 26416 | 27376 | 28336 | 29296 | 29296 | 30576 | 31704 | 32856 | 32856 | 34008 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| | 35160 | 35160 | 36696 | 37888 | 37888 | 39232 | 40576 | 40576 | 42368 | 42368 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 26 | 43816 | 43816 | 45352 | 45352 | 46888 | 46888 | 48936 | 48936 | 51024 | 51024 |

TABLE 6-1-continued

Optimized second transport block size table-3

| ITBS | \multicolumn{10}{c}{NPRB} | | | | | | | | | |
|---|---|---|---|---|---|---|---|---|---|---|
| | 61 | 62 | 63 | 64 | 65 | 66 | 67 | 68 | 69 | 70 |
| 26 | 52752 | 52752 | 52752 | 55056 | 55056 | 55056 | 57336 | 57336 | 59256 | 59256 |

| ITBS | \multicolumn{10}{c}{NPRB} | | | | | | | | | |
|---|---|---|---|---|---|---|---|---|---|---|
| | 71 | 72 | 73 | 74 | 75 | 76 | 77 | 78 | 79 | 80 |
| 26 | 59256 | 61664 | 61664 | 63776 | 63776 | 63776 | 66592 | 66592 | 66592 | 68808 |

| ITBS | \multicolumn{10}{c}{NPRB} | | | | | | | | | |
|---|---|---|---|---|---|---|---|---|---|---|
| | 81 | 82 | 83 | 84 | 85 | 86 | 87 | 88 | 89 | 90 |
| 26 | 68808 | 68808 | 71112 | 71112 | 71112 | 73712 | 75376 | 76208 | 76208 | 76208 |

| ITBS | \multicolumn{10}{c}{NPRB} | | | | | | | | | |
|---|---|---|---|---|---|---|---|---|---|---|
| | 91 | 92 | 93 | 94 | 95 | 96 | 97 | 98 | 99 | 100 |
| 26 | 78704 | 78704 | 78704 | 81176 | 81176 | 81176 | 81176 | 84760 | 84760 | 84760 |

| ITBS | \multicolumn{10}{c}{NPRB} | | | | | | | | | |
|---|---|---|---|---|---|---|---|---|---|---|
| | 101 | 102 | 103 | 104 | 105 | 106 | 107 | 108 | 109 | 110 |
| 26 | 84760 | 87936 | 87936 | 87936 | 90816 | 90816 | 90816 | 90816 | 93800 | 93800 |

TABLE 8-1

Optimized second transport block size table-4

| ITBS | \multicolumn{10}{c}{NPRB} | | | | | | | | | |
|---|---|---|---|---|---|---|---|---|---|---|
| | 1 | 2 | 3 | 4 | 5 | 6 | 7 | 8 | 9 | 10 |
| 26 | 840 | 1672 | 2536 | 3368 | 4264 | 5160 | 5992 | 6712 | 7736 | 8504 |

| ITBS | \multicolumn{10}{c}{NPRB} | | | | | | | | | |
|---|---|---|---|---|---|---|---|---|---|---|
| | 11 | 12 | 13 | 14 | 15 | 16 | 17 | 18 | 19 | 20 |
| 26 | 9144 | 10296 | 11064 | 11832 | 12960 | 13536 | 14688 | 15264 | 16416 | 16992 |

| ITBS | \multicolumn{10}{c}{NPRB} | | | | | | | | | |
|---|---|---|---|---|---|---|---|---|---|---|
| | 21 | 22 | 23 | 24 | 25 | 26 | 27 | 28 | 29 | 30 |
| 26 | 17568 | 18336 | 19848 | 20616 | 21384 | 22152 | 22920 | 23688 | 24496 | 25456 |

| ITBS | \multicolumn{10}{c}{NPRB} | | | | | | | | | |
|---|---|---|---|---|---|---|---|---|---|---|
| | 31 | 32 | 33 | 34 | 35 | 36 | 37 | 38 | 39 | 40 |
| 26 | 26416 | 27376 | 28336 | 29296 | 29296 | 30576 | 31704 | 32856 | 32856 | 34008 |

| ITBS | \multicolumn{10}{c}{NPRB} | | | | | | | | | |
|---|---|---|---|---|---|---|---|---|---|---|
| | 41 | 42 | 43 | 44 | 45 | 46 | 47 | 48 | 49 | 50 |
| 26 | 35160 | 35160 | 36696 | 37888 | 37888 | 39232 | 40576 | 40576 | 42368 | 42368 |

| ITBS | \multicolumn{10}{c}{NPRB} | | | | | | | | | |
|---|---|---|---|---|---|---|---|---|---|---|
| | 51 | 52 | 53 | 54 | 55 | 56 | 57 | 58 | 59 | 60 |
| 26 | 43816 | 43816 | 45352 | 45352 | 46888 | 46888 | 48936 | 48936 | 51024 | 51024 |

TABLE 8-1-continued

Optimized second transport block size table-4

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 26 | 52752 | 52752 | 52752 | 55056 | 55056 | 55056 | 57336 | 57336 | 59256 | 59256 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 26 | 59256 | 61664 | 61664 | 63776 | 63776 | 63776 | 66592 | 66592 | 66592 | 68808 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 26 | 68808 | 68808 | 71112 | 71112 | 71112 | 73712 | 75376 | 76208 | 76208 | 76208 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 26 | 78704 | 78704 | 78704 | 81176 | 81176 | 81176 | 81176 | 84760 | 84760 | 84760 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 26 | 84760 | 87936 | 87936 | 87936 | 90816 | 90816 | 90816 | 90816 | 93800 | 93800 |

Optionally, all TBSs in the second transport block size table may be formed by newly designed elements, where the newly designed elements may be included and may also be not included in the layer-1 data transport block size table in LTE REL.8 shown in Table 1, and may be included and may also be not included in the set layer-2 data transport block size table shown in Table 7.

Still further, on the basis of the foregoing embodiment, any TBS in the second transport block size table may be a TBS designed according to the target coding rate, that is, the coding rate corresponding to the determined TBS in the LTE REL.12 system with the system overhead of 12 REs may be very close to and even equal to the target coding rate, where the target coding rate may be the coding rate corresponding to the modulation and coding scheme level and the number of physical resource block pairs in LTE REL.8. The second transport block size table in this embodiment may be shown in Table 9.

TABLE 9

Second transport block size table-5

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 0 | 24 | 48 | 80 | 120 | 160 | 208 | 232 | 280 | 296 | 344 |
| 1 | 40 | 80 | 120 | 192 | 232 | 280 | 296 | 344 | 432 | 456 |
| 2 | 48 | 104 | 192 | 240 | 280 | 344 | 392 | 432 | 488 | 552 |
| 3 | 56 | 144 | 240 | 280 | 344 | 432 | 520 | 584 | 664 | 744 |
| 4 | 80 | 160 | 280 | 344 | 432 | 536 | 648 | 728 | 824 | 920 |
| 5 | 104 | 192 | 296 | 432 | 552 | 664 | 792 | 888 | 1000 | 1128 |
| 6 | 432 | 240 | 344 | 520 | 664 | 792 | 936 | 1064 | 1224 | 1352 |
| 7 | 144 | 296 | 432 | 616 | 760 | 936 | 1096 | 1256 | 1448 | 1608 |
| 8 | 160 | 344 | 520 | 712 | 888 | 1064 | 1256 | 1448 | 1640 | 1800 |
| 9 | 184 | 392 | 600 | 808 | 1000 | 1224 | 1416 | 1640 | 1864 | 2024 |
| 10 | 192 | 432 | 664 | 888 | 1128 | 1352 | 1608 | 1800 | 2024 | 2280 |
| 11 | 240 | 504 | 760 | 1032 | 1320 | 1544 | 1800 | 2088 | 2344 | 2664 |
| 12 | 280 | 584 | 888 | 1192 | 1480 | 1768 | 2088 | 2344 | 2664 | 2984 |
| 13 | 296 | 648 | 968 | 1320 | 1640 | 2024 | 2344 | 2664 | 2984 | 3304 |
| 14 | 344 | 728 | 1096 | 1480 | 1864 | 2280 | 2600 | 2984 | 3368 | 3752 |
| 15 | 368 | 792 | 1192 | 1608 | 2024 | 2344 | 2792 | 3240 | 3560 | 4072 |
| 16 | 432 | 824 | 1256 | 1672 | 2088 | 2536 | 2984 | 3368 | 3880 | 4200 |
| 17 | 448 | 920 | 1384 | 1864 | 2344 | 2792 | 3304 | 3752 | 4200 | 4712 |
| 18 | 504 | 1032 | 1512 | 2024 | 2600 | 3048 | 3624 | 4072 | 4712 | 5224 |
| 19 | 536 | 1096 | 1672 | 2280 | 2792 | 3368 | 3880 | 4520 | 5032 | 5544 |
| 20 | 584 | 1192 | 1800 | 2408 | 3048 | 3624 | 4200 | 4904 | 5416 | 5992 |
| 21 | 648 | 1320 | 1928 | 2600 | 3240 | 3880 | 4520 | 5224 | 5992 | 6456 |
| 22 | 680 | 1384 | 2088 | 2792 | 3496 | 4200 | 4904 | 5544 | 6200 | 6968 |
| 23 | 728 | 1480 | 2280 | 2984 | 3752 | 4520 | 5224 | 5992 | 6712 | 7480 |
| 24 | 760 | 1544 | 2344 | 3112 | 3880 | 4712 | 5544 | 6456 | 7224 | 7736 |
| 25 | 808 | 1640 | 2408 | 3304 | 4072 | 4904 | 5736 | 6712 | 7480 | 8120 |

TABLE 9-continued

Second transport block size table-5

| 26 | 936 | 1928 | 2856 | 3880 | 4904 | 5736 | 6712 | 7736 | 8760 | 9784 |
|---|---|---|---|---|---|---|---|---|---|---|

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 0 | 384 | 432 | 456 | 488 | 520 | 552 | 600 | 648 | 664 | 712 |
| 1 | 504 | 552 | 600 | 648 | 680 | 744 | 792 | 824 | 888 | 936 |
| 2 | 616 | 680 | 744 | 808 | 856 | 920 | 968 | 1000 | 1096 | 1128 |
| 3 | 808 | 888 | 968 | 1064 | 1128 | 1192 | 1256 | 1352 | 1416 | 1512 |
| 4 | 1032 | 1096 | 1192 | 1320 | 1384 | 1480 | 1544 | 1672 | 1768 | 1864 |
| 5 | 1256 | 1352 | 1480 | 1608 | 1736 | 1800 | 1928 | 2024 | 2152 | 2280 |
| 6 | 1480 | 1608 | 1768 | 1928 | 2024 | 2152 | 2280 | 2408 | 2600 | 2728 |
| 7 | 1736 | 1928 | 2088 | 2152 | 2344 | 2536 | 2728 | 2920 | 3048 | 3240 |
| 8 | 2024 | 2152 | 2344 | 2536 | 2728 | 2920 | 3048 | 3304 | 3496 | 3624 |
| 9 | 2280 | 2408 | 2664 | 2856 | 3048 | 3304 | 3496 | 3752 | 3880 | 4072 |
| 10 | 2536 | 2728 | 2984 | 3240 | 3496 | 3624 | 3880 | 4072 | 4392 | 4520 |
| 11 | 2920 | 3112 | 3368 | 3624 | 3880 | 4200 | 4584 | 4712 | 5032 | 5224 |
| 12 | 3240 | 3560 | 3880 | 4200 | 4392 | 4712 | 5032 | 5352 | 5736 | 5992 |
| 13 | 3688 | 4072 | 4392 | 4712 | 5032 | 5416 | 5736 | 5992 | 6456 | 6712 |
| 14 | 4072 | 4584 | 4904 | 5224 | 5544 | 5992 | 6456 | 6712 | 7224 | 7480 |
| 15 | 4392 | 4712 | 5224 | 5544 | 5992 | 6456 | 6712 | 7224 | 7352 | 8120 |
| 16 | 4712 | 5032 | 5544 | 5992 | 6456 | 6712 | 7224 | 7736 | 8120 | 8376 |
| 17 | 5224 | 5736 | 6200 | 6712 | 6968 | 7480 | 8120 | 8376 | 8760 | 9400 |
| 18 | 5736 | 6200 | 6712 | 7224 | 7736 | 8120 | 8760 | 9400 | 9784 | 10424 |
| 19 | 6200 | 6712 | 7224 | 7736 | 8376 | 9016 | 9400 | 10040 | 10808 | 11064 |
| 20 | 6712 | 7224 | 7736 | 8376 | 9016 | 9784 | 10424 | 11064 | 11448 | 11960 |
| 21 | 7224 | 7736 | 8376 | 9016 | 9784 | 10424 | 11064 | 11960 | 12384 | 12960 |
| 22 | 7736 | 8376 | 9144 | 9784 | 10424 | 11064 | 11960 | 12384 | 13344 | 13920 |
| 23 | 8120 | 9016 | 9784 | 10424 | 11064 | 11960 | 12960 | 13344 | 14304 | 14880 |
| 24 | 8760 | 9400 | 10424 | 11064 | 11960 | 12960 | 13344 | 14304 | 14880 | 15840 |
| 25 | 9016 | 9784 | 10808 | 11448 | 12384 | 13344 | 13920 | 14880 | 15840 | 16416 |
| 26 | 10808 | 11448 | 12384 | 13344 | 14304 | 15456 | 16416 | 17568 | 18336 | 19080 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 0 | 744 | 792 | 808 | 856 | 888 | 936 | 968 | 1000 | 1032 | 1064 |
| 1 | 968 | 1032 | 1064 | 1128 | 1192 | 1224 | 1256 | 1320 | 1352 | 1384 |
| 2 | 1224 | 1256 | 1320 | 1384 | 1448 | 1512 | 1544 | 1640 | 1672 | 1736 |
| 3 | 1608 | 1640 | 1736 | 1800 | 1864 | 1928 | 2024 | 2088 | 2152 | 2280 |
| 4 | 1928 | 2024 | 2088 | 2280 | 2344 | 2408 | 2536 | 2600 | 2728 | 2792 |
| 5 | 2408 | 2536 | 2664 | 2728 | 2920 | 2984 | 3048 | 3240 | 3304 | 3496 |
| 6 | 2856 | 2984 | 3112 | 3240 | 3368 | 3560 | 3624 | 3880 | 3880 | 4072 |
| 7 | 3304 | 3496 | 3624 | 3880 | 4072 | 4200 | 4392 | 4392 | 4584 | 4712 |
| 8 | 3880 | 4072 | 4200 | 4392 | 4584 | 4712 | 4904 | 5032 | 5224 | 5544 |
| 9 | 4392 | 4520 | 4712 | 4904 | 5224 | 5352 | 5544 | 5736 | 5992 | 6200 |
| 10 | 4904 | 5032 | 5224 | 5544 | 5736 | 5992 | 6200 | 6456 | 6712 | 6968 |
| 11 | 5544 | 5736 | 5992 | 6200 | 6456 | 6968 | 7224 | 7352 | 7736 | 7736 |
| 12 | 6200 | 6456 | 6968 | 7224 | 7480 | 7736 | 8120 | 8376 | 8760 | 8760 |
| 13 | 6968 | 7352 | 7736 | 8120 | 8376 | 8760 | 9016 | 9400 | 9784 | 10040 |
| 14 | 7736 | 8120 | 8376 | 9144 | 9400 | 9784 | 10040 | 10424 | 10808 | 11064 |
| 15 | 8376 | 8760 | 9016 | 9400 | 10040 | 10424 | 10680 | 11064 | 11448 | 11960 |
| 16 | 8760 | 9400 | 9784 | 10040 | 10424 | 11064 | 11448 | 11960 | 12384 | 12960 |
| 17 | 9784 | 10424 | 10808 | 11448 | 11960 | 12384 | 12960 | 13344 | 13344 | 13920 |
| 18 | 10808 | 11448 | 11960 | 12384 | 12960 | 13344 | 13920 | 14304 | 14880 | 15456 |
| 19 | 11960 | 12384 | 12960 | 13344 | 13920 | 14304 | 14880 | 15840 | 16416 | 16800 |
| 20 | 12960 | 13344 | 13920 | 14304 | 14880 | 15840 | 16416 | 16800 | 17568 | 18336 |
| 21 | 13920 | 14304 | 14880 | 15840 | 16416 | 16800 | 17568 | 18336 | 19080 | 19848 |
| 22 | 14880 | 15456 | 16416 | 16800 | 17568 | 18336 | 19080 | 19848 | 20616 | 21384 |
| 23 | 15840 | 16416 | 16800 | 17568 | 18336 | 19080 | 19848 | 20616 | 21384 | 22152 |
| 24 | 16800 | 17568 | 18336 | 19080 | 19848 | 20616 | 21384 | 22152 | 22920 | 23944 |
| 25 | 17568 | 18336 | 19080 | 19848 | 20616 | 21384 | 22152 | 22920 | 23944 | 24816 |
| 26 | 19848 | 21384 | 22152 | 22920 | 23944 | 24816 | 25776 | 26736 | 27696 | 28656 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1128 | 1192 | 1224 | 1256 | 1320 | 1352 | 1352 | 1384 | 1448 |
| 1 | 1480 | 1512 | 1544 | 1608 | 1640 | 1672 | 1768 | 1800 | 1864 | 1864 |
| 2 | 1800 | 1864 | 1928 | 2024 | 2024 | 2088 | 2152 | 2152 | 2280 | 2344 |
| 3 | 2344 | 2408 | 2536 | 2600 | 2664 | 2728 | 2792 | 2856 | 2984 | 3048 |
| 4 | 2920 | 2984 | 3048 | 3112 | 3240 | 3368 | 3496 | 3560 | 3624 | 3752 |
| 5 | 3560 | 3624 | 3752 | 3880 | 4072 | 4072 | 4200 | 4392 | 4584 | 4520 |
| 6 | 4200 | 4392 | 4520 | 4584 | 4712 | 4904 | 5032 | 5224 | 5352 | 5416 |
| 7 | 4904 | 5032 | 5224 | 5416 | 5544 | 5736 | 5992 | 5992 | 6200 | 6456 |

TABLE 9-continued

Second transport block size table-5

| ITBS | 31 | 32 | 33 | 34 | 35 | 36 | 37 | 38 | 39 | 40 |
|---|---|---|---|---|---|---|---|---|---|---|
| 8 | 5736 | 5992 | 5992 | 6200 | 6456 | 6456 | 6712 | 6968 | 7224 | 7224 |
| 9 | 6456 | 6712 | 6712 | 6968 | 7224 | 7480 | 7480 | 7736 | 8120 | 8120 |
| 10 | 7224 | 7480 | 7480 | 7736 | 8120 | 8120 | 8376 | 8760 | 8760 | 9016 |
| 11 | 8120 | 8376 | 8760 | 9144 | 9144 | 9400 | 9784 | 10040 | 10040 | 10424 |
| 12 | 9144 | 9400 | 9784 | 10040 | 10424 | 10680 | 11064 | 11448 | 11448 | 11960 |
| 13 | 10424 | 10808 | 11064 | 11448 | 11960 | 11960 | 12384 | 12960 | 12960 | 13344 |
| 14 | 11448 | 11960 | 12384 | 12960 | 12960 | 13344 | 13920 | 14304 | 14304 | 14880 |
| 15 | 12384 | 12960 | 13344 | 13344 | 13920 | 14304 | 14880 | 15456 | 15456 | 15840 |
| 16 | 12960 | 13344 | 13920 | 14304 | 14880 | 15456 | 15840 | 15840 | 16416 | 16800 |
| 17 | 14304 | 14880 | 15456 | 15840 | 16416 | 16800 | 17568 | 17568 | 18336 | 19080 |
| 18 | 15840 | 16416 | 16800 | 17568 | 18336 | 18336 | 19080 | 19848 | 19848 | 20616 |
| 19 | 17568 | 17568 | 18336 | 19080 | 19848 | 19848 | 20616 | 21384 | 22152 | 22152 |
| 20 | 19080 | 19080 | 19848 | 20616 | 21384 | 22152 | 22152 | 22920 | 23944 | 23944 |
| 21 | 20616 | 20616 | 21384 | 22152 | 22920 | 23944 | 23944 | 24816 | 25776 | 25776 |
| 22 | 22152 | 22152 | 22920 | 23944 | 24816 | 24816 | 25776 | 26736 | 27696 | 27696 |
| 23 | 22920 | 23944 | 24816 | 25776 | 25776 | 26736 | 27696 | 28656 | 28656 | 29936 |
| 24 | 24816 | 25776 | 25776 | 26736 | 27696 | 28656 | 29936 | 29936 | 30936 | 31704 |
| 25 | 25776 | 26736 | 26736 | 27696 | 28656 | 29936 | 30936 | 31704 | 31704 | 33240 |
| 26 | 29936 | 30936 | 31704 | 33240 | 33240 | 34392 | 35544 | 36992 | 37888 | 37888 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1512 | 1544 | 1608 | 1640 | 1640 | 1672 | 1736 | 1768 | 1800 |
| 1 | 1928 | 2024 | 2024 | 2088 | 2088 | 2152 | 2280 | 2280 | 2344 | 2344 |
| 2 | 2344 | 2408 | 2536 | 2600 | 2664 | 2728 | 2728 | 2792 | 2856 | 2920 |
| 3 | 3112 | 3240 | 3304 | 3304 | 3368 | 3496 | 3560 | 3624 | 3752 | 3752 |
| 4 | 3880 | 3880 | 4072 | 4072 | 4200 | 4200 | 4392 | 4584 | 4584 | 4712 |
| 5 | 4712 | 4904 | 4904 | 5032 | 5224 | 5224 | 5352 | 5544 | 5736 | 5736 |
| 6 | 5544 | 5736 | 5992 | 5992 | 6200 | 6200 | 6456 | 6456 | 6712 | 6712 |
| 7 | 6456 | 6712 | 6968 | 6968 | 7224 | 7480 | 7480 | 7736 | 7736 | 8120 |
| 8 | 7480 | 7736 | 7736 | 8120 | 8120 | 8376 | 8376 | 8760 | 9144 | 9144 |
| 9 | 8376 | 8760 | 8760 | 9016 | 9144 | 9400 | 9784 | 9784 | 10040 | 10424 |
| 10 | 9400 | 9784 | 9784 | 10040 | 10424 | 10424 | 10680 | 11064 | 11064 | 11448 |
| 11 | 10808 | 11064 | 11448 | 11448 | 11960 | 11960 | 12384 | 12384 | 12960 | 12960 |
| 12 | 12384 | 12384 | 12960 | 12960 | 13344 | 13920 | 13920 | 14304 | 14304 | 14880 |
| 13 | 13920 | 13920 | 14304 | 14880 | 14880 | 15456 | 15840 | 15840 | 16416 | 16800 |
| 14 | 15456 | 15840 | 15840 | 16416 | 16800 | 16800 | 17568 | 17568 | 18336 | 18336 |
| 15 | 16416 | 16800 | 16800 | 17568 | 17568 | 18336 | 19080 | 19080 | 19848 | 19848 |
| 16 | 17568 | 17568 | 18336 | 18336 | 19080 | 19080 | 19848 | 20616 | 20616 | 21384 |
| 17 | 19080 | 19848 | 19848 | 20616 | 21384 | 21384 | 22152 | 22920 | 22920 | 23944 |
| 18 | 21384 | 21384 | 22152 | 22920 | 22920 | 23944 | 23944 | 24816 | 24816 | 25776 |
| 19 | 22920 | 23944 | 23944 | 24816 | 24816 | 25776 | 26736 | 26736 | 27696 | 27696 |
| 20 | 24816 | 25776 | 25776 | 26736 | 26736 | 27696 | 28656 | 28656 | 29936 | 29936 |
| 21 | 26736 | 27696 | 27696 | 28656 | 29936 | 29936 | 30936 | 31704 | 31704 | 33240 |
| 22 | 28656 | 29936 | 29936 | 30936 | 31704 | 31704 | 33240 | 33240 | 34392 | 35544 |
| 23 | 30936 | 31704 | 31704 | 33240 | 33240 | 34392 | 35544 | 35544 | 36992 | 36992 |
| 24 | 33240 | 33240 | 34392 | 34392 | 35544 | 36992 | 36992 | 37888 | 37888 | 39680 |
| 25 | 34392 | 34392 | 35544 | 36992 | 36992 | 37888 | 37888 | 39680 | 41024 | 41024 |
| 26 | 39680 | 39680 | 41024 | 42816 | 42816 | 44328 | 45864 | 45864 | 47912 | 47912 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 0 | 1864 | 1864 | 1928 | 1928 | 2024 | 2024 | 2088 | 2088 | 2088 | 2152 |
| 1 | 2408 | 2408 | 2536 | 2600 | 2600 | 2664 | 2728 | 2728 | 2792 | 2792 |
| 2 | 2984 | 3048 | 3048 | 3112 | 3240 | 3304 | 3304 | 3368 | 3496 | 3496 |
| 3 | 3880 | 3880 | 4072 | 4072 | 4200 | 4200 | 4392 | 4392 | 4584 | 4520 |
| 4 | 4712 | 4904 | 4904 | 5032 | 5224 | 5224 | 5352 | 5416 | 5544 | 5544 |
| 5 | 5992 | 5992 | 6200 | 6200 | 6200 | 6456 | 6456 | 6712 | 6712 | 6968 |
| 6 | 6968 | 6968 | 7224 | 7352 | 7352 | 7736 | 7736 | 7736 | 8120 | 8120 |
| 7 | 8120 | 8376 | 8376 | 8760 | 8760 | 8760 | 9016 | 9144 | 9400 | 9400 |
| 8 | 9400 | 9400 | 9784 | 9784 | 10040 | 10040 | 10424 | 10424 | 10808 | 11064 |
| 9 | 10424 | 10680 | 10808 | 11064 | 11448 | 11448 | 11960 | 11960 | 11960 | 12384 |
| 10 | 11960 | 11960 | 11960 | 12384 | 12384 | 12960 | 12960 | 13344 | 13344 | 13920 |
| 11 | 13344 | 13920 | 13920 | 14304 | 14304 | 14880 | 14880 | 15456 | 15456 | 15840 |
| 12 | 15456 | 15456 | 15840 | 15840 | 16416 | 16416 | 16800 | 16800 | 17568 | 17568 |
| 13 | 16800 | 17568 | 17568 | 18336 | 18336 | 19080 | 19080 | 19080 | 19848 | 19848 |
| 14 | 19080 | 19080 | 19848 | 19848 | 20616 | 20616 | 21384 | 21384 | 22152 | 22152 |
| 15 | 20616 | 20616 | 21384 | 21384 | 22152 | 22152 | 22920 | 22920 | 23944 | 23944 |
| 16 | 21384 | 22152 | 22152 | 22920 | 22920 | 23944 | 23944 | 24816 | 24816 | 25776 |
| 17 | 23944 | 24816 | 24816 | 25776 | 25776 | 26736 | 26736 | 26736 | 27696 | 27696 |
| 18 | 25776 | 26736 | 27696 | 27696 | 28656 | 28656 | 29936 | 29936 | 30936 | 30936 |
| 19 | 28656 | 28656 | 29936 | 29936 | 30936 | 31704 | 31704 | 33240 | 33240 | 33240 |
| 20 | 30936 | 31704 | 31704 | 33240 | 33240 | 34392 | 34392 | 35544 | 35544 | 36992 |

TABLE 9-continued

Second transport block size table-5

| ITBS | | | | | | | | | |
|---|---|---|---|---|---|---|---|---|---|
| 21 | 33240 | 34392 | 34392 | 35544 | 35544 | 36992 | 36992 | 37888 | 37888 | 39680 |
| 22 | 35544 | 36992 | 36992 | 37888 | 37888 | 39680 | 39680 | 41024 | 41024 | 42816 |
| 23 | 37888 | 37888 | 39680 | 39680 | 41024 | 41024 | 42816 | 42816 | 44328 | 44328 |
| 24 | 41024 | 41024 | 42816 | 42816 | 44328 | 44328 | 45864 | 45864 | 47912 | 47912 |
| 25 | 42816 | 42816 | 44328 | 44328 | 45864 | 45864 | 47912 | 47912 | 49296 | 49296 |
| 26 | 49296 | 49296 | 51024 | 52752 | 52752 | 52752 | 55056 | 55056 | 56696 | 56696 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2152 | 2280 | 2280 | 2344 | 2344 | 2344 | 2408 | 2408 | 2536 | 2536 |
| 1 | 2920 | 2984 | 2984 | 3048 | 3048 | 3112 | 3240 | 3240 | 3304 | 3304 |
| 2 | 3560 | 3624 | 3688 | 3752 | 3752 | 3880 | 3880 | 4072 | 4072 | 4072 |
| 3 | 4712 | 4712 | 4712 | 4904 | 4904 | 5032 | 5032 | 5224 | 5224 | 5416 |
| 4 | 5736 | 5736 | 5992 | 5992 | 5992 | 6200 | 6200 | 6456 | 6456 | 6456 |
| 5 | 6968 | 7224 | 7224 | 7480 | 7480 | 7480 | 7736 | 7736 | 7736 | 8120 |
| 6 | 8376 | 8376 | 8376 | 8760 | 8760 | 9016 | 9144 | 9144 | 9400 | 9400 |
| 7 | 9784 | 9784 | 10040 | 10040 | 10424 | 10424 | 10808 | 10808 | 11064 | 11064 |
| 8 | 11064 | 11448 | 11448 | 11960 | 11960 | 11960 | 12384 | 12384 | 12384 | 12960 |
| 9 | 12384 | 12960 | 12960 | 13344 | 13344 | 13344 | 13920 | 13920 | 14304 | 14304 |
| 10 | 13920 | 14304 | 14304 | 14880 | 14880 | 14880 | 15456 | 15456 | 15840 | 15840 |
| 11 | 15840 | 16416 | 16416 | 16800 | 16800 | 17568 | 17568 | 17568 | 18336 | 18336 |
| 12 | 18336 | 18336 | 18336 | 19080 | 19080 | 19848 | 19848 | 19848 | 20616 | 20616 |
| 13 | 20616 | 20616 | 21384 | 21384 | 22152 | 22152 | 22152 | 22920 | 22920 | 23944 |
| 14 | 22920 | 22920 | 23944 | 23944 | 23944 | 24816 | 24816 | 25776 | 25776 | 25776 |
| 15 | 23944 | 24816 | 24816 | 25776 | 25776 | 26736 | 26736 | 27696 | 27696 | 27696 |
| 16 | 25776 | 25776 | 26736 | 26736 | 27696 | 27696 | 28656 | 28656 | 28656 | 29936 |
| 17 | 28656 | 28656 | 29936 | 29936 | 30936 | 30936 | 31704 | 31704 | 31704 | 33240 |
| 18 | 31704 | 31704 | 31704 | 33240 | 33240 | 34392 | 34392 | 35544 | 35544 | 35544 |
| 19 | 34392 | 34392 | 35544 | 35544 | 36992 | 36992 | 37888 | 37888 | 37888 | 39680 |
| 20 | 36992 | 37888 | 37888 | 37888 | 39680 | 39680 | 41024 | 41024 | 41024 | 42816 |
| 21 | 39680 | 41024 | 41024 | 41024 | 42816 | 42816 | 44328 | 44328 | 45864 | 45864 |
| 22 | 42816 | 44328 | 44328 | 44328 | 45864 | 45864 | 47912 | 47912 | 47912 | 49296 |
| 23 | 45864 | 45864 | 47912 | 47912 | 49296 | 49296 | 49296 | 51024 | 51024 | 52752 |
| 24 | 47912 | 49296 | 49296 | 51024 | 51024 | 52752 | 52752 | 55056 | 55056 | 55056 |
| 25 | 51024 | 51024 | 52752 | 52752 | 52752 | 55056 | 55056 | 56696 | 56696 | 56696 |
| 26 | 59256 | 59256 | 61176 | 61176 | 63776 | 63776 | 63776 | 66592 | 66592 | 68808 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2728 | 2728 | 2728 | 2792 | 2792 | 2920 | 2920 |
| 1 | 3368 | 3368 | 3496 | 3560 | 3560 | 3624 | 3624 | 3752 | 3752 | 3752 |
| 2 | 4200 | 4200 | 4200 | 4392 | 4392 | 4392 | 4520 | 4584 | 4584 | 4712 |
| 3 | 5416 | 5544 | 5544 | 5736 | 5736 | 5736 | 5992 | 5992 | 5992 | 6200 |
| 4 | 6712 | 6712 | 6712 | 6968 | 6968 | 7224 | 7224 | 7224 | 7480 | 7480 |
| 5 | 8120 | 8120 | 8376 | 8376 | 8760 | 8760 | 8760 | 9144 | 9144 | 9016 |
| 6 | 9784 | 9784 | 10040 | 10040 | 10040 | 10424 | 10424 | 10680 | 10808 | 10808 |
| 7 | 11448 | 11448 | 11448 | 11960 | 11960 | 11960 | 12384 | 12384 | 12384 | 12960 |
| 8 | 12960 | 12960 | 13344 | 13344 | 13920 | 13920 | 14304 | 14304 | 14304 | 14304 |
| 9 | 14304 | 14880 | 14880 | 15456 | 15456 | 15456 | 15840 | 15840 | 16416 | 16416 |
| 10 | 16416 | 16416 | 16800 | 16800 | 16800 | 17568 | 17568 | 17568 | 18336 | 18336 |
| 11 | 18336 | 19080 | 19080 | 19080 | 19848 | 19848 | 20616 | 20616 | 20616 | 21384 |
| 12 | 21384 | 21384 | 21384 | 22152 | 22152 | 22920 | 22920 | 22920 | 23944 | 23944 |
| 13 | 23944 | 23944 | 24816 | 24816 | 24816 | 25776 | 25776 | 25776 | 26736 | 26736 |
| 14 | 26736 | 26736 | 26736 | 27696 | 27696 | 28656 | 28656 | 28656 | 29936 | 29936 |
| 15 | 28656 | 28656 | 28656 | 29936 | 29936 | 30936 | 30936 | 30936 | 31704 | 31704 |
| 16 | 29936 | 30936 | 30936 | 31704 | 31704 | 31704 | 33240 | 33240 | 33240 | 34392 |
| 17 | 33240 | 34392 | 34392 | 34392 | 35544 | 35544 | 35544 | 36992 | 36992 | 37888 |
| 18 | 36992 | 36992 | 37888 | 37888 | 37888 | 39680 | 39680 | 39680 | 41024 | 41024 |
| 19 | 39680 | 39680 | 41024 | 41024 | 42816 | 42816 | 42816 | 44328 | 44328 | 44328 |
| 20 | 42816 | 44328 | 44328 | 44328 | 45864 | 45864 | 45864 | 47912 | 47912 | 47912 |
| 21 | 45864 | 47912 | 47912 | 47912 | 49296 | 49296 | 51024 | 51024 | 51024 | 52752 |
| 22 | 49296 | 51024 | 51024 | 52752 | 52752 | 52752 | 55056 | 55056 | 55056 | 56696 |
| 23 | 52752 | 52752 | 55056 | 55056 | 56696 | 56696 | 56696 | 59256 | 59256 | 59256 |
| 24 | 56696 | 56696 | 59256 | 59256 | 59256 | 61176 | 61176 | 61176 | 63776 | 63776 |
| 25 | 59256 | 59256 | 61176 | 61176 | 61176 | 63776 | 63776 | 63776 | 66592 | 66592 |
| 26 | 68808 | 68808 | 71880 | 71880 | 71880 | 71880 | 74544 | 74544 | 74544 | 77040 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2984 | 2984 | 2984 | 3048 | 3048 | 3112 | 3112 | 3240 | 3240 | 3304 |
| 1 | 3880 | 3880 | 3880 | 4072 | 4072 | 4072 | 4200 | 4200 | 4200 | 4200 |
| 2 | 4712 | 4712 | 4904 | 4904 | 5032 | 5032 | 5032 | 5224 | 5224 | 5224 |
| 3 | 6200 | 6200 | 6200 | 6456 | 6456 | 6456 | 6712 | 6712 | 6712 | 6968 |

TABLE 9-continued

Second transport block size table-5

| ITBS | | | | | | | | | |
|---|---|---|---|---|---|---|---|---|---|
| 4 | 7480 | 7736 | 7736 | 7736 | 7736 | 8120 | 8120 | 8120 | 8376 | 8376 |
| 5 | 9400 | 9400 | 9400 | 9784 | 9784 | 9784 | 10040 | 10040 | 10040 | 10424 |
| 6 | 11064 | 11064 | 11448 | 11448 | 11448 | 11960 | 11960 | 11960 | 11960 | 12384 |
| 7 | 12960 | 12960 | 13344 | 13344 | 13344 | 13920 | 13920 | 13920 | 14304 | 14304 |
| 8 | 14880 | 14880 | 14880 | 15456 | 15456 | 15840 | 15840 | 15840 | 16416 | 16416 |
| 9 | 16800 | 16800 | 16800 | 17568 | 17568 | 17568 | 17568 | 18336 | 18336 | 18336 |
| 10 | 18336 | 19080 | 19080 | 19080 | 19080 | 19848 | 19848 | 19848 | 20616 | 20616 |
| 11 | 21384 | 21384 | 22152 | 22152 | 22152 | 22920 | 22920 | 22920 | 23944 | 23944 |
| 12 | 23944 | 24816 | 24816 | 24816 | 24816 | 25776 | 25776 | 25776 | 26736 | 26736 |
| 13 | 26736 | 27696 | 27696 | 27696 | 28656 | 28656 | 29936 | 29936 | 29936 |
| 14 | 29936 | 30936 | 30936 | 31704 | 31704 | 31704 | 33240 | 33240 | 33240 | 33240 |
| 15 | 31704 | 33240 | 33240 | 33240 | 34392 | 34392 | 34392 | 35544 | 35544 | 35544 |
| 16 | 34392 | 34392 | 35544 | 35544 | 35544 | 36992 | 36992 | 36992 | 37888 | 37888 |
| 17 | 37888 | 37888 | 39680 | 39680 | 39680 | 39680 | 41024 | 41024 | 41024 | 42816 |
| 18 | 41024 | 42816 | 42816 | 42816 | 44328 | 44328 | 44328 | 45864 | 45864 | 45864 |
| 19 | 45864 | 45864 | 45864 | 47912 | 47912 | 47912 | 49296 | 49296 | 49296 | 51024 |
| 20 | 49296 | 49296 | 51024 | 51024 | 51024 | 52752 | 52752 | 52752 | 55056 | 55056 |
| 21 | 52752 | 52752 | 55056 | 55056 | 55056 | 56696 | 56696 | 56696 | 59256 | 59256 |
| 22 | 56696 | 56696 | 59256 | 59256 | 59256 | 61176 | 61176 | 61176 | 63776 | 63776 |
| 23 | 61176 | 61176 | 61176 | 63776 | 63776 | 63776 | 66592 | 66592 | 66592 | 66592 |
| 24 | 63776 | 66592 | 66592 | 66592 | 68808 | 68808 | 68808 | 68808 | 71880 | 71880 |
| 25 | 66592 | 68808 | 68808 | 68808 | 71880 | 71880 | 71880 | 71880 | 74544 | 74544 |
| 26 | 77040 | 77040 | 80280 | 80280 | 80280 | 82968 | 82968 | 82968 | 86976 | 86976 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 3304 | 3304 | 3368 | 3368 | 3496 | 3496 | 3560 | 3560 | 3560 | 3624 |
| 1 | 4392 | 4392 | 4392 | 4584 | 4584 | 4584 | 4584 | 4712 | 4712 | 4712 |
| 2 | 5352 | 5416 | 5416 | 5544 | 5544 | 5544 | 5736 | 5736 | 5736 | 5992 |
| 3 | 6968 | 6968 | 6968 | 7224 | 7224 | 7224 | 7480 | 7480 | 7480 | 7480 |
| 4 | 8376 | 8376 | 8760 | 8760 | 8760 | 9144 | 9144 | 9144 | 9016 | 9400 |
| 5 | 10424 | 10424 | 10808 | 10680 | 10808 | 11064 | 11064 | 11448 | 11448 | 11448 |
| 6 | 12384 | 12384 | 12384 | 12960 | 12960 | 12960 | 13344 | 13344 | 13344 | 13344 |
| 7 | 14304 | 14880 | 14880 | 14880 | 14880 | 15456 | 15456 | 15456 | 15840 | 15840 |
| 8 | 16416 | 16800 | 16800 | 16800 | 17568 | 17568 | 17568 | 17568 | 18336 | 18336 |
| 9 | 18336 | 19080 | 19080 | 19080 | 19848 | 19848 | 19848 | 19848 | 20616 | 20616 |
| 10 | 20616 | 21384 | 21384 | 21384 | 22152 | 22152 | 22152 | 22152 | 22920 | 22920 |
| 11 | 23944 | 23944 | 24816 | 24816 | 24816 | 24816 | 25776 | 25776 | 25776 | 25776 |
| 12 | 26736 | 27696 | 27696 | 27696 | 27696 | 28656 | 28656 | 28656 | 29936 | 29936 |
| 13 | 30936 | 30936 | 30936 | 31704 | 31704 | 31704 | 33240 | 33240 | 33240 | 33240 |
| 14 | 34392 | 34392 | 34392 | 35544 | 35544 | 35544 | 36992 | 36992 | 36992 | 36992 |
| 15 | 36992 | 36696 | 36992 | 37888 | 37888 | 37888 | 37888 | 39680 | 39680 | 39680 |
| 16 | 37888 | 39680 | 39680 | 39680 | 39680 | 41024 | 41024 | 41024 | 41024 | 42816 |
| 17 | 42816 | 42816 | 44328 | 44328 | 44328 | 45864 | 45864 | 45864 | 45864 | 47912 |
| 18 | 47912 | 47912 | 47912 | 49296 | 49296 | 49296 | 49296 | 51024 | 51024 | 51024 |
| 19 | 51024 | 51024 | 52752 | 52752 | 52752 | 52752 | 55056 | 55056 | 55056 | 56696 |
| 20 | 55056 | 55056 | 56696 | 56696 | 56696 | 59256 | 59256 | 59256 | 61176 | 61176 |
| 21 | 59256 | 61176 | 61176 | 61176 | 61176 | 63776 | 63776 | 63776 | 63776 | 66592 |
| 22 | 63776 | 63776 | 66592 | 66592 | 66592 | 66592 | 68808 | 68808 | 68808 | 71880 |
| 23 | 68808 | 68808 | 68808 | 71880 | 71880 | 71880 | 71880 | 74544 | 74544 | 74544 |
| 24 | 71880 | 74544 | 74544 | 74544 | 74544 | 77040 | 77040 | 77040 | 80280 | 80280 |
| 25 | 74544 | 77040 | 77040 | 77040 | 80280 | 80280 | 80280 | 80280 | 82968 | 82968 |
| 26 | 86976 | 89856 | 89856 | 89856 | 92776 | 92776 | 92776 | 95848 | 95848 | 97896 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 3624 | 3752 | 3752 | 3752 | 3880 | 3880 | 3880 | 3880 | 3880 | 4072 |
| 1 | 4904 | 4904 | 4904 | 4904 | 5032 | 5032 | 5032 | 5224 | 5224 | 5224 |
| 2 | 5992 | 5992 | 5992 | 5992 | 6200 | 6200 | 6200 | 6200 | 6456 | 6456 |
| 3 | 7736 | 7736 | 7736 | 7736 | 8120 | 8120 | 8120 | 8120 | 8376 | 8376 |
| 4 | 9400 | 9400 | 9784 | 9784 | 9784 | 9784 | 10040 | 10040 | 10040 | 10424 |
| 5 | 11448 | 11960 | 11960 | 11960 | 11960 | 12384 | 12384 | 12384 | 12384 | 12384 |
| 6 | 13920 | 13920 | 13920 | 13920 | 14304 | 14304 | 14304 | 14880 | 14880 | 14880 |
| 7 | 15840 | 16416 | 16416 | 16416 | 16800 | 16800 | 16800 | 16800 | 17568 | 17568 |
| 8 | 18336 | 18336 | 19080 | 19080 | 19080 | 19080 | 19848 | 19848 | 19848 | 19848 |
| 9 | 20616 | 21384 | 21384 | 21384 | 21384 | 22152 | 22152 | 22152 | 22152 | 22920 |
| 10 | 22920 | 23944 | 23944 | 23944 | 23944 | 23944 | 24816 | 24816 | 24816 | 24816 |
| 11 | 26736 | 26736 | 26736 | 27696 | 27696 | 27696 | 27696 | 28656 | 28656 | 28656 |
| 12 | 29936 | 30936 | 30936 | 30936 | 30936 | 31704 | 31704 | 31704 | 33240 |
| 13 | 34392 | 34392 | 34392 | 34392 | 35544 | 35544 | 35544 | 35544 | 36992 | 36992 |
| 14 | 37888 | 37888 | 37888 | 37888 | 39680 | 39680 | 39680 | 39680 | 41024 | 41024 |
| 15 | 39680 | 41024 | 41024 | 41024 | 41024 | 42816 | 42816 | 42816 | 44328 | 44328 |
| 16 | 42816 | 42816 | 44328 | 44328 | 44328 | 44328 | 45864 | 45864 | 45864 | 45864 |
| 17 | 47912 | 47912 | 47912 | 49296 | 49296 | 49296 | 51024 | 51024 | 51024 | 51024 |

TABLE 9-continued

Second transport block size table-5

| | | | | | | | | | | |
|---|---|---|---|---|---|---|---|---|---|---|
| 18 | 52752 | 52752 | 52752 | 52752 | 55056 | 55056 | 55056 | 55056 | 56696 | 56696 |
| 19 | 56696 | 56696 | 56696 | 59256 | 59256 | 59256 | 61176 | 61176 | 61176 | 61176 |
| 20 | 61176 | 61176 | 63776 | 63776 | 63776 | 63776 | 63776 | 66592 | 66592 | 66592 |
| 21 | 66592 | 66592 | 66592 | 68808 | 68808 | 68808 | 68808 | 71880 | 71880 | 71880 |
| 22 | 71880 | 71880 | 71880 | 74544 | 74544 | 74544 | 74544 | 77040 | 77040 | 77040 |
| 23 | 74544 | 77040 | 77040 | 77040 | 77040 | 80280 | 80280 | 80280 | 80280 | 82968 |
| 24 | 80280 | 80280 | 82968 | 82968 | 82968 | 82968 | 86976 | 86976 | 86976 | 86976 |
| 25 | 82968 | 82968 | 86976 | 86976 | 86976 | 86976 | 89856 | 89856 | 89856 | 92776 |
| 26 | 97896 | 97896 | 97896 | 97896 | 97896 | 97896 | 97896 | 97896 | 97896 | 97896 |

Alternatively, the second transport block size table may further be shown in Table 10. All TBSs included in Table 10 may be formed by newly designed elements, where the newly designed elements may be included and may also be not included in the layer-1 data transport block size table in LTE REL.8 shown in Table 1, and may also be included and may also be not included in the set layer-2 data transport block size table shown in Table 7.

Still further, on the basis of the foregoing embodiment, any TBS in the second transport block size table may be a TBS designed according to the target coding rate, that is, the coding rate corresponding to the determined TBS in the LTE REL.12 system with the system overhead of 12 REs may be very close to and even equal to the target coding rate, where the target coding rate may be the optimized coding rate of the coding rate corresponding to the modulation and coding scheme level in LTE REL.8 shown in Table 3.

TABLE 10

Second transport block size table-6

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 0 | 16 | 48 | 88 | 120 | 160 | 192 | 232 | 272 | 304 | 344 |
| 1 | 24 | 72 | 120 | 168 | 216 | 264 | 312 | 360 | 408 | 456 |
| 2 | 32 | 96 | 152 | 208 | 272 | 328 | 384 | 448 | 504 | 568 |
| 3 | 56 | 128 | 208 | 280 | 360 | 432 | 504 | 584 | 664 | 744 |
| 4 | 72 | 160 | 256 | 352 | 448 | 536 | 632 | 728 | 824 | 920 |
| 5 | 88 | 208 | 320 | 440 | 552 | 664 | 792 | 904 | 1000 | 1128 |
| 6 | 112 | 248 | 384 | 520 | 664 | 792 | 936 | 1064 | 1192 | 1352 |
| 7 | 136 | 296 | 456 | 616 | 776 | 936 | 1096 | 1256 | 1416 | 1576 |
| 8 | 160 | 344 | 520 | 712 | 888 | 1064 | 1256 | 1448 | 1640 | 1800 |
| 9 | 184 | 392 | 600 | 808 | 1000 | 1224 | 1416 | 1640 | 1832 | 2024 |
| 10 | 208 | 440 | 664 | 904 | 1128 | 1352 | 1576 | 1832 | 2024 | 2280 |
| 11 | 240 | 504 | 776 | 1032 | 1288 | 1576 | 1832 | 2088 | 2344 | 2600 |
| 12 | 272 | 568 | 872 | 1160 | 1480 | 1768 | 2088 | 2344 | 2664 | 2984 |
| 13 | 312 | 648 | 984 | 1320 | 1672 | 1992 | 2344 | 2664 | 2984 | 3368 |
| 14 | 352 | 728 | 1096 | 1480 | 1864 | 2216 | 2600 | 2984 | 3368 | 3752 |
| 15 | 376 | 776 | 1192 | 1576 | 1992 | 2408 | 2792 | 3176 | 3560 | 4008 |
| 16 | 400 | 824 | 1256 | 1672 | 2088 | 2536 | 2984 | 3368 | 3816 | 4264 |
| 17 | 448 | 920 | 1384 | 1864 | 2344 | 2792 | 3304 | 3752 | 4200 | 4712 |
| 18 | 488 | 1000 | 1544 | 2024 | 2536 | 3112 | 3624 | 4136 | 4648 | 5160 |
| 19 | 536 | 1096 | 1672 | 2216 | 2792 | 3368 | 3944 | 4456 | 5032 | 5608 |
| 20 | 584 | 1192 | 1800 | 2408 | 3048 | 3624 | 4264 | 4840 | 5480 | 6056 |
| 21 | 632 | 1288 | 1960 | 2600 | 3240 | 3944 | 4584 | 5224 | 5864 | 6456 |
| 22 | 680 | 1384 | 2088 | 2792 | 3496 | 4200 | 4904 | 5608 | 6328 | 6968 |
| 23 | 728 | 1480 | 2216 | 2984 | 3752 | 4456 | 5224 | 5992 | 6712 | 7480 |
| 24 | 776 | 1576 | 2344 | 3176 | 3944 | 4776 | 5544 | 6328 | 7096 | 7864 |
| 25 | 808 | 1640 | 2472 | 3304 | 4136 | 4968 | 5800 | 6584 | 7352 | 8248 |
| 26 | 840 | 1704 | 2600 | 3432 | 4328 | 5160 | 6056 | 6840 | 7736 | 8632 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 0 | 376 | 416 | 448 | 488 | 520 | 568 | 600 | 632 | 664 | 712 |
| 1 | 504 | 552 | 600 | 648 | 696 | 744 | 792 | 840 | 888 | 936 |
| 2 | 616 | 680 | 744 | 792 | 856 | 920 | 968 | 1032 | 1096 | 1160 |
| 3 | 824 | 888 | 968 | 1032 | 1128 | 1192 | 1288 | 1352 | 1416 | 1512 |
| 4 | 1000 | 1096 | 1192 | 1288 | 1384 | 1480 | 1576 | 1672 | 1768 | 1864 |
| 5 | 1256 | 1352 | 1480 | 1608 | 1704 | 1832 | 1928 | 2024 | 2152 | 2280 |
| 6 | 1480 | 1608 | 1768 | 1896 | 2024 | 2152 | 2280 | 2408 | 2600 | 2728 |
| 7 | 1736 | 1896 | 2088 | 2216 | 2408 | 2536 | 2728 | 2856 | 3048 | 3176 |
| 8 | 1992 | 2152 | 2344 | 2536 | 2728 | 2920 | 3112 | 3304 | 3432 | 3624 |
| 9 | 2280 | 2472 | 2664 | 2856 | 3048 | 3304 | 3496 | 3688 | 3880 | 4136 |
| 10 | 2536 | 2728 | 2984 | 3176 | 3432 | 3688 | 3880 | 4136 | 4328 | 4584 |
| 11 | 2856 | 3176 | 3432 | 3688 | 3944 | 4200 | 4456 | 4712 | 5032 | 5288 |
| 12 | 3240 | 3560 | 3880 | 4136 | 4456 | 4776 | 5032 | 5352 | 5672 | 5928 |
| 13 | 3688 | 4008 | 4328 | 4712 | 5032 | 5352 | 5736 | 6056 | 6328 | 6712 |

TABLE 10-continued

Second transport block size table-6

| ITBS | | | | | | | | | |
|---|---|---|---|---|---|---|---|---|---|
| 14 | 4136 | 4456 | 4840 | 5224 | 5608 | 5992 | 6328 | 6712 | 7096 | 7480 |
| 15 | 4392 | 4776 | 5160 | 5608 | 5992 | 6328 | 6712 | 7096 | 7608 | 7992 |
| 16 | 4648 | 5096 | 5544 | 5928 | 6328 | 6712 | 7224 | 7608 | 7992 | 8504 |
| 17 | 5160 | 5672 | 6120 | 6584 | 6968 | 7480 | 7992 | 8376 | 8888 | 9400 |
| 18 | 5672 | 6200 | 6712 | 7224 | 7736 | 8248 | 8760 | 9272 | 9784 | 10296 |
| 19 | 6120 | 6712 | 7224 | 7864 | 8376 | 8888 | 9528 | 10040 | 10680 | 11192 |
| 20 | 6584 | 7224 | 7864 | 8504 | 9016 | 9656 | 10296 | 10936 | 11448 | 12088 |
| 21 | 7096 | 7864 | 8504 | 9144 | 9784 | 10424 | 11064 | 11704 | 12384 | 12960 |
| 22 | 7736 | 8376 | 9144 | 9784 | 10552 | 11192 | 11960 | 12576 | 13344 | 14112 |
| 23 | 8248 | 8888 | 9656 | 10424 | 11192 | 11960 | 12768 | 13344 | 14112 | 14880 |
| 24 | 8760 | 9528 | 10296 | 11064 | 11960 | 12576 | 13536 | 14304 | 15072 | 15840 |
| 25 | 9016 | 9912 | 10680 | 11576 | 12384 | 13152 | 14112 | 14880 | 15648 | 16608 |
| 26 | 9400 | 10296 | 11192 | 12088 | 12960 | 13728 | 14688 | 15456 | 16416 | 17184 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 0 | 744 | 776 | 824 | 856 | 888 | 920 | 968 | 1000 | 1032 | 1064 |
| 1 | 984 | 1032 | 1064 | 1128 | 1160 | 1224 | 1256 | 1320 | 1352 | 1416 |
| 2 | 1224 | 1256 | 1320 | 1384 | 1448 | 1512 | 1576 | 1608 | 1672 | 1736 |
| 3 | 1576 | 1672 | 1736 | 1800 | 1896 | 1960 | 2024 | 2088 | 2216 | 2280 |
| 4 | 1960 | 2024 | 2152 | 2216 | 2344 | 2408 | 2536 | 2600 | 2728 | 2792 |
| 5 | 2408 | 2536 | 2600 | 2728 | 2856 | 2084 | 3112 | 3240 | 3304 | 3432 |
| 6 | 2856 | 2984 | 3112 | 3240 | 3368 | 3560 | 3688 | 3816 | 3944 | 4072 |
| 7 | 3368 | 3496 | 3688 | 3816 | 4008 | 4136 | 4328 | 4456 | 4648 | 4776 |
| 8 | 3816 | 4008 | 4200 | 4392 | 4584 | 4776 | 4904 | 5096 | 5288 | 5480 |
| 9 | 4328 | 4520 | 4712 | 4968 | 5160 | 5352 | 5544 | 5800 | 5992 | 6120 |
| 10 | 4840 | 5032 | 5288 | 5480 | 5736 | 5992 | 6200 | 6328 | 6584 | 6840 |
| 11 | 5544 | 5800 | 6056 | 6328 | 6584 | 6840 | 7096 | 7352 | 7608 | 7864 |
| 12 | 6200 | 6456 | 6840 | 7096 | 7352 | 7736 | 7092 | 8248 | 8632 | 8888 |
| 13 | 6968 | 7352 | 7736 | 7992 | 8376 | 8632 | 9016 | 9400 | 9656 | 10040 |
| 14 | 7864 | 8248 | 8504 | 8888 | 9272 | 9656 | 10040 | 10424 | 10808 | 11192 |
| 15 | 8376 | 8760 | 9144 | 9528 | 9912 | 10296 | 10808 | 11192 | 11576 | 11960 |
| 16 | 8888 | 9272 | 9784 | 10168 | 10552 | 11064 | 11448 | 11832 | 12216 | 12768 |
| 17 | 9912 | 10296 | 10808 | 11320 | 11704 | 12216 | 12576 | 13152 | 13536 | 14112 |
| 18 | 10808 | 11320 | 11832 | 12384 | 12768 | 13344 | 13920 | 14496 | 14880 | 15456 |
| 19 | 11704 | 12384 | 12768 | 13344 | 13920 | 14496 | 15072 | 15648 | 16224 | 16800 |
| 20 | 12768 | 13344 | 13920 | 14496 | 15072 | 15648 | 16416 | 16992 | 17568 | 18144 |
| 21 | 13728 | 14304 | 15072 | 15648 | 16416 | 16992 | 17568 | 18336 | 18824 | 19592 |
| 22 | 14688 | 15456 | 16224 | 16800 | 17568 | 18336 | 18824 | 19592 | 20360 | 21128 |
| 23 | 15648 | 16416 | 17184 | 17952 | 18568 | 19336 | 20104 | 20872 | 21640 | 22408 |
| 24 | 16608 | 17376 | 18336 | 19080 | 19848 | 20616 | 21384 | 22152 | 22920 | 23944 |
| 25 | 17376 | 18144 | 19080 | 19848 | 20616 | 21384 | 22408 | 23176 | 23944 | 24816 |
| 26 | 18144 | 18824 | 19848 | 20616 | 21640 | 22408 | 23176 | 24200 | 25136 | 25776 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 0 | 1096 | 1160 | 1192 | 1224 | 1256 | 1288 | 1320 | 1352 | 1416 | 1448 |
| 1 | 1448 | 1512 | 1544 | 1608 | 1640 | 1704 | 1736 | 1800 | 1832 | 1896 |
| 2 | 1800 | 1864 | 1928 | 1960 | 2024 | 2088 | 2152 | 2216 | 2280 | 2344 |
| 3 | 2344 | 2408 | 2472 | 2600 | 2664 | 2728 | 2792 | 2856 | 2984 | 3048 |
| 4 | 2856 | 2984 | 3048 | 3176 | 3240 | 3368 | 3432 | 3560 | 3624 | 3752 |
| 5 | 3560 | 3688 | 3816 | 3880 | 4008 | 4136 | 4264 | 4392 | 4456 | 4584 |
| 6 | 4200 | 4328 | 4520 | 4648 | 4776 | 4904 | 5032 | 5160 | 5288 | 5480 |
| 7 | 4968 | 5096 | 5288 | 5416 | 5608 | 5736 | 5928 | 6056 | 6200 | 6328 |
| 8 | 5672 | 5864 | 6056 | 6200 | 6328 | 6584 | 6712 | 6840 | 7096 | 7224 |
| 9 | 6328 | 6584 | 6712 | 6968 | 7224 | 7352 | 7608 | 7736 | 7002 | 8248 |
| 10 | 7096 | 7352 | 7480 | 7736 | 7992 | 8248 | 8504 | 8632 | 8888 | 9144 |
| 11 | 8120 | 8376 | 8632 | 8888 | 9144 | 9400 | 9656 | 10040 | 10296 | 10552 |
| 12 | 9144 | 9528 | 9784 | 10040 | 10424 | 10680 | 10936 | 11320 | 11576 | 11832 |
| 13 | 10424 | 10680 | 11064 | 11448 | 11704 | 12088 | 12384 | 12768 | 12960 | 13344 |
| 14 | 11576 | 11960 | 12384 | 12576 | 12960 | 13344 | 13728 | 14112 | 14496 | 14880 |
| 15 | 12384 | 12768 | 13152 | 13536 | 13920 | 14304 | 14688 | 15072 | 15456 | 16032 |
| 16 | 13152 | 13536 | 13920 | 14304 | 14880 | 15264 | 15648 | 16032 | 16605 | 16992 |
| 17 | 14496 | 15072 | 15456 | 16032 | 16416 | 16992 | 17376 | 17952 | 18336 | 18824 |
| 18 | 16032 | 16416 | 16992 | 17568 | 17952 | 18568 | 19080 | 19592 | 20104 | 20616 |
| 19 | 17376 | 17952 | 18568 | 19080 | 19592 | 20104 | 20616 | 21384 | 21896 | 22408 |
| 20 | 18824 | 19336 | 19848 | 20616 | 21128 | 21896 | 22408 | 22920 | 23688 | 24200 |
| 21 | 20360 | 20872 | 21640 | 22152 | 22920 | 23432 | 24200 | 24816 | 25456 | 26096 |
| 22 | 21640 | 22408 | 23176 | 23944 | 24496 | 25136 | 26096 | 26736 | 27376 | 28016 |
| 23 | 23176 | 23944 | 24496 | 25456 | 26096 | 27056 | 27696 | 28336 | 29296 | 29936 |
| 24 | 24496 | 25456 | 26096 | 27056 | 27696 | 28656 | 29296 | 30256 | 30936 | 31704 |
| 25 | 25776 | 26416 | 27376 | 28016 | 28976 | 29936 | 30576 | 31320 | 32088 | 33240 |
| 26 | 26736 | 27696 | 28336 | 29296 | 30256 | 30936 | 31704 | 32856 | 33624 | 34392 |

TABLE 10-continued

Second transport block size table-6

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 0 | 1480 | 1512 | 1544 | 1576 | 1608 | 1672 | 1704 | 1736 | 1768 | 1800 |
| 1 | 1928 | 1992 | 2024 | 2088 | 2152 | 2152 | 2216 | 2280 | 2344 | 2344 |
| 2 | 2408 | 2472 | 2536 | 2536 | 2600 | 2664 | 2728 | 2792 | 2856 | 2920 |
| 3 | 3112 | 3176 | 3240 | 3368 | 3432 | 3496 | 3560 | 3624 | 3752 | 3816 |
| 4 | 3816 | 3944 | 4008 | 4136 | 4200 | 4264 | 4392 | 4456 | 4584 | 4648 |
| 5 | 4712 | 4840 | 4968 | 5032 | 5160 | 5288 | 5416 | 5544 | 5608 | 5736 |
| 6 | 5608 | 5736 | 5864 | 5992 | 6120 | 6200 | 6328 | 6456 | 6584 | 6712 |
| 7 | 6456 | 6712 | 6840 | 6968 | 7096 | 7352 | 7480 | 7608 | 7736 | 7992 |
| 8 | 7480 | 7608 | 7864 | 7992 | 8120 | 8376 | 8504 | 8760 | 8888 | 9144 |
| 9 | 8376 | 8632 | 8888 | 9016 | 9272 | 9400 | 9656 | 9912 | 10040 | 10296 |
| 10 | 9400 | 9656 | 9784 | 10040 | 10296 | 10552 | 10808 | 10936 | 11192 | 11448 |
| 11 | 10808 | 11064 | 11320 | 11576 | 11832 | 12088 | 12384 | 12576 | 12768 | 13152 |
| 12 | 12216 | 12384 | 12768 | 12960 | 13344 | 13728 | 13920 | 14304 | 14496 | 14880 |
| 13 | 13728 | 14112 | 14304 | 14688 | 15072 | 15456 | 15648 | 16032 | 16416 | 16800 |
| 14 | 15264 | 15648 | 16032 | 16416 | 16800 | 17184 | 17568 | 17952 | 18336 | 18568 |
| 15 | 16416 | 16800 | 17184 | 17568 | 17952 | 18336 | 18824 | 19080 | 19592 | 19848 |
| 16 | 17376 | 17760 | 18144 | 18568 | 19080 | 19592 | 19848 | 20360 | 20872 | 21128 |
| 17 | 19336 | 19848 | 20104 | 20616 | 21128 | 21640 | 22152 | 22664 | 22920 | 23432 |
| 18 | 21128 | 21640 | 22152 | 22664 | 23176 | 23688 | 24200 | 24816 | 25136 | 25776 |
| 19 | 22920 | 23432 | 24200 | 24496 | 25136 | 25776 | 26416 | 26736 | 27376 | 28016 |
| 20 | 24816 | 25456 | 26096 | 26736 | 27376 | 28016 | 28336 | 28976 | 29616 | 30256 |
| 21 | 26736 | 27376 | 28016 | 28656 | 29296 | 29936 | 30576 | 31320 | 32088 | 32856 |
| 22 | 28656 | 29616 | 30256 | 30936 | 31704 | 32472 | 32856 | 33624 | 34392 | 35160 |
| 23 | 30576 | 31320 | 32088 | 32856 | 33624 | 34392 | 35160 | 35928 | 36696 | 37440 |
| 24 | 32472 | 33240 | 34008 | 34776 | 35928 | 36696 | 37440 | 37888 | 38784 | 39680 |
| 25 | 34008 | 34776 | 35544 | 36312 | 37440 | 37888 | 38784 | 39680 | 40576 | 41472 |
| 26 | 35544 | 36312 | 36092 | 37888 | 38784 | 39680 | 40576 | 41472 | 42368 | 43304 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 0 | 1832 | 1864 | 1928 | 1960 | 1992 | 2024 | 2088 | 2088 | 2152 | 2152 |
| 1 | 2408 | 2472 | 2536 | 2536 | 2600 | 2664 | 2728 | 2728 | 2792 | 2856 |
| 2 | 2984 | 3048 | 3112 | 3176 | 3240 | 3240 | 3304 | 3368 | 3432 | 3496 |
| 3 | 3880 | 3944 | 4008 | 4136 | 4200 | 4264 | 4328 | 4392 | 4456 | 4584 |
| 4 | 4776 | 4840 | 4968 | 5032 | 5160 | 5224 | 5352 | 5416 | 5544 | 5608 |
| 5 | 5864 | 5992 | 6120 | 6200 | 6328 | 6456 | 6456 | 6584 | 6712 | 6840 |
| 6 | 6968 | 7096 | 7224 | 7352 | 7480 | 7608 | 7736 | 7864 | 7992 | 8120 |
| 7 | 8120 | 8248 | 8376 | 8632 | 8760 | 8888 | 9016 | 9272 | 9400 | 9528 |
| 8 | 9272 | 9528 | 9656 | 9784 | 10040 | 10168 | 10424 | 10552 | 10808 | 10936 |
| 9 | 10424 | 10680 | 10936 | 11064 | 11320 | 11576 | 11704 | 11960 | 12088 | 12384 |
| 10 | 11704 | 11960 | 12088 | 12384 | 12576 | 12768 | 12960 | 13344 | 13536 | 13728 |
| 11 | 13344 | 13728 | 13920 | 14112 | 14496 | 14688 | 15072 | 15264 | 15456 | 15840 |
| 12 | 15072 | 15456 | 15648 | 16032 | 16416 | 16608 | 16992 | 17184 | 17568 | 17760 |
| 13 | 17184 | 17376 | 17760 | 18144 | 18336 | 18824 | 19080 | 19336 | 19848 | 20104 |
| 14 | 19080 | 19336 | 19848 | 20104 | 20616 | 20872 | 21384 | 21640 | 22152 | 22408 |
| 15 | 20360 | 20616 | 21128 | 21640 | 21896 | 22408 | 22664 | 23176 | 23432 | 23944 |
| 16 | 21640 | 22152 | 22408 | 22920 | 23432 | 23688 | 24200 | 24496 | 25136 | 25456 |
| 17 | 23944 | 24456 | 24816 | 25456 | 25776 | 26416 | 26736 | 27376 | 27696 | 28336 |
| 18 | 26416 | 26736 | 27376 | 27696 | 28336 | 28976 | 29296 | 29936 | 30576 | 30936 |
| 19 | 28656 | 29296 | 29616 | 30256 | 30936 | 31320 | 32088 | 32472 | 33240 | 33624 |
| 20 | 30936 | 31320 | 32088 | 32856 | 33240 | 34008 | 34392 | 35160 | 35928 | 36312 |
| 21 | 33240 | 34008 | 34776 | 35160 | 35928 | 36696 | 37440 | 37888 | 38784 | 39232 |
| 22 | 35928 | 36696 | 36992 | 37888 | 38784 | 39232 | 40128 | 40576 | 41472 | 42368 |
| 23 | 38336 | 38784 | 39680 | 40576 | 41024 | 41920 | 42816 | 43304 | 44328 | 44840 |
| 24 | 40576 | 41472 | 41920 | 42816 | 43816 | 44328 | 45352 | 45864 | 46888 | 47912 |
| 25 | 42368 | 42816 | 43816 | 44840 | 45352 | 46376 | 47400 | 47912 | 48936 | 49872 |
| 26 | 43816 | 44840 | 45864 | 46376 | 47400 | 48424 | 49296 | 49872 | 51024 | 51600 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2216 | 2216 | 2280 | 2344 | 2344 | 2408 | 2408 | 2472 | 2472 | 2536 |
| 1 | 2920 | 2920 | 2984 | 3048 | 3112 | 3112 | 3176 | 3240 | 3304 | 3304 |
| 2 | 3560 | 3624 | 3688 | 3752 | 3816 | 3880 | 3944 | 3944 | 4008 | 4072 |
| 3 | 4648 | 4712 | 4776 | 4840 | 4968 | 5032 | 5096 | 5160 | 5224 | 5352 |
| 4 | 5672 | 5800 | 5864 | 5992 | 6056 | 6120 | 6200 | 6328 | 6456 | 6456 |
| 5 | 6968 | 7096 | 7224 | 7352 | 7480 | 7608 | 7608 | 7736 | 7864 | 7992 |
| 6 | 9656 | 8376 | 8504 | 8632 | 8760 | 9016 | 9144 | 9272 | 9400 | 9528 |
| 7 | 9656 | 9912 | 10040 | 10168 | 10296 | 10552 | 10680 | 10808 | 10936 | 11192 |
| 8 | 11064 | 11320 | 11448 | 11704 | 11832 | 12088 | 12216 | 12384 | 12576 | 12768 |
| 9 | 12576 | 12768 | 12960 | 13152 | 13344 | 13536 | 13728 | 13920 | 14112 | 14304 |

TABLE 10-continued

Second transport block size table-6

| | | | | | | | | | | |
|---|---|---|---|---|---|---|---|---|---|---|
| 10 | 13920 | 14112 | 14496 | 14688 | 14880 | 15072 | 15264 | 15648 | 15840 | 16032 |
| 11 | 16032 | 16224 | 16608 | 16800 | 17184 | 17376 | 17568 | 17952 | 18144 | 18336 |
| 12 | 18144 | 18336 | 18568 | 19080 | 19336 | 19592 | 19848 | 20104 | 20360 | 20872 |
| 13 | 20360 | 20872 | 21128 | 21384 | 21896 | 22152 | 22408 | 22920 | 23176 | 23432 |
| 14 | 22664 | 23176 | 23432 | 23944 | 24200 | 24496 | 25136 | 25456 | 25776 | 26096 |
| 15 | 24456 | 24816 | 25136 | 25456 | 25776 | 26416 | 26736 | 27056 | 27376 | 28016 |
| 16 | 25776 | 26416 | 26736 | 27056 | 27696 | 28016 | 28336 | 28976 | 29296 | 29616 |
| 17 | 28656 | 29296 | 29616 | 30256 | 30576 | 30936 | 31320 | 32088 | 32472 | 32856 |
| 18 | 31320 | 32088 | 32472 | 32856 | 33624 | 34008 | 34392 | 35160 | 35544 | 35928 |
| 19 | 34008 | 34776 | 35160 | 35928 | 36312 | 36092 | 37440 | 37888 | 38784 | 39232 |
| 20 | 36992 | 37440 | 38336 | 38784 | 39232 | 40128 | 40576 | 41024 | 41920 | 42368 |
| 21 | 39680 | 40576 | 41024 | 41920 | 42368 | 43304 | 43816 | 44328 | 45352 | 45864 |
| 22 | 42816 | 43304 | 44328 | 44840 | 45864 | 46376 | 46888 | 47912 | 48424 | 49296 |
| 23 | 45864 | 46376 | 46888 | 47912 | 48424 | 49296 | 49872 | 51024 | 51600 | 52176 |
| 24 | 48424 | 49296 | 49872 | 51024 | 51600 | 52176 | 53328 | 53904 | 55056 | 55416 |
| 25 | 50448 | 51600 | 52176 | 52752 | 53904 | 54480 | 55416 | 56056 | 57336 | 57976 |
| 26 | 52752 | 53328 | 54480 | 55056 | 56056 | 56696 | 57976 | 58616 | 59256 | 60536 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2664 | 2728 | 2728 | 2792 | 2856 | 2856 | 2920 |
| 1 | 3368 | 3432 | 3496 | 3496 | 3560 | 3624 | 3688 | 3688 | 3752 | 3816 |
| 2 | 4136 | 4200 | 4264 | 4328 | 4392 | 4456 | 4520 | 4584 | 4648 | 4712 |
| 3 | 5416 | 5480 | 5544 | 5608 | 5736 | 5800 | 5864 | 5928 | 5992 | 6120 |
| 4 | 6584 | 6712 | 6840 | 6840 | 6968 | 7096 | 7096 | 7224 | 7352 | 7480 |
| 5 | 8120 | 8248 | 8376 | 8504 | 8632 | 8760 | 8760 | 8888 | 9016 | 9144 |
| 6 | 9656 | 9784 | 9912 | 10040 | 10168 | 10296 | 10424 | 10552 | 10680 | 10936 |
| 7 | 11320 | 11448 | 11576 | 11832 | 11960 | 12088 | 12216 | 12384 | 12576 | 12768 |
| 8 | 12960 | 13152 | 13344 | 13536 | 13728 | 13920 | 14112 | 14304 | 14304 | 14496 |
| 9 | 14688 | 14880 | 15072 | 15264 | 15456 | 15648 | 15840 | 16032 | 16224 | 16416 |
| 10 | 16224 | 16416 | 16800 | 16992 | 17184 | 17376 | 17568 | 17952 | 18144 | 18336 |
| 11 | 18568 | 18824 | 19080 | 19336 | 19592 | 20104 | 20360 | 20616 | 20872 | 21128 |
| 12 | 21128 | 21384 | 21640 | 21896 | 22152 | 22664 | 22920 | 23176 | 23432 | 23688 |
| 13 | 23688 | 24200 | 24456 | 24816 | 25136 | 25456 | 25776 | 26096 | 26416 | 26736 |
| 14 | 26416 | 26736 | 27376 | 27696 | 28016 | 28336 | 28656 | 29296 | 29616 | 29936 |
| 15 | 28336 | 28656 | 28976 | 29616 | 29936 | 30256 | 30576 | 30936 | 31320 | 32088 |
| 16 | 30256 | 30576 | 30936 | 31320 | 31704 | 32088 | 32472 | 33240 | 33624 | 34008 |
| 17 | 33240 | 34008 | 34392 | 34776 | 35160 | 35928 | 36312 | 36696 | 36992 | 37440 |
| 18 | 36696 | 36992 | 37440 | 38336 | 38784 | 39232 | 39680 | 40128 | 40576 | 41472 |
| 19 | 39680 | 40128 | 41024 | 41472 | 41920 | 42816 | 43304 | 43816 | 44328 | 44840 |
| 20 | 42816 | 43816 | 44328 | 44840 | 45352 | 45864 | 46888 | 47400 | 47912 | 48424 |
| 21 | 46376 | 46888 | 47912 | 48424 | 48936 | 49872 | 50448 | 51024 | 51600 | 52176 |
| 22 | 49872 | 50448 | 51024 | 52176 | 52752 | 53328 | 53904 | 55056 | 55416 | 56056 |
| 23 | 53328 | 53904 | 54480 | 55416 | 56056 | 56696 | 57336 | 58616 | 59256 | 59896 |
| 24 | 56696 | 57336 | 57976 | 58616 | 59896 | 60536 | 61176 | 61664 | 63072 | 63776 |
| 25 | 58616 | 59896 | 60536 | 61176 | 62368 | 63072 | 63776 | 64480 | 65184 | 66592 |
| 26 | 61176 | 62368 | 63072 | 63776 | 64480 | 65888 | 66592 | 67296 | 68040 | 68808 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2920 | 2984 | 2984 | 3048 | 3112 | 3112 | 3176 | 3176 | 3240 | 3240 |
| 1 | 3880 | 3880 | 3944 | 4008 | 4072 | 4072 | 4136 | 4200 | 4264 | 4264 |
| 2 | 4712 | 4776 | 4840 | 4904 | 4968 | 5032 | 5096 | 5160 | 5224 | 5288 |
| 3 | 6120 | 6200 | 6328 | 6328 | 6456 | 6456 | 6584 | 6712 | 6712 | 6840 |
| 4 | 7480 | 7608 | 7736 | 7864 | 7864 | 7992 | 8120 | 8248 | 8248 | 8376 |
| 5 | 9272 | 9400 | 9528 | 9656 | 9784 | 9912 | 9912 | 10040 | 10168 | 10296 |
| 6 | 11064 | 11192 | 11320 | 11448 | 11576 | 11704 | 11832 | 11960 | 12088 | 12216 |
| 7 | 12960 | 12960 | 13152 | 13344 | 13536 | 13728 | 13920 | 13920 | 14112 | 14304 |
| 8 | 14688 | 14880 | 15072 | 15264 | 15456 | 15648 | 15840 | 16032 | 16224 | 16416 |
| 9 | 16608 | 16800 | 16992 | 17376 | 17568 | 17760 | 17952 | 18144 | 18336 | 18568 |
| 10 | 18568 | 18824 | 19080 | 19336 | 19336 | 19592 | 19848 | 20104 | 20360 | 20616 |
| 11 | 21384 | 21640 | 21896 | 22152 | 22408 | 22664 | 22920 | 23176 | 23432 | 23688 |
| 12 | 23944 | 24456 | 24496 | 24816 | 25136 | 25456 | 25776 | 26096 | 26416 | 26736 |
| 13 | 27056 | 27376 | 27696 | 28016 | 28656 | 28976 | 29296 | 29616 | 29936 | 30256 |
| 14 | 30256 | 30576 | 30936 | 31320 | 31704 | 32088 | 32472 | 32856 | 33240 | 33624 |
| 15 | 32472 | 32856 | 33240 | 33624 | 34008 | 34392 | 34776 | 35160 | 35544 | 35928 |
| 16 | 34392 | 34776 | 35160 | 35544 | 35928 | 36312 | 36992 | 37440 | 37888 | 38336 |
| 17 | 37888 | 38784 | 39232 | 39680 | 40128 | 40576 | 41024 | 41472 | 41920 | 42368 |
| 18 | 41920 | 42368 | 42816 | 43304 | 43816 | 44328 | 44840 | 45352 | 45864 | 46376 |
| 19 | 45352 | 45864 | 46376 | 46888 | 47400 | 48424 | 48936 | 49296 | 49872 | 50448 |
| 20 | 48936 | 49872 | 50448 | 51024 | 51600 | 52176 | 52752 | 53328 | 53904 | 54480 |
| 21 | 52752 | 53904 | 54480 | 55056 | 55416 | 56056 | 56696 | 57336 | 57976 | 58616 |
| 22 | 56696 | 57336 | 58616 | 59256 | 59896 | 60536 | 61176 | 61664 | 62368 | 63072 |
| 23 | 60536 | 61176 | 62368 | 63072 | 63776 | 64480 | 65184 | 65888 | 66592 | 67296 |

TABLE 10-continued

Second transport block size table-6

| ITBS | 51 | 52 | 53 | 54 | 55 | 56 | 57 | 58 | 59 | 60 |
|---|---|---|---|---|---|---|---|---|---|---|
| 24 | | | | | | | | | | |

| | | | | | | | | | | |
|---|---|---|---|---|---|---|---|---|---|---|
| 24 | 64480 | 65184 | 65888 | 66592 | 67296 | 68040 | 68808 | 69576 | 70344 | 71880 |
| 25 | 67296 | 68040 | 68808 | 69576 | 70344 | 71112 | 71880 | 72648 | 73712 | 74544 |
| 26 | 69576 | 71112 | 71880 | 72648 | 73416 | 74544 | 75376 | 76208 | 77040 | 77872 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 0 | 2216 | 2216 | 2280 | 2344 | 2344 | 2408 | 2408 | 2472 | 2472 | 2536 |
| 1 | 2920 | 2920 | 2984 | 3048 | 3112 | 3112 | 3176 | 3240 | 3304 | 3304 |
| 2 | 3560 | 3624 | 3688 | 3752 | 3816 | 3880 | 3944 | 3944 | 4008 | 4072 |
| 3 | 4648 | 4712 | 4776 | 4840 | 4968 | 5032 | 5096 | 5160 | 5224 | 5352 |
| 4 | 5672 | 5800 | 5864 | 5992 | 6056 | 6120 | 6200 | 6328 | 6456 | 6456 |
| 5 | 6968 | 7096 | 7224 | 7352 | 7480 | 7608 | 7608 | 7736 | 7864 | 7992 |
| 6 | 8248 | 8376 | 8504 | 8632 | 8760 | 9016 | 9144 | 9272 | 9400 | 9528 |
| 7 | 9656 | 9912 | 10040 | 10168 | 10296 | 10552 | 10680 | 10808 | 10936 | 11192 |
| 8 | 11064 | 11320 | 11448 | 11704 | 11832 | 12088 | 12216 | 12384 | 12576 | 12768 |
| 9 | 12576 | 12768 | 12960 | 13152 | 13344 | 13536 | 13728 | 13920 | 14112 | 14304 |
| 10 | 13920 | 14112 | 14496 | 14688 | 14880 | 15072 | 15264 | 15648 | 15840 | 16032 |
| 11 | 16032 | 16224 | 16608 | 16800 | 17184 | 17376 | 17568 | 17952 | 18144 | 18336 |
| 12 | 18144 | 18336 | 18568 | 19080 | 19336 | 19592 | 19848 | 20104 | 20360 | 20872 |
| 13 | 20360 | 20872 | 21128 | 21384 | 21896 | 22152 | 22408 | 22920 | 23176 | 23432 |
| 14 | 22664 | 23176 | 23432 | 23944 | 24200 | 24496 | 25136 | 25456 | 25776 | 26096 |
| 15 | 24456 | 24816 | 25136 | 25456 | 25776 | 26416 | 26736 | 27056 | 27376 | 28016 |
| 16 | 25776 | 26416 | 26736 | 27056 | 27696 | 28016 | 28336 | 28976 | 29296 | 29616 |
| 17 | 28656 | 29296 | 29616 | 30256 | 30576 | 30936 | 31320 | 32088 | 32472 | 32856 |
| 18 | 31320 | 32088 | 32472 | 32856 | 33624 | 34008 | 34392 | 35160 | 35544 | 35928 |
| 19 | 34008 | 34776 | 35160 | 35928 | 36312 | 36992 | 37440 | 37888 | 38784 | 39232 |
| 20 | 36992 | 37440 | 38336 | 38784 | 39232 | 40128 | 40576 | 41024 | 41920 | 42368 |
| 21 | 39680 | 40576 | 41024 | 41920 | 42368 | 43304 | 43816 | 44328 | 45352 | 45864 |
| 22 | 42816 | 43304 | 44328 | 44840 | 45864 | 46376 | 46888 | 47912 | 48424 | 49296 |
| 23 | 45864 | 46376 | 46888 | 47912 | 48424 | 49296 | 49872 | 51024 | 51600 | 52176 |
| 24 | 48424 | 49296 | 49872 | 51024 | 51600 | 52176 | 53328 | 53904 | 55056 | 55416 |
| 25 | 50448 | 51600 | 52176 | 52752 | 53904 | 54480 | 55416 | 56056 | 57336 | 57976 |
| 26 | 52752 | 53328 | 54480 | 55056 | 56056 | 56696 | 57976 | 58616 | 59256 | 60536 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 0 | 2600 | 2600 | 2664 | 2664 | 2728 | 2728 | 2792 | 2856 | 2856 | 2920 |
| 1 | 3368 | 3432 | 3496 | 3496 | 3560 | 3624 | 3688 | 3688 | 3752 | 3816 |
| 2 | 4136 | 4200 | 4264 | 4328 | 4392 | 4456 | 4520 | 4584 | 4648 | 4712 |
| 3 | 5416 | 5480 | 5544 | 5608 | 5736 | 5800 | 5864 | 5928 | 5992 | 6120 |
| 4 | 6584 | 6712 | 6840 | 6840 | 6968 | 7096 | 7096 | 7224 | 7352 | 7480 |
| 5 | 8120 | 8248 | 8376 | 8504 | 8632 | 8760 | 8760 | 8888 | 9016 | 9144 |
| 6 | 9656 | 9784 | 9912 | 10040 | 10168 | 10296 | 10424 | 10552 | 10680 | 10936 |
| 7 | 11320 | 11448 | 11576 | 11832 | 11960 | 12088 | 12216 | 12384 | 12576 | 12768 |
| 8 | 12960 | 13152 | 13344 | 13536 | 13728 | 13920 | 14112 | 14304 | 14304 | 14496 |
| 9 | 14688 | 14880 | 15072 | 15264 | 15456 | 15648 | 15840 | 16032 | 16224 | 16416 |
| 10 | 16224 | 16416 | 16800 | 16992 | 17184 | 17376 | 17568 | 17952 | 18144 | 18336 |
| 11 | 18568 | 18824 | 19080 | 19336 | 19592 | 20104 | 20360 | 20616 | 20872 | 21128 |
| 12 | 21128 | 21384 | 21640 | 21896 | 22152 | 22664 | 22920 | 23176 | 23432 | 23688 |
| 13 | 23688 | 24200 | 24456 | 24816 | 25136 | 25456 | 25776 | 26096 | 26416 | 26736 |
| 14 | 26416 | 26736 | 27376 | 27696 | 28016 | 28336 | 28656 | 29296 | 29616 | 29936 |
| 15 | 28336 | 28656 | 28976 | 29616 | 29936 | 30256 | 30576 | 30936 | 31320 | 32088 |
| 16 | 30256 | 30576 | 30936 | 31320 | 31704 | 32088 | 32472 | 33240 | 33624 | 34008 |
| 17 | 33240 | 34008 | 34392 | 34776 | 35160 | 35928 | 36312 | 36696 | 36992 | 37440 |
| 18 | 36696 | 36992 | 37440 | 38336 | 38784 | 39232 | 39680 | 40128 | 40576 | 41472 |
| 19 | 39680 | 40128 | 41024 | 41472 | 41920 | 42816 | 43304 | 43816 | 44328 | 44840 |
| 20 | 42816 | 43816 | 44328 | 44840 | 45352 | 45864 | 46888 | 47400 | 47912 | 48424 |
| 21 | 46376 | 46888 | 47912 | 48424 | 48936 | 49872 | 50448 | 51024 | 51600 | 52176 |
| 22 | 49872 | 50448 | 51024 | 52176 | 52752 | 53328 | 53904 | 55056 | 55416 | 56056 |
| 23 | 53328 | 53904 | 54480 | 55416 | 56056 | 56696 | 57336 | 58616 | 59256 | 59896 |
| 24 | 56696 | 57336 | 57976 | 58616 | 59896 | 60536 | 61176 | 61664 | 63072 | 63776 |
| 25 | 58616 | 59896 | 60536 | 61176 | 62368 | 63072 | 63776 | 64480 | 65184 | 66592 |
| 26 | 61176 | 62368 | 63072 | 63776 | 64480 | 65888 | 66592 | 67296 | 68040 | 68808 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 0 | 2920 | 2984 | 2984 | 3048 | 3112 | 3112 | 3176 | 3176 | 3240 | 3240 |
| 1 | 3880 | 3880 | 3944 | 4008 | 4072 | 4072 | 4136 | 4200 | 4264 | 4264 |
| 2 | 4712 | 4776 | 4840 | 4904 | 4968 | 5032 | 5096 | 5160 | 5224 | 5288 |
| 3 | 6120 | 6200 | 6328 | 6328 | 6456 | 6456 | 6584 | 6712 | 6712 | 6840 |
| 4 | 7480 | 7608 | 7736 | 7864 | 7864 | 7992 | 8120 | 8248 | 8248 | 8376 |
| 5 | 9272 | 9400 | 9528 | 9656 | 9784 | 9912 | 9912 | 10040 | 10168 | 10296 |

TABLE 10-continued

Second transport block size table-6

| ITBS | | | | | | | | | | |
|---|---|---|---|---|---|---|---|---|---|---|
| 6 | 11064 | 11192 | 11320 | 11448 | 11576 | 11704 | 11832 | 11960 | 12088 | 12216 |
| 7 | 12960 | 12960 | 13152 | 13344 | 13536 | 13728 | 13920 | 13920 | 14112 | 14304 |
| 8 | 14688 | 14880 | 15072 | 15264 | 15456 | 15648 | 15840 | 16032 | 16224 | 16416 |
| 9 | 16608 | 16800 | 16992 | 17376 | 17568 | 17760 | 17952 | 18144 | 18336 | 18568 |
| 10 | 18568 | 18824 | 19080 | 19336 | 19336 | 19592 | 19848 | 20104 | 20360 | 20616 |
| 11 | 21384 | 21640 | 21896 | 22152 | 22408 | 22664 | 22920 | 23176 | 23432 | 23688 |
| 12 | 23944 | 24456 | 24496 | 24816 | 25136 | 25456 | 25776 | 26096 | 26416 | 26736 |
| 13 | 27056 | 27376 | 27696 | 28016 | 28656 | 28976 | 29296 | 29616 | 29936 | 30256 |
| 14 | 30256 | 30576 | 30936 | 31320 | 31704 | 32088 | 32472 | 32856 | 33240 | 33624 |
| 15 | 32472 | 32856 | 33240 | 33624 | 34008 | 34392 | 34776 | 35160 | 35544 | 35928 |
| 16 | 34392 | 34776 | 35160 | 35544 | 35928 | 36312 | 36992 | 37440 | 37888 | 38336 |
| 17 | 37888 | 38784 | 39232 | 39680 | 40128 | 40576 | 41024 | 41472 | 41920 | 42368 |
| 18 | 41920 | 42368 | 42816 | 43304 | 43816 | 44328 | 44840 | 45352 | 45864 | 46376 |
| 19 | 45352 | 45864 | 46376 | 46888 | 47400 | 48424 | 48936 | 49296 | 49872 | 50448 |
| 20 | 48936 | 49872 | 50448 | 51024 | 51600 | 52176 | 52752 | 53328 | 53904 | 54480 |
| 21 | 52752 | 53904 | 54480 | 55056 | 55416 | 56056 | 56696 | 57336 | 57976 | 58616 |
| 22 | 56696 | 57336 | 58616 | 59256 | 59896 | 60536 | 61176 | 61664 | 62368 | 63072 |
| 23 | 60536 | 61176 | 62368 | 63072 | 63776 | 64480 | 65184 | 65888 | 66592 | 67296 |
| 24 | 64480 | 65184 | 65888 | 66592 | 67296 | 68040 | 68808 | 69576 | 70344 | 71880 |
| 25 | 67296 | 68040 | 68808 | 69576 | 70344 | 71112 | 71880 | 72648 | 73712 | 74544 |
| 26 | 69576 | 71112 | 71880 | 72648 | 73416 | 74544 | 75376 | 76208 | 77040 | 77872 |

| | NPRB | | | | | | | | | |
|---|---|---|---|---|---|---|---|---|---|---|
| ITBS | 91 | 92 | 93 | 94 | 95 | 96 | 97 | 98 | 99 | 100 |
| 0 | 3304 | 3368 | 3368 | 3432 | 3432 | 3496 | 3496 | 3560 | 3624 | 3624 |
| 1 | 4328 | 4392 | 4456 | 4456 | 4520 | 4584 | 4584 | 4648 | 4712 | 4776 |
| 2 | 5352 | 5416 | 5416 | 5480 | 5544 | 5608 | 5672 | 5736 | 5800 | 5864 |
| 3 | 6840 | 6968 | 7096 | 7096 | 7224 | 7224 | 7352 | 7480 | 7480 | 7608 |
| 4 | 8504 | 8504 | 8632 | 8760 | 8888 | 8888 | 9016 | 9144 | 9272 | 9272 |
| 5 | 10424 | 10552 | 10680 | 10808 | 10936 | 11064 | 11192 | 11192 | 11320 | 11448 |
| 6 | 12384 | 12576 | 12576 | 12768 | 12960 | 12960 | 13152 | 13344 | 13536 | 13536 |
| 7 | 14496 | 14688 | 14880 | 14880 | 15072 | 15264 | 15456 | 15648 | 15840 | 15840 |
| 8 | 16608 | 16800 | 16992 | 17184 | 17376 | 17568 | 17760 | 17952 | 18144 | 18336 |
| 9 | 18824 | 18824 | 19080 | 19336 | 19592 | 19848 | 19848 | 20104 | 20360 | 20616 |
| 10 | 20872 | 21128 | 21384 | 21640 | 21640 | 21896 | 22152 | 22408 | 22664 | 22920 |
| 11 | 23944 | 24200 | 24456 | 24816 | 25136 | 25136 | 25456 | 25776 | 26096 | 26416 |
| 12 | 27056 | 27376 | 27696 | 28016 | 28336 | 28656 | 28976 | 28976 | 29296 | 29616 |
| 13 | 30576 | 30936 | 31320 | 31320 | 31704 | 32088 | 32472 | 32856 | 33240 | 33624 |
| 14 | 34008 | 34392 | 34776 | 35160 | 35544 | 35928 | 36312 | 36696 | 36992 | 37440 |
| 15 | 36312 | 36696 | 36992 | 37440 | 37888 | 38336 | 38784 | 39232 | 39680 | 40128 |
| 16 | 38784 | 38784 | 39232 | 39680 | 40128 | 40576 | 41024 | 41472 | 41920 | 42368 |
| 17 | 42816 | 43304 | 43816 | 44328 | 44840 | 45352 | 45864 | 45864 | 46376 | 46888 |
| 18 | 46888 | 47400 | 47912 | 48424 | 48936 | 49296 | 49872 | 50448 | 51024 | 51600 |
| 19 | 51024 | 51600 | 52176 | 52752 | 53328 | 53904 | 54480 | 55056 | 55416 | 56056 |
| 20 | 55056 | 56056 | 56056 | 56696 | 57336 | 57976 | 58616 | 59256 | 59896 | 60536 |
| 21 | 59256 | 59896 | 60536 | 61664 | 62368 | 63072 | 63776 | 63776 | 64480 | 65184 |
| 22 | 63776 | 64480 | 65184 | 65888 | 66592 | 67296 | 68040 | 68808 | 69576 | 70344 |
| 23 | 68040 | 68808 | 69576 | 70344 | 71112 | 71880 | 72648 | 73416 | 73712 | 74544 |
| 24 | 72648 | 73416 | 73712 | 74544 | 75376 | 76208 | 77040 | 77872 | 78704 | 79536 |
| 25 | 75376 | 76208 | 77040 | 77872 | 78704 | 79536 | 80280 | 81176 | 82072 | 82968 |
| 26 | 78704 | 79536 | 80280 | 81176 | 82072 | 82968 | 83864 | 84760 | 85656 | 86016 |

| | NPRB | | | | | | | | | |
|---|---|---|---|---|---|---|---|---|---|---|
| ITBS | 101 | 102 | 103 | 104 | 105 | 106 | 107 | 108 | 109 | 110 |
| 0 | 3688 | 3688 | 3752 | 3752 | 3816 | 3880 | 3880 | 3944 | 3944 | 4008 |
| 1 | 4776 | 4840 | 4904 | 4968 | 4968 | 5032 | 5096 | 5160 | 5160 | 5224 |
| 2 | 5928 | 5992 | 6056 | 6120 | 6120 | 6200 | 6200 | 6328 | 6328 | 6456 |
| 3 | 7608 | 7736 | 7864 | 7864 | 7992 | 7992 | 8120 | 8248 | 8248 | 8376 |
| 4 | 9400 | 9528 | 9656 | 9656 | 9784 | 9912 | 9912 | 10040 | 10168 | 10296 |
| 5 | 11576 | 11704 | 11832 | 11960 | 12088 | 12216 | 12216 | 12384 | 12576 | 12576 |
| 6 | 13728 | 13920 | 13920 | 14112 | 14304 | 14496 | 14496 | 14688 | 14880 | 14880 |
| 7 | 16032 | 16224 | 16416 | 16608 | 16800 | 16800 | 16992 | 17184 | 17376 | 17568 |
| 8 | 18336 | 18568 | 18824 | 19080 | 19080 | 19336 | 19592 | 19592 | 19848 | 20104 |
| 9 | 20872 | 20872 | 21128 | 21384 | 21640 | 21896 | 21896 | 22152 | 22408 | 22664 |
| 10 | 23176 | 23432 | 23688 | 23944 | 23944 | 24200 | 24496 | 24816 | 24816 | 25136 |
| 11 | 26416 | 26736 | 27056 | 27376 | 27696 | 28016 | 28016 | 28336 | 28656 | 28976 |
| 12 | 29936 | 30256 | 30576 | 30936 | 31320 | 31320 | 31704 | 32088 | 32472 | 32856 |
| 13 | 34008 | 34392 | 34392 | 34776 | 35160 | 35544 | 35928 | 36312 | 36696 | 36992 |
| 14 | 37888 | 37888 | 38336 | 38784 | 39232 | 39680 | 40128 | 40128 | 40576 | 41024 |
| 15 | 40128 | 40576 | 41024 | 41472 | 41920 | 42368 | 42816 | 43304 | 43304 | 43816 |
| 16 | 42816 | 43304 | 43816 | 44328 | 44328 | 44840 | 45352 | 45864 | 46376 | 46888 |
| 17 | 47400 | 47912 | 48424 | 48936 | 49296 | 49872 | 50448 | 51024 | 51024 | 51600 |
| 18 | 52176 | 52752 | 53328 | 53904 | 53904 | 54480 | 55056 | 55416 | 56056 | 56696 |
| 19 | 56696 | 57336 | 57976 | 58616 | 58616 | 59256 | 59896 | 60536 | 61176 | 61664 |

TABLE 10-continued

| Second transport block size table-6 | | | | | | | | | |
|---|---|---|---|---|---|---|---|---|---|
| 20 | 61176 | 61664 | 62368 | 63072 | 63776 | 64480 | 65184 | 65184 | 65888 66592 |
| 21 | 65888 | 66592 | 67296 | 68040 | 68808 | 69576 | 70344 | 70344 | 71112 71880 |
| 22 | 71112 | 71880 | 72648 | 73416 | 73712 | 74544 | 75376 | 76208 | 76208 77040 |
| 23 | 75376 | 76208 | 77040 | 77872 | 78704 | 79536 | 80280 | 81176 | 81176 82072 |
| 24 | 80280 | 81176 | 82072 | 82968 | 83864 | 83864 | 84760 | 85656 | 86976 86976 |
| 25 | 83864 | 84760 | 85656 | 86016 | 86976 | 87936 | 88896 | 89856 | 89856 90816 |
| 26 | 86976 | 87936 | 88896 | 89856 | 90816 | 91776 | 92776 | 92776 | 93800 94824 |

Further, the foregoing Table 9 and Table 10 may be optimized to form optimized second transport block size tables 9-1 and 10-1, so that coding rates corresponding to all TBSs included in a maximum modulation and coding scheme level in the optimized second transport block size tables are equal to a set coding rate, where the set coding rate, for example, may be 0.93.

TABLE 9-1

Optimized second transport block size table-5

| | NPRB | | | | | | | | | |
|---|---|---|---|---|---|---|---|---|---|---|
| ITBS | 1 | 2 | 3 | 4 | 5 | 6 | 7 | 8 | 9 | 10 |
| 26 | 864 | 1728 | 2560 | 3456 | 4352 | 5184 | 6080 | 6912 | 7808 | 8704 |

| | NPRB | | | | | | | | | |
|---|---|---|---|---|---|---|---|---|---|---|
| ITBS | 11 | 12 | 13 | 14 | 15 | 16 | 17 | 18 | 19 | 20 |
| 26 | 9472 | 10368 | 11264 | 12160 | 13056 | 13824 | 14784 | 15552 | 16512 | 17280 |

| | NPRB | | | | | | | | | |
|---|---|---|---|---|---|---|---|---|---|---|
| ITBS | 21 | 22 | 23 | 24 | 25 | 26 | 27 | 28 | 29 | 30 |
| 26 | 18240 | 18944 | 19968 | 20736 | 21760 | 22528 | 23296 | 24320 | 24960 | 25920 |

| | NPRB | | | | | | | | | |
|---|---|---|---|---|---|---|---|---|---|---|
| ITBS | 31 | 32 | 33 | 34 | 35 | 36 | 37 | 38 | 39 | 40 |
| 26 | 26880 | 27840 | 28480 | 29440 | 30400 | 31104 | 31872 | 33024 | 33792 | 34560 |

| | NPRB | | | | | | | | | |
|---|---|---|---|---|---|---|---|---|---|---|
| ITBS | 41 | 42 | 43 | 44 | 45 | 46 | 47 | 48 | 49 | 50 |
| 26 | 35328 | 36480 | 37184 | 38080 | 38976 | 39872 | 40768 | 41664 | 42560 | 43520 |

| | NPRB | | | | | | | | | |
|---|---|---|---|---|---|---|---|---|---|---|
| ITBS | 51 | 52 | 53 | 54 | 55 | 56 | 57 | 58 | 59 | 60 |
| 26 | 44032 | 45056 | 46080 | 46592 | 47616 | 48640 | 49536 | 50112 | 51264 | 51840 |

| | NPRB | | | | | | | | | |
|---|---|---|---|---|---|---|---|---|---|---|
| ITBS | 61 | 62 | 63 | 64 | 65 | 66 | 67 | 68 | 69 | 70 |
| 26 | 52992 | 53568 | 54720 | 55296 | 56320 | 56960 | 58240 | 58880 | 59520 | 60800 |

| | NPRB | | | | | | | | | |
|---|---|---|---|---|---|---|---|---|---|---|
| ITBS | 71 | 72 | 73 | 74 | 75 | 76 | 77 | 78 | 79 | 80 |
| 26 | 61440 | 62656 | 63360 | 64064 | 64768 | 65472 | 66880 | 67584 | 68352 | 69120 |

| | NPRB | | | | | | | | | |
|---|---|---|---|---|---|---|---|---|---|---|
| ITBS | 81 | 82 | 83 | 84 | 85 | 86 | 87 | 88 | 89 | 90 |
| 26 | 69888 | 70656 | 72192 | 72960 | 73728 | 74048 | 75712 | 76544 | 77376 | 78208 |

TABLE 9-1-continued

Optimized second transport block size table-5

| ITBS | NPRB | | | | | | | | | |
|---|---|---|---|---|---|---|---|---|---|---|
| | 91 | 92 | 93 | 94 | 95 | 96 | 97 | 98 | 99 | 100 |
| 26 | 79040 | 79872 | 80640 | 81536 | 82432 | 83328 | 84224 | 85120 | 86016 | 86400 |

| ITBS | NPRB | | | | | | | | | |
|---|---|---|---|---|---|---|---|---|---|---|
| | 101 | 102 | 103 | 104 | 105 | 106 | 107 | 108 | 109 | 110 |
| 26 | 87360 | 88320 | 89280 | 90240 | 91200 | 92160 | 92160 | 93184 | 94208 | 95232 |

TABLE 10-1

Optimized second transport block size table-6

| ITBS | NPRB | | | | | | | | | |
|---|---|---|---|---|---|---|---|---|---|---|
| | 1 | 2 | 3 | 4 | 5 | 6 | 7 | 8 | 9 | 10 |
| 26 | 840 | 1704 | 2536 | 3432 | 4328 | 5160 | 6056 | 6840 | 7736 | 8632 |

| ITBS | NPRB | | | | | | | | | |
|---|---|---|---|---|---|---|---|---|---|---|
| | 11 | 12 | 13 | 14 | 15 | 16 | 17 | 18 | 19 | 20 |
| 26 | 9400 | 10296 | 11192 | 12088 | 12960 | 13728 | 14688 | 15456 | 16416 | 17184 |

| ITBS | NPRB | | | | | | | | | |
|---|---|---|---|---|---|---|---|---|---|---|
| | 21 | 22 | 23 | 24 | 25 | 26 | 27 | 28 | 29 | 30 |
| 26 | 18144 | 18824 | 19848 | 20616 | 21640 | 22408 | 23176 | 24200 | 24816 | 25776 |

| ITBS | NPRB | | | | | | | | | |
|---|---|---|---|---|---|---|---|---|---|---|
| | 31 | 32 | 33 | 34 | 35 | 36 | 37 | 38 | 39 | 40 |
| 26 | 26736 | 27696 | 28336 | 29296 | 30256 | 30936 | 31704 | 32856 | 33624 | 34392 |

| ITBS | NPRB | | | | | | | | | |
|---|---|---|---|---|---|---|---|---|---|---|
| | 41 | 42 | 43 | 44 | 45 | 46 | 47 | 48 | 49 | 50 |
| 26 | 35160 | 36312 | 36992 | 37888 | 38784 | 39680 | 40576 | 41472 | 42368 | 43304 |

| ITBS | NPRB | | | | | | | | | |
|---|---|---|---|---|---|---|---|---|---|---|
| | 51 | 52 | 53 | 54 | 55 | 56 | 57 | 58 | 59 | 60 |
| 26 | 43816 | 44840 | 45864 | 46376 | 47400 | 48424 | 49296 | 49872 | 51024 | 51600 |

| ITBS | NPRB | | | | | | | | | |
|---|---|---|---|---|---|---|---|---|---|---|
| | 61 | 62 | 63 | 64 | 65 | 66 | 67 | 68 | 69 | 70 |
| 26 | 52752 | 53328 | 54480 | 55056 | 56056 | 56696 | 57976 | 58616 | 59256 | 60536 |

| ITBS | NPRB | | | | | | | | | |
|---|---|---|---|---|---|---|---|---|---|---|
| | 71 | 72 | 73 | 74 | 75 | 76 | 77 | 78 | 79 | 80 |
| 26 | 61176 | 62368 | 63072 | 63776 | 64480 | 65184 | 66592 | 67296 | 68040 | 68808 |

| ITBS | NPRB | | | | | | | | | |
|---|---|---|---|---|---|---|---|---|---|---|
| | 81 | 82 | 83 | 84 | 85 | 86 | 87 | 88 | 89 | 90 |
| 26 | 69576 | 70344 | 71880 | 72648 | 73416 | 73712 | 75376 | 76208 | 77040 | 77872 |

TABLE 10-1-continued

Optimized second transport block size table-6

| ITBS | NPRB | | | | | | | | | |
|---|---|---|---|---|---|---|---|---|---|---|
| | 91 | 92 | 93 | 94 | 95 | 96 | 97 | 98 | 99 | 100 |
| 26 | 78704 | 79536 | 80280 | 81176 | 82072 | 82968 | 83864 | 84760 | 85656 | 86016 |

| ITBS | NPRB | | | | | | | | | |
|---|---|---|---|---|---|---|---|---|---|---|
| | 101 | 102 | 103 | 104 | 105 | 106 | 107 | 108 | 109 | 110 |
| 26 | 86976 | 87936 | 88896 | 89856 | 90816 | 91776 | 91776 | 92776 | 93800 | 94824 |

Figure 2:
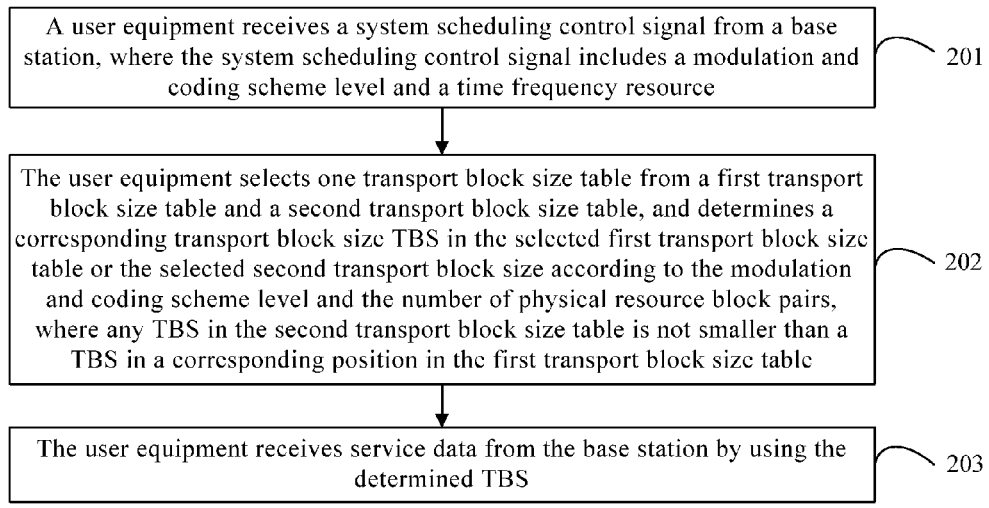
FIG. 2 is a flowchart of a second embodiment of a data transmission method according to the present invention.

FIG. 2 is a flowchart of a second embodiment of a data transmission method of the present invention. As shown in FIG. 2, the data transmission method of this embodiment includes the following:

201. A user equipment receives a system scheduling control signal from a base station, where the system scheduling control signal includes a modulation and coding scheme level and a time-frequency resource.

202. The user equipment selects one transport block size table from a first transport block size table and a second transport block size table, and determines a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table.

The UE selects one transport block size table from the first transport block size table and the second transport block size table to determine a TBS. The UE may firstly determine, according to the MCS level included in the received scheduling control signal, a modulation order index value and a TBS index value corresponding to the MCS level in a transport block size index table (Modulation and TBS index table for PDSCH); secondly, the UE determines, in the first transport block size table or the second transport block size table selected for determining the TBS, a TBS value corresponding to the determined TBS index value and the time-frequency resource included in the scheduling control signal.

A TBS value in the second transport block size table is compared with a TBS value in the same position in the first transport block size table, and the TBS value in the second transport block size table is not smaller than the TBS value in the first transport block size table.

Alternatively, a TBS value in the second transport block size table is compared with a TBS value in the same position in the first transport block size table, and the TBS value in the second transport block size table may also be smaller than the TBS value in the first transport block size table. In this case, the second transport block size table may be applied in a scenario in which a system overhead is greater than a system overhead of a LTE REL.8 system, so that when the UE receives service data according to the TBS value in the second transport block size table, a coding rate is reduced to be closer to a desired coding rate of the system.

203. The user equipment receives the service data from the base station using the determined TBS.

The UE receives the service data from the base station using the TBS determined in the first transport block size table or the second transport block size table and corresponding to the modulation and coding scheme level and the time-frequency included in the system scheduling control signal.

In the data transmission method of this embodiment, a user equipment receives a system scheduling control signal from a base station, where the system scheduling control signal includes a modulation and coding scheme level and a time-frequency resource; the user equipment selects one transport block size table from a first transport block size table and a second transport block size table, and determines a corresponding transport block size TBS in the selected first transport block size table or the selected second transport block size table according to the modulation and coding scheme level and the number of physical resource block pairs, where any TBS in the second transport block size table is not smaller than a TBS in a corresponding position in the first transport block size table; and the user equipment receives the service data from the base station using the determined TBS. In this way, the UE implements selection of a transport block size table, so that a coding rate is increased when the UE receives the service data according to the TBS in the selected second transport block size table.

Optionally, coding rates corresponding to all TBSs included in a maximum modulation and coding scheme level in the first transport block size table are equal to a set coding rate; and/or, coding rates corresponding to all TBSs included in a maximum modulation and coding scheme level in the second transport block size table are equal to the set coding rate.

The first transport block size table may include a layer-1 data transport block size table in LTE REL.8, where the layer-1 data transport block size table in LTE REL.8 is shown in Table 1 in the foregoing embodiment. For details, reference may be made to Table 1, which is not further described herein.

In the first transport block size table, $N_{PRB}$ represents the number of physical resource block pairs, $I_{TBS}$ represents a TBS index value, and an element in the table represents a transport block size TBS.

A TBS included in the maximum modulation and coding scheme level in the first transport block size table may further be a TBS corresponding to the set coding rate, and all TBSs corresponding to the set coding rate may be included in all TBSs corresponding to $I_{TBS}$ of 0 to 25 in the foregoing Table 1, as shown in Table 2-1. For details, reference may be made to Table 2-1, which is not further described herein; or TBSs corresponding to the set coding rate may further be included in all TBSs corresponding to $I_{TBS}$ of 0 to 25 in the foregoing Table 1 or be included in a layer-2 data transport block size table, as shown in Table 2-2. For details, reference may be made to Table 2-2, which is not further described herein; or, none of TBSs corresponding to the set coding rate or some of TBSs corresponding to the set coding rate may further be included in all TBSs corresponding to $I_{TBS}$ of 0 to 25 in the foregoing Table 1 or be included in the layer-2 data transport block size table, as shown in Table 2-2. For details, reference may be made to Table 2-3, which is not further described herein.

In an LTE REL.8 system with a system overhead of 48 resource elements, a coding rate for performing coding on the service data using a TBS in the foregoing Table 2-1, Table 2-2, and Table 2-3 may be an effective coding rate, where the effective coding rate, for example, may be 0.93.

A TBS included in the maximum modulation and coding scheme level in the second transport block size table may further be a TBS corresponding to a set coding rate, where the set coding rate, for example, may be 0.93, so that in an LTE REL.12 system with a system overhead of 12 resource elements, a coding rate corresponding to a TBS included in the maximum modulation and coding scheme level in the second transport block size table is an effective coding rate. In other embodiments, when a requirement of the system for a bit error rate is changed or in other cases, the set coding rate may further be another value, which is not limited herein.

Further, the selecting, by the user equipment, one transport block size table from the first transport block size table and the second transport block size table may include selecting, by the user equipment, one transport block size table from the first transport block size table and the second transport block size table according to a system configuration parameter or a system overhead.

When the UE selects one transport block size table from the first transport block size table and the second transport block size table, the UE may select the first transport block size table or the second transport block size table according to the system configuration parameter, further select a TBS in the first transport block size table or the second transport block size table, perform coding on the service data according to the TBS, and transmit the coded service data to the UE.

For example, when the system configuration parameter indicates that control signaling includes a physical downlink control channel, the UE selects the first transport block size table, so that a coding rate when the UE receives the service data according to the TBS in the first transport block size table is closer to a desired coding rate, where the desired coding rate may be a coding rate corresponding to the determined modulation and coding scheme level and the determined number of physical resource block pairs in LTE REL.8, or the desired target coding rate may also be an optimized coding rate of the coding rate corresponding to the determined modulation and coding scheme level in LTE REL.8, where the optimized coding rate of the coding rate corresponding to the modulation and coding scheme level in LTE REL.8 is shown in Table 3 in the foregoing embodiment. For details, reference may be made to Table 3, which is not further described herein.

When the system configuration parameter indicates that the control signaling does not include a physical downlink control channel, the UE selects the second transport block size table, so that when the UE receives the service data using the TBS in the second transport block size table, the corresponding coding rate is closer to the desired coding rate.

The UE may further select the first transport block size table or the second transport block size table according to the system overhead. For example, when the system overhead is 48 resource elements, the UE selects the first transport block size table; and when the system overhead is 12 resource elements, the UE selects the second transport block size table.

Optionally, the UE receives a higher-layer signaling message from the base station, where the higher-layer signaling message carries instruction information that instructs selection of the first transport block size table or the second transport block size table.

The UE can select a transport block size table according to the higher-layer signaling message sent by the base station. For example, the base station instructs the UE to receive the service data using the TBS in the second transport block size table so as to use the same transport block size table as the base station. Then the UE selects the corresponding TBS in the second transport block size table to receive the service data sent by the base station.

Optionally, the UE receives a downlink control message from the base station, where the downlink control message carries instruction information that instructs selection of the first transport block size table or the second transport block size table, which may increase a speed of the UE in switching between different selections.

Optionally, all TBSs in the second transport block size table may be included in TBSs in the first transport block size table. The second transport block size table may be shown in Table 4 in the foregoing embodiment. For details, reference may be made to Table 4, which is not further described herein.

Still further, on the basis of the foregoing embodiment, any TBS in the second transport block size table may be a TBS in the first transport block size table, corresponding to a coding rate closest to the target coding rate.

When a TBS is determined in the second transport block size table shown in Table 4, the determined TBS value is a TBS in the first transport block size table, and a coding rate corresponding to the determined TBS value in the LTE REL.12 system with the system overhead of 12 REs is closer to the target coding rate than coding rates corresponding to other TBSs in the first transport block size table in the LTE REL.12 system with the system overhead of 12 REs, where the target coding rate may be a coding rate corresponding to the modulation and coding scheme level and the number of physical resource block pairs in LTE REL.8.

Alternatively, the second transport block size table may further be shown in Table 5 in the foregoing embodiment. For details, reference may be made to Table 5, which is not further described herein.

Further, the foregoing Table 4 and Table 5 may be optimized to form optimized second transport block size tables 4-1 and 5-1, so that coding rates corresponding to all TBSs included in a maximum modulation and coding scheme level in the optimized second transport block size tables are equal to a set coding rate, where the set coding rate, for example, may be 0.93. The optimized second transport block size tables 4-1 and 5-1 may be shown in Table 4-1 and Table 5-1 in the foregoing embodiment. For details, reference may be made to Table 4-1 and Table 5-1, which are not further described herein.

Optionally, some TBSs in the second transport block size table may be included in TBSs in the first transport block size table and some TBSs in the second transport block size table may be included in a set layer-2 data transport block size table. The second transport block size table may be shown in Table 6 in the foregoing embodiment. For details, reference may be made to Table 6, which is not further described herein.

Still further, on the basis of the foregoing embodiment, any TBS in the second transport block size table may be a TBS in the first transport block size table and the set layer-2 data transport block size table, corresponding to a coding rate closest to the target coding rate.

When a TBS is determined in the second transport block size table in Table 6, the determined TBS value is a TBS in the first transport block size table or the layer-2 data transport block size table, and a coding rate corresponding to the determined TBS value in the LTE REL.12 system with the system overhead of 12 REs is closer to the target coding rate than coding rates corresponding to other TBSs in the first transport block size table or the layer-2 data transport block size table in the LTE REL.12 system with the system overhead of 12 REs, where the target coding rate may be the coding rate corresponding to the modulation and coding scheme level and the number of physical resource block pairs in LTE REL.8.

Alternatively, the second transport block size table may be shown in Table 8 in the foregoing embodiment. For details, reference may be made to Table 8, which is not further described herein.

For all TBS values included in Table 8, some may be included in the layer-1 data transport block size table in LTE REL.8 shown in Table 1, and others may be included in the set layer-2 data transport block size table.

When a TBS is determined in the second transport block size table in Table 8, the determined TBS value is a TBS in the first transport block size table or the layer-2 data transport block size table, and a coding rate corresponding to the determined TBS value in the LTE REL.12 system with the system overhead of 12 REs is closer to the target coding rate than coding rates corresponding to other TBSs in the first transport block size table or the layer-2 data transport block size table in the LTE REL.12 system with the system overhead of 12 REs, where the target coding rate may be the optimized coding rate of the coding rate corresponding to the modulation and coding scheme level in LTE REL.8 shown in Table 3.

Further, the foregoing Table 6 and Table 8 may be optimized to form optimized second transport block size tables 6-1 and 8-1, so that coding rates corresponding to all TBSs included in a maximum modulation and coding scheme level in the optimized second transport block size tables are equal to a set coding rate, where the set coding rate, for example, may be 0.93. The optimized second transport block size tables 6-1 and 8-1 may be shown in Table 6-1 and Table 8-1 in the foregoing embodiment. For details, reference may be made to Table 6-1 and Table 8-1, which are not further described herein.

Optionally, all TBSs in the second transport block size table may be formed by newly designed elements, where the newly designed elements may be included and may also be not included in the layer-1 data transport block size table in LTE REL.8 shown in Table 1, and may be included and may also be not included in the set layer-2 data transport block size table shown in Table 7. The second transport block size table may be shown in Table 9 in the foregoing embodiment. For details, reference may be made to Table 9, which is not further described herein.

Still further, on the basis of the foregoing embodiment, any TBS in the second transport block size table may be a TBS designed according to the target coding rate. The coding rate corresponding to the TBS in the second transport block size table in the LTE REL.12 system with the system overhead of 12 REs may be the target coding rate, where the target coding rate may be the coding rate corresponding to the modulation and coding scheme level and the number of physical resource block pairs in LTE REL.8.

Alternatively, the second transport block size table may be shown in Table 10. All TBSs included in Table 10 may be formed by newly designed elements, where the newly designed elements may be included and may also be not included in the layer-1 data transport block size table in LTE REL.8 shown in Table 1, and may be included and may also be not included in the set layer-2 data transport block size table shown in Table 7.

Still further, on the basis of the foregoing embodiment, any TBS in the second transport block size table may be a TBS designed according to the target coding rate. The coding rate corresponding to the TBS in the second transport block size table in the LTE REL.12 system with the system overhead of 12 REs is the target coding rate, where the target coding rate may be the optimized coding rate of the coding rate corresponding to the modulation and coding scheme level in LTE REL.8 shown in Table 3.

Further, the foregoing Table 9 and Table 10 may be optimized to form optimized second transport block size tables 9-1 and 10-1, so that coding rates corresponding to all TBSs included in a maximum modulation and coding scheme level in the optimized second transport block size tables are equal to a set coding rate, where the set coding rate, for example, may be 0.93.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program codes, such as a read-only memory (ROM), a random access memory RAM, a magnetic disk, or an optical disc.

Figure 3:
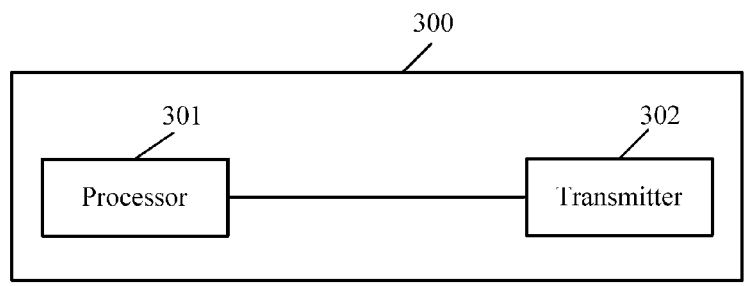
FIG. 3 is a schematic structural diagram of a first embodiment of a base station according to the present invention.

FIG. 3 is a schematic structural diagram of a first embodiment of a base station according to the present invention. As shown in FIG. 3, a base station 300 of this embodiment includes a processor 301 and a transmitter 302. The processor 301 may be configured to determine a modulation and coding scheme level, determine a time-frequency resource, and determine the number of physical resource block pairs according to the time-frequency resource; and may be further configured to select one transport block size table from a first transport block size table and a second transport block size table and determine a corresponding transport block size TBS in the selected first transport block size table or the selected second transport block size according to the modulation and coding scheme level and the number of physical resource block pairs, where any TBS in the second transport block size table is not smaller than a TBS in a corresponding position in the first transport block size table. The transmitter 302 may be configured to send service data to a user equipment using the determined TBS and may be further configured to send a system scheduling control signal to the user equipment, where the system scheduling control signal includes the modulation and coding scheme level and the time-frequency resource.

A base station of this embodiment determines, using a processor, a modulation and coding scheme level, determines a time-frequency resource, determines the number of physical resource block pairs according to the time-frequency resource, selects one transport block size table from a first transport block size table and a second transport block size table, and determines a corresponding transport block size TBS in the selected first transport block size table or the selected second transport block size table according to the modulation and coding scheme level and the number of physical resource block pairs, where any TBS in the second transport block size table is not smaller than a TBS in a corresponding position in the first transport block size table; and a transmitter sends service data to a UE using the determined TBS, and sends a system scheduling control signal to the UE, where the system scheduling control signal includes the modulation and coding scheme level and the time-frequency resource. In this way, the base station implements selection of a transport block size table, so that a coding rate may be increased when the base station transmits the service data to the UE according to the TBS in the selected second transport block size table.

Further, coding rates corresponding to all TBSs included in a maximum modulation and coding scheme level in the first transport block size table may be equal to a set coding rate; and/or, coding rates corresponding to all TBSs included in a maximum modulation and coding scheme level in the second transport block size table may be equal to the set coding rate.

Further, the processor 301 may be configured to select one transport block size table from the first transport block size table and the second transport block size according to a system configuration parameter or a system overhead.

Further, the transmitter 302 may be configured to send a higher-layer signaling message to the user equipment, where the higher-layer signaling message carries instruction information that instructs selection of the first transport block size table or the second transport block size table.

Further, the transmitter 302 may be configured to send a downlink control message to the user equipment, where the downlink control message carries instruction information that instructs selection of the first transport block size table or the second transport block size table.

Further, the first transport block size table includes a layer-1 data transport block size table in a LTE REL.8 system.

Further, all TBSs in the second transport block size table may be included in TBSs in the first transport block size table.

Further, any TBS in the second transport block size table may be a TBS in the first transport block size table, corresponding to a coding rate closest to a target coding rate.

Further, some TBSs in the second transport block size table may be included in TBSs in the first transport block size table and some TBSs in the second transport block size table may be included in a set layer-2 data transport block size table.

Further, any TBS in the second transport block size table may be a TBS in the first transport block size table and the set layer-2 data transport block size table, corresponding to a coding rate closest to the target coding rate.

Further, the target coding rate is a coding rate corresponding to the modulation and coding scheme level and the number of physical resource block pairs in LTE REL.8; or, the target coding rate is an optimized coding rate of a coding rate corresponding to the modulation and coding scheme level and the number of physical resource block pairs in LTE REL.8.

Figure 4:
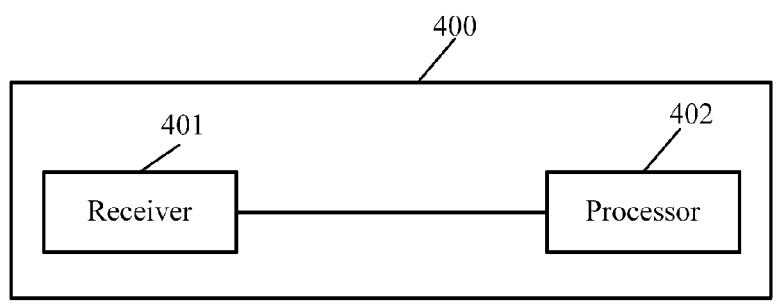
FIG. 4 is a schematic structural diagram of a first embodiment of a user equipment according to the present invention.

FIG. 4 is a schematic structural diagram of a first embodiment of a user equipment of the present invention. As shown in FIG. 4, a user equipment 400 of this embodiment includes a receiver 401 and a processor 402. The receiver 401 may be configured to receive a system scheduling control signal from a base station, where the system scheduling control signal includes a modulation and coding scheme level and a time-frequency resource. The processor 402 may be configured to select one transport block size table from a first transport block size table and a second transport block size table, and determine a corresponding transport block size in the selected first transport block size table or the selected second transport block size table according to the modulation and coding scheme level and the number of physical resource block pairs, where any TBS in the second transport block size table is not smaller than a TBS in a corresponding position in the first transport block size table. The receiver 401 may be further configured to receive service data from the base station using the determined TBS.

A user equipment of this embodiment receives, using a receiver, a system scheduling control signal from a base station, where the system scheduling control signal includes a modulation and coding scheme level and a time-frequency resource, and receives service data from the base station using a determined TBS; and a processor selects one transport block size table from a first transport block size table and a second transport block size table, and determines the corresponding transport block size TBS in the selected first transport block size table or the selected second transport block size table according to the modulation and coding scheme level and the number of physical resource block pairs, where any TBS in the second transport block size table is not smaller than a TBS in a corresponding position in the first transport block size table. In this way, the UE implements selection of a transport block size table, so that a coding rate is improved when the UE receives the service data according to the TBS in the selected second transport block size table.

Further, coding rates corresponding to all TBSs included in a maximum modulation and coding scheme level in the first transport block size table may be equal to a set coding rate; and/or, coding rates corresponding to all TBSs included in a maximum modulation and coding scheme level in the second transport block size table may be equal to the set coding rate.

The processor 402 may be further configured to select one transport block size table from the first transport block size table and the second transport block size according to a system configuration parameter or a system overhead.

The receiver 401 may be further configured to receive a higher-layer signaling message from the base station before one transport block size table is selected from the first transport block size table and the second transport block size table, where the higher-layer signaling message carries instruction information that instructs selection of the first transport block size table or the second transport block size table.

The receiver 401 may be further configured to receive a downlink control message from the base station before one transport block size table is selected from the first transport block size table and the second transport block size table, where the downlink control message carries instruction information that instructs selection of the first transport block size table or the second transport block size table.

Further, the first transport block size table may include a layer-1 data transport block size table in a LTE REL.8 system.

Further, all TBSs in the second transport block size table may be included in TBSs in the first transport block size table.

Further, any TBS in the second transport block size table may be a TBS in the first transport block size table, corresponding to a coding rate closest to a target coding rate.

Further, some TBSs in the second transport block size table may be included in TBSs in the first transport block size table and some TBSs in the second transport block size table may be included in a set layer-2 data transport block size table.

Further, any TBS in the second transport block size table may be a TBS in the first transport block size table and the set layer-2 data transport block size table, corresponding to a coding rate closest to the target coding rate.

Further, the target coding rate may be a coding rate corresponding to the modulation and coding scheme level and the number of physical resource block pairs in LTE REL.8; or, the target coding rate may be an optimized coding rate of a coding rate corresponding to the modulation and coding scheme level and the number of physical resource block pairs in LTE REL.8.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method comprising:
    determining, by a base station, a modulation and coding scheme level;
    determining, by the base station, a time-frequency resource;
    determining a number of physical resource block pairs according to the time-frequency resource;
    selecting, by the base station, a transport block size (TBS) table from a first TBS table and a second TBS table, wherein the first TBS table comprises columns representing the number of physical resource block pairs and rows representing a TBS index value, wherein the second TBS table comprises columns representing the number of physical resource block pairs and rows representing the TBS index value wherein selecting, by the base station, the TBS table from the first TBS table and the second TBS table comprises performing a comparison between a first TBS value in the first TBS table to a second TBS value in the second TBS table, wherein the first TBS value and the second TBS value are respectively in a same TBS index value and number of physical resource block pairs position in the first TBS table and the second TBS table, and wherein a result of the comparison is a factor in selecting, by the base station, the TBS table from the first TBS table and the second TBS table;
    determining a corresponding TBS in the TBS table according to the modulation and coding scheme level and the number of physical resource block pairs, wherein any TBS in the second TBS table is not smaller than a TBS in a corresponding position in the first TBS table;
    sending, by the base station, service data to a user equipment using the corresponding TBS; and
    sending, by the base station, a system scheduling control signal to the user equipment, wherein the system scheduling control signal comprises the modulation and coding scheme level and the time-frequency resource.

2. The method according to claim 1, wherein selecting, by the base station, the TBS table from the first TBS table and the second TBS table comprises selecting, by the base station, the TBS table from the first TBS table and the second TBS table according to at least one of a system configuration parameter and a system overhead.

3. The method according to claim 1, further comprising sending, by the base station, a higher-layer signaling message to the user equipment, wherein the higher-layer signaling message comprises instruction information that instructs the user equipment to select the first TBS table or the second TBS table.

4. The method according to claim 1, further comprising sending, by the base station, a downlink control message to the user equipment, wherein the downlink control message comprises instruction information that instructs selection of the first TBS table or the second TBS table.

5. The method according to claim 1, wherein the first TBS table comprises a layer-1 data TBS table in a LTE REL.8 system, wherein all TBSs in the second TBS table are part of TBSs in the first TBS table, and wherein any TBS in the second TBS table is a TBS in the first TBS table corresponding to a coding rate closest to a target coding rate.

6. The method according to claim 1, wherein the first TBS table comprises a layer-1 data TBS table ire a LTE REL.8 system, wherein a subset of TBSs in the second TBS table are part of TBSs in the first TBS table and a subset of TBSs in the second TBS table are part of a set layer-2 data TBS table, and wherein any TBS in the second TBS table is a TBS in the first TBS and the set layer-2 data TBS table corresponding to a coding rate closest to a target coding rate.

7. A data transmission method, comprising:
    receiving, by a user equipment, a system scheduling control signal from a base station, wherein the system scheduling control signal comprises a modulation and coding scheme level and a time-frequency resource;
    selecting, by the user equipment, a transport block size (TBS) table from a first TBS table and a second TBS table, wherein the first TBS table comprises columns representing a number of physical resource block pairs and rows representing a TBS index value, wherein the second TBS table comprises columns representing the number of physical resource block pairs and rows representing the TBS index value, wherein selecting, by the base station, the TBS table from the first TBS table and the second TBS table comprises performing a comparison between a first TBS value in the first TBS table to a second TBS value in the second TBS table, wherein the first TBS value and the second TBS value are respectively in a same TBS index value and number of physical resource block pairs position in the first TBS table and the second TBS table, and wherein a result of the comparison is a factor in selecting, by the base station, the TBS table from the first TBS table and the second TBS table;
    determining a corresponding TBS in the TBS table according to the modulation and coding scheme level and the number of physical resource block pairs, wherein any TBS in the second TBS table is not smaller than a TBS in a corresponding position in the first TBS table; and
    receiving, by the user equipment, service data from the base station using the corresponding TBS.

8. The method according to claim 7, wherein selecting, by the user equipment, the TBS table from the first TBS table and the second TBS table comprises selecting, by the user equipment, the TBS table from the first TBS table and the second TBS table according to at least one of a system configuration parameter and a system overhead.

9. The method according to claim 7, further comprising receiving, by the user equipment, a higher-layer signaling message from the base station before the TBS table is selected, wherein the higher-layer signaling message comprises instruction information that instructs selection of the first TBS table or the second TBS table.

10. The method according to claim 7, further comprising receiving, by the user equipment, a downlink control message from the base station before the TBS table is selected, wherein the downlink control message comprises instruction information that instructs selection of the first TBS table or the second TBS table.

11. The method according to claim 7, wherein the first TBS table comprises a layer-1 data TBS table in a LTE REL.8 system, wherein all TBSs in the second TBS table are part of TBSs in the first TBS table, and wherein any TBS in the second TBS table is a TBS in the first TBS table corresponding to a coding rate closest to a target coding rate.

12. The method according to claim 7, wherein the first TBS table comprises a layer-1 data TBS table in a LTE REL.8 system, wherein a subset of TBSs in the second TBS table are part of TBSs in the first TBS table, wherein a subset of TBSs in the second TBS table are part of a set layer-2 data TBS table, and wherein any TBS in the second TBS table is a TBS in the first TBS and the set layer-2 data TBS table corresponding to a coding rate closest to a target coding rate.

13. A base station comprising:
  a processor configured to:
    determine a modulation and coding scheme level
    determine a time-frequency resource;
    determine a number of physical resource block pairs according to the time-frequency resource;
    select a transport block size (TBS) table from a first TBS table and a second TBS table, wherein the first TBS table comprises columns representing the number of physical resource block pairs and rows representing a TBS index value, wherein the second TBS table comprises columns representing the number of physical resource block pairs and rows representing the TBS index value, wherein selecting, by the base station, the TBS table from the first TBS table and the second TBS table comprises performing a comparison between a first TBS value in the first TBS table to a second TBS value in the second TBS table, wherein the first TBS value and the second TBS value are respectively in a same TBS index value and number of physical resource block pairs position in the first TBS table and the second TBS table, and wherein a result of the comparison is a factor in selecting, by the base station, the TBS table from the first TBS table and the second TBS table; and
    determine a corresponding TBS in the TBS table according to the modulation and coding scheme level and the number of physical resource block pairs, wherein any TBS in the second TBS table is not smaller than a TBS in a corresponding position in the first TBS table; and
  a transmitter configured to:
    send service data to a user equipment using the corresponding TBS; and
    send a system scheduling control signal to the user equipment, wherein the system scheduling control signal comprises the modulation and coding scheme level and the time-frequency resource.

14. The base station according to claim 13, wherein the processor is further configured to select the TBS table from the first TBS table and the second TBS according to at least one of a system configuration parameter and a system overhead.

15. The base station according to claim 13, wherein the transmitter is further configured to send a higher-layer signaling message to the user equipment, and wherein the higher-layer signaling message comprises instruction information that instructs selection of the first TBS table or the second TBS table.

16. The base station according to claim 13, wherein the transmitter is further configured to send a downlink control message to the user equipment, and wherein the downlink control message comprises instruction information that instructs selection of the first TBS table or the second TBS table.

17. The base station according to claim 13, wherein the first TBS table comprises a layer-1 data TBS table in a LTE REL.8 system, wherein all TBSs in the second TBS table are part of TBSs in the first TBS table, and wherein any TBS in the second TBS table is a TBS in the first TBS table corresponding to a coding rate closest to a target coding rate.

18. The base station according to claim 13, wherein the first TBS table comprises a layer-1 data TBS table in a LTE REL.8 system, wherein a subset of TBSs in the second TBS table are part of TBSs in the first TBS table and a subset of TBSs in the second TBS table are part of a set layer-2 data TBS table, and wherein any TBS in the second TBS table is a TBS in the first TBS and the set layer-2 data TBS table corresponding to a coding rate closest to a target coding rate.

19. A user equipment comprising:
  a receiver configured to receive a system scheduling control signal from a base station, wherein the system scheduling control signal comprises a modulation and coding scheme level and a time-frequency resource; and
  a processor configured to:
    select transport block size (TBS) table from a first TBS table and a second TBS table, wherein the first TBS table comprises columns representing a number of physical resource block pairs and rows representing a TBS index value, wherein the second TBS table comprises columns representing the number of physical resource block pairs and rows representing the TBS index value, wherein selecting, by the base station, the TBS table from the first TBS table and the second TBS table comprises performing a comparison between a first TBS value in the first TBS table to a second TBS value in the second TBS table, wherein the first TBS value and the second TBS value are respectively in a same TBS index value and number of physical resource block pairs position in the first TBS table and the second TBS table, and wherein a result of the comparison is a factor in selecting, by the base station, the TBS table from the first TBS table and the second TBS table; and
    determine a corresponding TBS in the TBS table according to the modulation and coding scheme level and the number of physical resource block pairs, wherein any TBS in the second TBS table is not smaller than a TBS in a corresponding position in the first TBS table, and
  wherein the receiver is further configured to receive service data from the base station using the corresponding TBS.

20. The user equipment according to claim 19, wherein the processor is further configured to select the TBS table from the first TBS table and the second TBS table according to at least one of a system configuration parameter and a system overhead.

21. The user equipment according to claim 19, wherein the receiver is further configured to receive a higher-layer signaling message from the base station before the TBS table is selected from the first TBS table and the second TBS table, and wherein the higher-layer signaling message comprises instruction information that instructs selection of the first TBS table or the second TBS table.

22. The user equipment according to claim 19, wherein the receiver is further configured to receive a downlink control message from the base station before the TBS table is selected from the first TBS table and the second TBS table, and wherein the downlink control message comprises instruction information that instructs selection of the first TBS table or the second TBS table.

23. The user equipment according to claim 19, wherein the first TBS table comprises a layer-1 data TBS table in a LTE REL.8 system, wherein all TBSs in the second TBS table are part of TBSs in the first TBS table, and wherein any TBS in the second TBS table is a TBS in the first TBS table corresponding to a coding rate closest to a target coding rate.

24. The user equipment according to claim 19, wherein the first TBS table comprises a layer-1 data TBS table in a LTE REL.8 system, wherein a subset of TBSs in the second TBS table are part of TBSs in the first TBS table and a subset of TBSs in the second TBS table are part of a set layer-2 data TBS table, and wherein any TBS in the second TBS table is a TBS in the first TBS and the set layer-2 data TBS table corresponding to a coding rate closest to a target coding rate.

* * * * *